(12) United States Patent
Brecheisen

(10) Patent No.: US 10,107,295 B1
(45) Date of Patent: Oct. 23, 2018

(54) PUMP SYSTEM AND METHOD

(71) Applicant: Marion Brecheisen, Coaldale, CO (US)

(72) Inventor: Marion Brecheisen, Coaldale, CO (US)

( * ) Notice: Subject to any disclaimer, the term of this patent is extended or adjusted under 35 U.S.C. 154(b) by 324 days.

(21) Appl. No.: 14/719,096

(22) Filed: May 21, 2015

Related U.S. Application Data

(60) Provisional application No. 62/001,594, filed on May 21, 2014.

(51) Int. Cl.
  *F04D 27/00* (2006.01)
  *G05B 19/048* (2006.01)

(52) U.S. Cl.
  CPC ........... *F04D 27/00* (2013.01); *G05B 19/048* (2013.01); *G05B 2219/24003* (2013.01)

(58) Field of Classification Search
  CPC ........................... F04B 47/022; E21B 47/0008
  USPC ........................................................ 700/282
  See application file for complete search history.

(56) References Cited

U.S. PATENT DOCUMENTS

| | | | |
|---|---|---|---|
| 3,491,538 A | 1/1970 | Pearson | |
| 3,621,723 A | 11/1971 | Miller | |
| 4,380,150 A | 4/1983 | Carlson | |
| 4,492,536 A | 1/1985 | Gilbertson | |
| 4,848,085 A | 7/1989 | Rosman | |
| 4,936,383 A | 6/1990 | Towner et al. | |
| 5,800,063 A | 9/1998 | Stanley | |
| 5,996,688 A | 12/1999 | Schultz et al. | |
| 5,997,181 A | 12/1999 | Stanley | |
| 6,460,396 B1 | 10/2002 | Smedberg et al. | |
| 6,966,366 B2 | 11/2005 | Rogers, Jr. | |
| 6,967,589 B1 | 11/2005 | Peters | |
| 6,971,407 B2 | 12/2005 | Christensen et al. | |
| 7,406,887 B2 | 8/2008 | Jensen | |
| 7,490,674 B2 | 2/2009 | Brecheisen | |
| 7,600,563 B2 | 10/2009 | Brecheisen | |
| 8,240,221 B2 | 8/2012 | Simpson et al. | |
| 8,684,078 B2 | 4/2014 | Boyles et al. | |
| 8,851,860 B1 | 10/2014 | Mail | |
| 9,013,322 B2 | 4/2015 | Roberson et al. | |
| 2004/0084179 A1* | 5/2004 | Watson | F04B 47/022 166/250.15 |
| 2008/0240930 A1* | 10/2008 | Palka | E21B 43/127 417/42 |
| 2013/0076525 A1 | 3/2013 | Vu et al. | |
| 2013/0306326 A1* | 11/2013 | Doyle | E21B 43/127 166/369 |
| 2013/0343928 A1 | 12/2013 | McCarthy | |

* cited by examiner

*Primary Examiner* — Emilio J Saavedra
(74) *Attorney, Agent, or Firm* — Aspire IP, LLC; Scott J. Hawranek

(57) ABSTRACT

A pump device for extracting one or more resources includes a pump apparatus, a processor configured for receiving information from one or more sensors and sending instructions to one or more electronic controls, where the sensors and the electronic controls are each placed proximate to a respective component of the pump apparatus, and a network interface configured for sending and receiving communication from a device through a network.

16 Claims, 51 Drawing Sheets

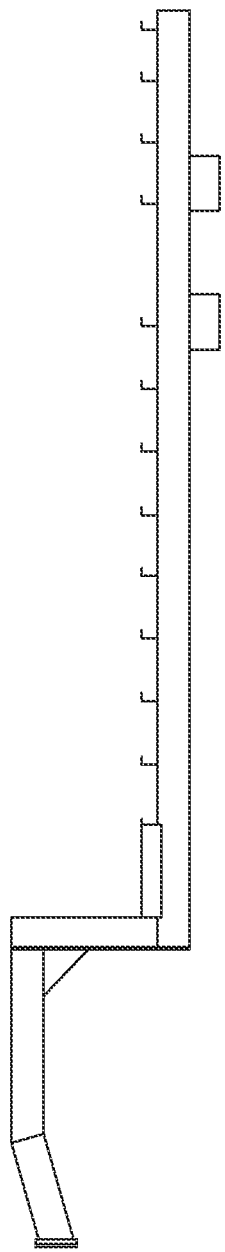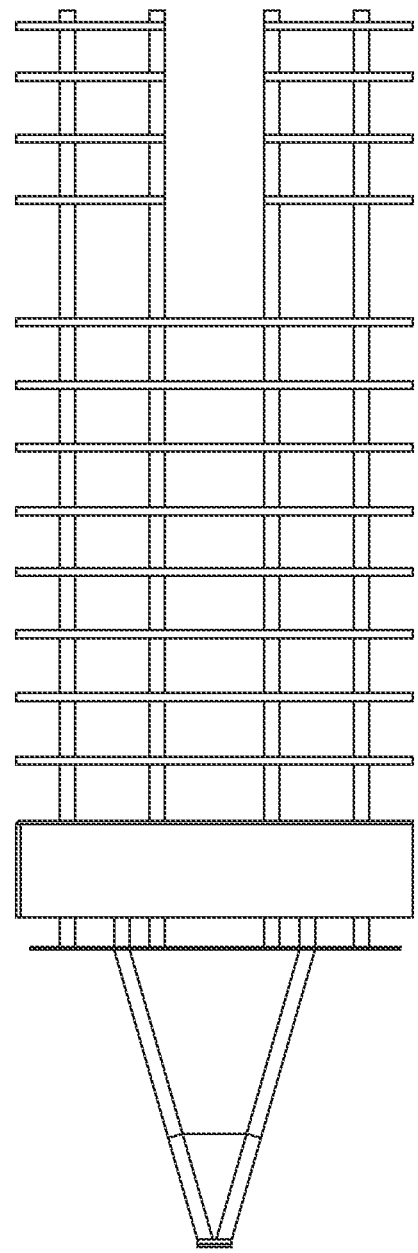
FIG. 7B
FIG. 7C

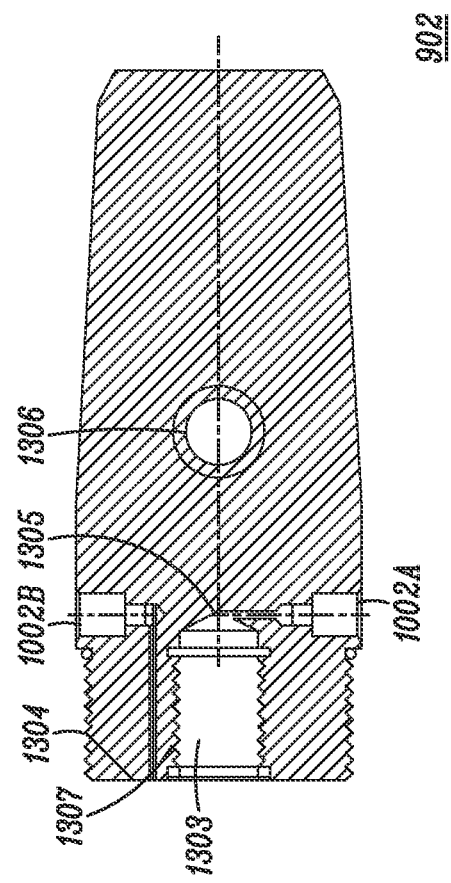
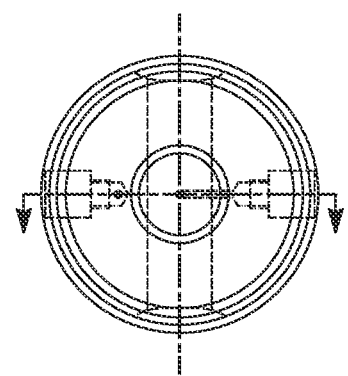
FIG. 13B
FIG. 13A

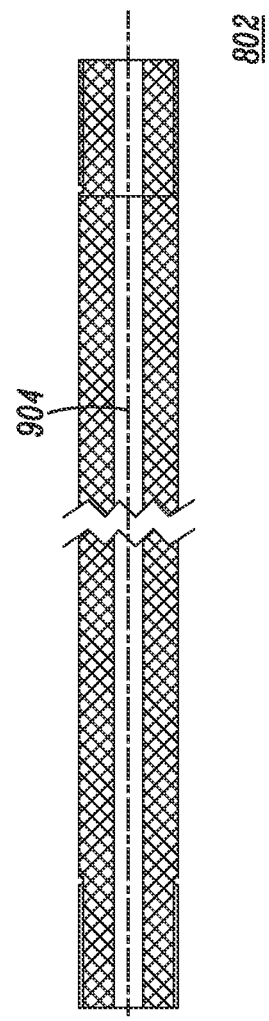
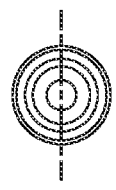
FIG. 14B
FIG. 14A

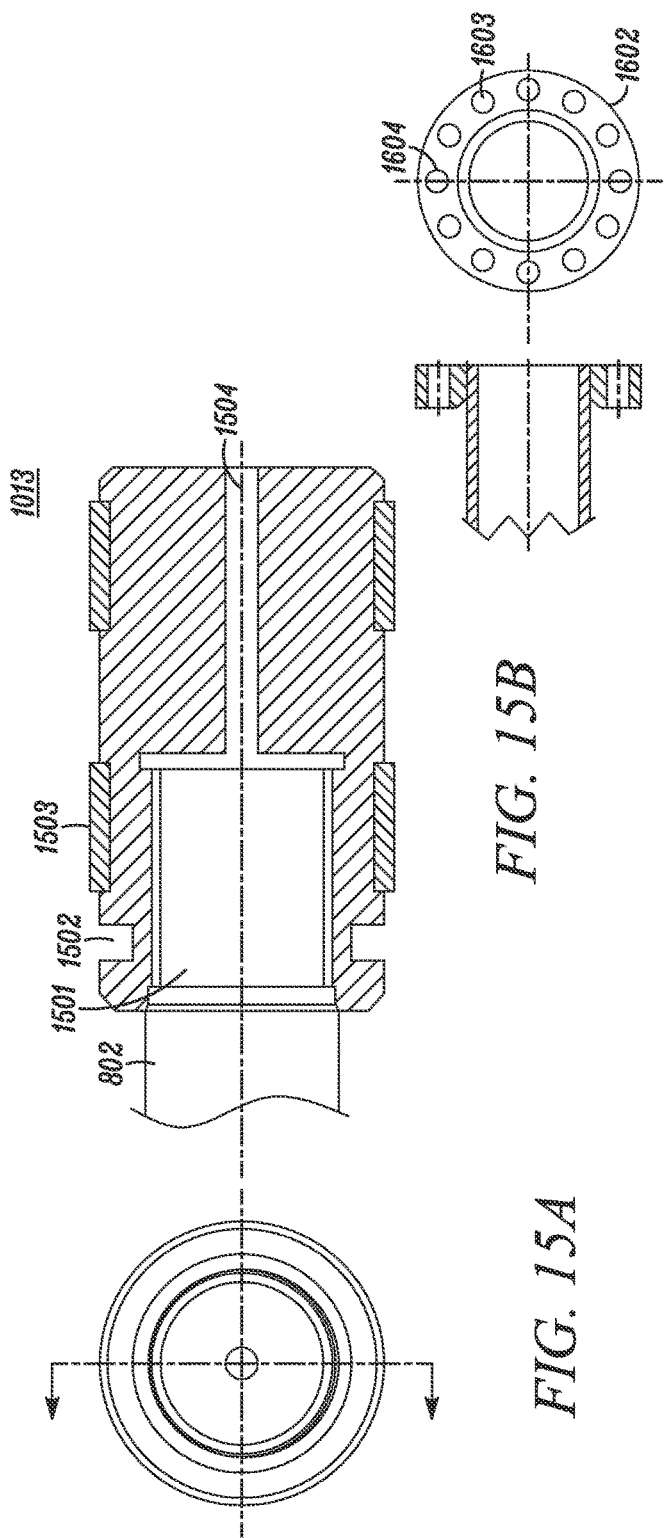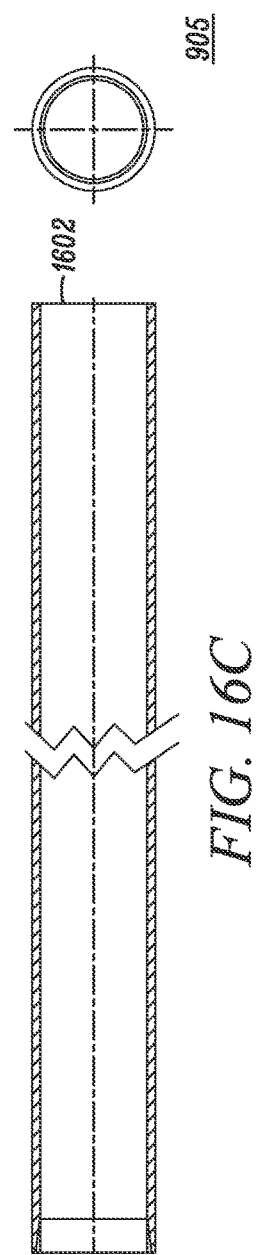

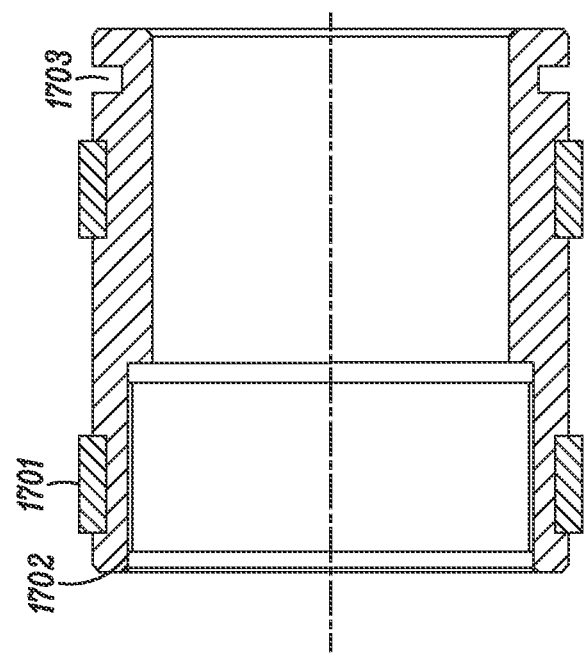
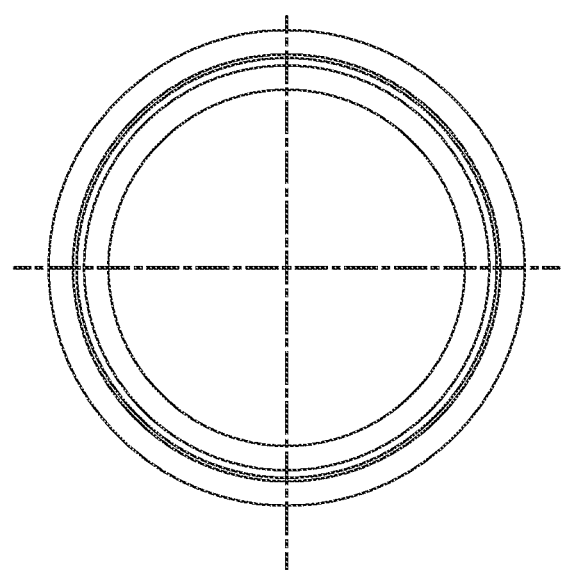
FIG. 17B
FIG. 17A

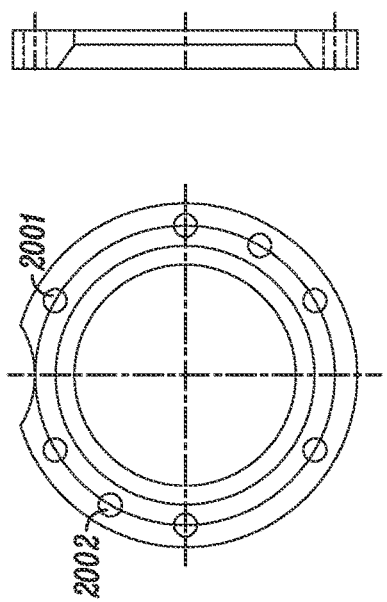
FIG. 20A
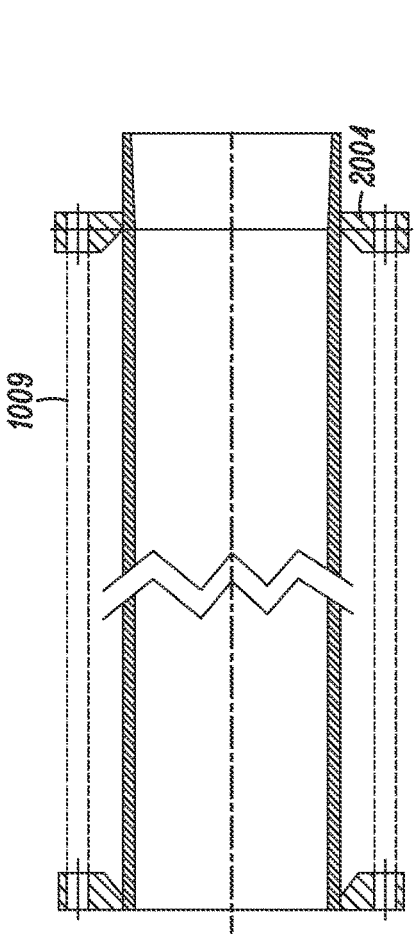
FIG. 20B
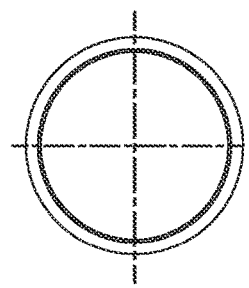

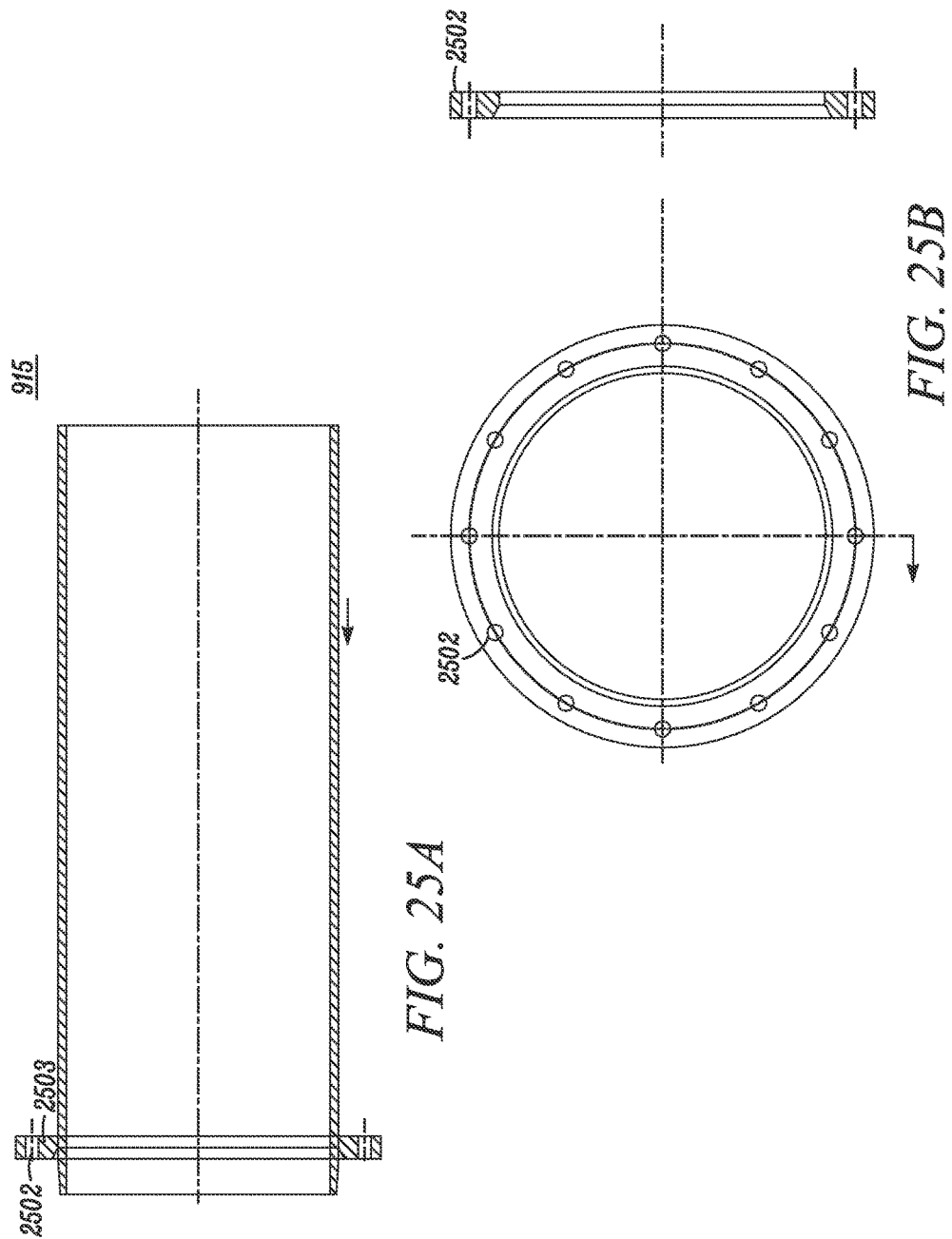

3500

PUMP SYSTEM AND METHOD

CROSS REFERENCE TO RELATED APPLICATION

The present application is claims the benefits of and priority, under 35 U.S.C. § 119(e), to U.S. Provisional Application Ser. No. 62/001,594, filed May 21, 2014; the above-identified application being fully incorporated herein by reference.

BACKGROUND OF THE INVENTION

Field of the Invention

The invention generally relates to an oil pump system and communication system, and more particularly to a method and system for a dual cylinder lift pump system and method.

Background

A wide variety of pumping devices have been developed over the years for extracting fluids from wells drilled into subsurface formations. One well-known device, commonly referred to as a "walking beam pump" is characterized by having a sucker rod string attached to one end of the beam, the beam being driven by a motive drive source, such as, a motor coupled to the opposite end of the beam by a pitman arm. Typically, the sucker rod will extend for considerable distances into the well and is connected to a down-hole pump, and in response to rocking motion of the walking beam initiated by the prime mover through the pitman arm is raised and lowered to result in drawing of the fluid out of the well.

The rocking motion of the walking beam will counterbalance the weight of fluid being lifted and which reaches a maximum when the sucker rod begins its upward stroke owing in part to the weight of the sucker rod string, the weight of the fluid being lifted and the force required to overcome the inertia of the load following the downstroke of the sucker rod; and in deep wells on the order of 5,000' to 6,000', the weight of the sucker rod and oil being lifted can be in excess of 8,000 lbs. An equal, if not greater, load is imposed on the motive drive source on each downstroke owing to the resistance encountered in overcoming fluid pressure as the pump rod advances through the formation. The disadvantages and drawbacks of the walking beam pump jacks are well-known and documented at some length, as a result of which numerous different approaches have been utilized with varying degrees of success. Nevertheless, there remains a need for a pump jack which is low profile, can be mounted above or below ground level together with an adjustable length stroke and extremely low power requirements and in so doing overcome the inherent problems of rod speed and stroke control in the walking beam pumps.

It is further desirable to minimize pressure surges at upper and lower ends of travel of the pump rod so as to avoid placing stress on the rod joints which can otherwise cause stretching, loosening and breakage of the rod.

It is further desirable for automation of various procedures and processes for the pump.

SUMMARY

Therefore, there is a need for a pump system and method that addresses the above deficiencies and other problems in the related art.

One advantage includes having a pump system that inherently self-balances the various components of the pump system, such that the various components stays stationary absence of energy input to the pump system. For example, a pump rod of the pump system would stay in position even if it is acted upon by gravity (e.g., the pump rod is not resting on a terrain or being pulled by an object or mechanism directly or indirectly secured to the terrain).

Another advantage includes having a pump system that can work at constant speed at a constant energy input (e.g., being driven by a motor of a constant power level at both the upstoke and downstoke). As such, the pump system can be efficient in taking advantage the maximum power rating of an energy source at all times of its operation cycle.

Yet another advantage includes having a pump system that can start and stop at will (e.g., the pump system works when the motor is started and stop when the motor stops). As such, the pump system allows for accurate and reliable control over all cycles of its operation.

Yet another advantage includes having a pump system that can work at controllable variable speed (e.g., the speed of the pump system is substantially proportionally to the speed and energy input to the motor). As such, the pump system is able to work for a desirable output level of a resource (e.g., petroleum) from a well.

Yet another advantage includes having a pump system that have less moving parts because the energy input may be directed to the actual movement and work of the pump system (e.g., the pump system would not need a separate counterbalance to provide additional force or torque for an upstoke). Also, the pump system would have less stress and wear on the various parts and components due to a more balance of the forces directed to the pump system (e.g., the pump system would not need additional force or torque on the upstoke than on the downstoke).

Yet another advantage includes having a pump system that may be installed directly over a well, thereby saving lateral space over pump systems in the related art that needs to be set up next to the well.

Yet another advantage includes having a pump system that have an adjustable height clearance, allowing the pump system to continuing working in areas where obstructions may pass overhead, while pump systems in the related art may not be installed in areas that does not meet its height clearance needs.

Yet another advantage includes having an automated system for the calibration, maintenance, and control of the pump system. The various advantages of the pump system as discussed above allows for reliable automation of the pump system, allowing for less expenses and greater efficiency.

Yet another advantage includes having an automated system for controlling groups of one or more pump systems. For example, the one or more pump systems may be optimized to work at a reservoir or geographical proximate location (e.g., changing the pump speed for each pump system due to the reservoir level, geographical features, or other parameters).

The present disclosure can provide a number of advantages depending on the particular aspect, embodiment, and/or configuration. These and other advantages will be apparent from the disclosure. Additional features and advantages may be learned by the practice of the invention.

To achieve these and other advantages, as embodied and broadly described, a non-transitory computer-readable medium embodying a program of machine executable instructions includes instructions for receiving information from one or more sensors of a pump apparatus, instructions for transmitting commands to one or more electronic controls of the pump apparatus, instructions for transmitting and receiving communications from a device through a network for the pump apparatus, and one or more of (a) to (d) following: (a) instructions to perform an emergency shut-off procedure for the pump apparatus; (b) instructions to perform a resource flow rate optimization procedure for the pump apparatus; and (c) instructions to perform a pump height adjustment procedure for the pump apparatus. The non-transitory computer-readable medium includes (a) the instructions to perform the emergency shut-off procedure and (a) the instructions to perform the emergency shut-off procedure includes instructions for receiving information from a resource pressure sensor of the pump apparatus configured to indicate a relative resource pressure reading, instructions for determining, based on the relative resource pressure reading, the resource is outside of a threshold value, and instructions for controlling one or more of a motor control of the pump apparatus and a control valve control of the pump apparatus to shut off the pump apparatus. The non-transitory computer-readable medium comprises (b) the instructions to perform the resource flow rate optimization procedure and (b) the instructions to perform the resource flow rate optimization procedure includes instructions for receiving information receiving information from a resource flow rate sensor of the pump apparatus configured to indicate a relative resource flow rate reading, instructions for determining, based on the relative resource flow rate reading, that resource flow rate is outside of a threshold value, instructions for determining that that one of increasing or decreasing a pump speed of the pump apparatus is possible, and instructions for performing one of increasing or decreasing the pump speed for correcting the resource flow rate to within the threshold value. The non-transitory computer-readable medium includes (c) the instructions to perform the pump height adjustment procedure and (c) the instructions to perform the pump height adjustment procedure includes instructions for receiving information from a proximity sensor of the pump apparatus configured to indicate a proximate obstruction reading, instructions for determining, based on the proximate obstruction reading, that an obstruction is proximate to an arm of the pump apparatus, and instructions for reducing a maximum height of the arm for avoiding the obstruction. The instructions to perform the pump height adjustment procedure further includes instructions for receiving information from the proximity sensor indicating a next proximate obstruction reading, instructions for determining, based on the next proximate obstruction reading, that the obstruction is no longer proximate to the arm, and instructions for returning the maximum height of the arm to an pre-determined height. The non-transitory computer-readable medium further includes (d) instructions to perform the service alert procedure and (d) the instructions to perform a service alert procedure includes instructions for receiving information from at least one of a plurality of maintenance sensors of the pump apparatus configured to indicate a maintenance level reading, instructions for determining, based on the maintenance level reading, that a maintenance level of the pump apparatus is outside of a threshold value, and instructions for transmitting a service call through the network. The (c) instructions to perform the pump height adjustment procedure further includes instructions for outputting one or more sensory signals during a performance of the instructions for reducing a maximum height of the arm for avoiding the obstruction. The instructions for performing one of increasing or decreasing the pump speed includes instructions for performing one or increasing or decreasing a speed of a motor of the pump apparatus. The (b) instructions to perform the resource flow rate optimization procedure further includes instructions determining an optimal resource flow rate for a well pumped by the pump apparatus based on one or more of a power source of the pump apparatus, a fill level of a tank receiving the resource, and an optimal resource extraction rate of a group of pump apparatuses comprising the pump apparatus. The non-transitory computer-readable medium further includes (e) instructions to perform a location tracking procedure for the pump apparatus. (e) The instructions to perform the location tracking procedure for the pump apparatus includes instructions for receiving information from a location sensor of the pump apparatus indicating a location reading, instructions for determining, based on the location reading, that a location of the pump apparatus has changed from a previous location reading, and instructions for transmitting a status of the location through the network.

In another embodiment, a method for operating an pump apparatus includes receiving information from one or more sensors of the pump apparatus, transmitting commands to one or more electronic controls of the pump apparatus, transmitting and receiving communications from a device through a network for the pump apparatus, and one or more of (a) to (d) following: (a) performing an emergency shut-off procedure for the pump apparatus; (b) performing a resource flow rate optimization procedure for the pump apparatus; and (c) performing a pump height adjustment procedure for the pump apparatus. The method includes (a) the performing the emergency shut-off procedure and (a) the performing the emergency shut-off procedure includes receiving information from a resource pressure sensor of the pump apparatus configured to indicate a relative resource pressure reading, determining, based on the relative resource pressure reading, the resource is outside of a threshold value, and controlling one or more of a motor control of the pump apparatus and a control valve control of the pump apparatus to shut off the pump apparatus. The method includes (b) the performing the resource flow rate optimization procedure and (b) the performing the resource flow rate optimization procedure includes receiving information receiving information from a resource flow rate sensor of the pump apparatus configured to indicate a relative resource flow rate reading, determining, based on the relative resource flow rate reading, that resource flow rate is outside of a threshold value, determining that that one of increasing or decreasing a pump speed of the pump apparatus is possible, and performing one of increasing or decreasing the pump speed for correcting the resource flow rate to within the threshold value. The method includes (c) the performing the pump height adjustment procedure and (c) the performing the pump height adjustment procedure includes receiving information from a proximity sensor of the pump apparatus configured to indicate a proximate obstruction reading, determining, based on the proximate obstruction reading, that an obstruction is proximate to an arm of the pump apparatus, and reducing a maximum height of the arm for avoiding the obstruction. (c) The performing the pump height adjustment procedure further includes receiving information from the proximity sensor indicating a next proximate obstruction reading, determining, based on the next proximate obstruction reading, that the obstruction is no longer proximate to the arm, and returning the maximum height of the arm to an pre-determined height. The method further includes (d) performing a service alert procedure and (d) performing the service alert procedure includes receiving information from at least one of a plurality of maintenance sensors of the pump apparatus configured to indicate a maintenance level reading determining, based on the maintenance level reading, that a maintenance level of the pump apparatus is outside of a threshold value, and transmitting a service call through the network. The (c) performing the pump height adjustment procedure further includes outputting one or more sensory signals during a performance of the instructions for reducing a maximum height of the arm for avoiding the obstruction. The performing one of increasing or decreasing the pump speed includes performing one or increasing or decreasing a speed of a motor of the pump apparatus. (b) The performing the resource flow rate optimization procedure further includes determining an optimal resource flow rate for a well pumped by the pump apparatus based on one or more of a power source of the pump apparatus, a fill level of a tank receiving the resource, and an optimal resource extraction rate of a group of pump apparatuses comprising the pump apparatus. The method further includes (e) performing a location tracking procedure for the pump apparatus, (e) the performing the location tracking procedure for the pump apparatus includes receiving information from a location sensor of the pump apparatus indicating a location reading determining, based on the location reading, that a location of the pump apparatus has changed from a previous location reading, and transmitting a status of the location through the network.

In yet another embodiment, a pump apparatus for reciprocating a pump rod includes a frame and a first unit for reciprocatingly moving the pump rod from a first position to a second position. The first unit includes a piston ram slidable in sealed engagement through an inner concentric piston shaft and an outer diameter cylinder in an outwardly spaced concentric relation to the inner concentric piston shaft mounted for movement with the piston ram. The pump apparatus further includes a second unit in fluid communication with the first unit. The first unit further includes a large diameter cylinder barrel. The pump apparatus further includes a directional control valve and a limit switch for regulating a directional flow of hydraulic fluid into the first unit. The fluid includes an inert gas, and the fluid counterbalances a weight of the pump rod and a content of the well. A second fluid fills the base of the first unit and is configured to fill an interior of the outer diameter cylinder and the large diameter cylinder barrel. The second fluid further includes oil. The pump apparatus further includes a motor for driving the hydraulic oil against lower ends of the outer diameter cylinder to drive the outer diameter cylinder upward. The pump rod is connected to a stroke multiplier. The first unit further includes a cylinder head and a cylinder end. The frame is portable. The frame is based on a trailer. The frame is tiltable on the trailer for transport.

In yet another embodiment, a method of recovering fluids from a subsurface formation includes mounting a first and second unit on a frame. The first unit comprises a piston ram slidable in sealed engagement through an inner concentric piston shaft and an outer diameter cylinder in an outwardly spaced concentric relation to the inner concentric piston shaft mounted for movement with the piston ram, the second unit is in fluid communication with the first unit, and a pump rod extends downwardly into the subsurface formation and is connected to the piston ram. The method further includes counterbalancing a weight of the pump rod with a fluid in the first and second unit and reciprocating the pump rod from a first position to a second position through simultaneous movement of the piston ram. The pump rod and the piston ram are connected to a cross bar. The first unit further comprises a large diameter cylinder barrel. The method further includes regulating a directional flow of hydraulic fluid into the first unit through a directional control valve and a limit switch. The fluid includes an inert gas. A second fluid fills the base of the first unit and is configured to fill an interior of the outer diameter cylinder and the large diameter cylinder barrel. The second fluid further includes oil. The method further includes driving the hydraulic oil against lower ends of the outer diameter cylinder to drive the outer diameter cylinder upward through a motor. The pump rod is connected to a stroke multiplier on the cross bar. The first unit further comprises a cylinder head and a cylinder end.

In yet another embodiment, a pump apparatus for reciprocating a pump rod string in an oil or gas well includes a ground-engaging base frame. An upper end of the pump rod string extends upward through the base frame. The pump apparatus further includes a first unit mounted on said base frame. The first unit includes an inner concentric piston shaft and an outer diameter cylinder, and a piston ram is in slidably sealed engagement through the inner concentric fluid passage. The pump apparatus further includes a second unit for introducing and removing of fluid to the first unit. The introducing and removing of the fluid drives the piston ram in the inner concentric piston shaft. The pump apparatus further includes a cross bar connected to the piston ram, a piston of the second unit, and the pump rod. The first unit includes a piston ram slidable in sealed engagement through an inner concentric piston shaft and an outer diameter cylinder in an outwardly spaced concentric relation to the inner concentric piston shaft mounted for movement with the piston ram. The pump apparatus further includes a second unit in fluid communication with the first unit. The first unit further includes a large diameter cylinder barrel. The pump apparatus further includes a directional control valve and a limit switch for regulating a directional flow of hydraulic fluid into the first unit. The fluid includes an inert gas, and the fluid counterbalances a weight of the pump rod and a content of the well. A second fluid fills the base of the first unit and is configured to fill an interior of the outer diameter cylinder and the large diameter cylinder barrel. The second fluid further includes oil. The pump apparatus further includes a motor for driving the hydraulic oil against lower ends of the outer diameter cylinder to drive the outer diameter cylinder upward. The pump rod is connected to a stroke multiplier. The first unit further includes a cylinder head and a cylinder end.

In yet another embodiment, a pump apparatus for reciprocating a pump rod string in an oil or gas well includes a ground-engaging base frame. An upper end of the pump rod string extends upward through the base frame. The pump apparatus further includes one or more first units mounted on said base frame. Each of the first unit includes an inner concentric piston shaft and an outer diameter cylinder, and a piston ram is in slidably sealed engagement through the inner concentric fluid passage. The pump apparatus further includes one or more second unit for introducing and removing of fluid to a corresponding first unit. The introducing and removing of the fluid drives the piston ram in the inner concentric piston shaft of the corresponding first unit. The pump apparatus further includes a cross bar connected to the piston ram, a piston of the second unit, and the pump rod. The first unit includes an inner concentric piston shaft and an outer diameter cylinder, and a piston ram is in slidably sealed engagement through the inner concentric fluid passage. The pump apparatus further includes a second unit for introducing and removing of fluid to the first unit. The introducing and removing of the fluid drives the piston ram in the inner concentric piston shaft. The pump apparatus further includes a cross bar connected to the piston ram, a piston of the second unit, and the pump rod. The first unit includes a piston ram slidable in sealed engagement through an inner concentric piston shaft and an outer diameter cylinder in an outwardly spaced concentric relation to the inner concentric piston shaft mounted for movement with the piston ram. The pump apparatus further includes a second unit in fluid communication with the first unit. The first unit further includes a large diameter cylinder barrel. The pump apparatus further includes a directional control valve and a limit switch for regulating a directional flow of hydraulic fluid into the first unit. The fluid includes an inert gas, and the fluid counterbalances a weight of the pump rod and a content of the well. A second fluid fills the base of the first unit and is configured to fill an interior of the outer diameter cylinder and the large diameter cylinder barrel. The second fluid further includes oil. The pump apparatus further includes a motor for driving the hydraulic oil against lower ends of the outer diameter cylinder to drive the outer diameter cylinder upward. The pump rod is connected to a stroke multiplier. The first unit further includes a cylinder head and a cylinder end.

In yet another embodiment, a pump device for extracting one or more resources includes a pump apparatus and a processor configured for receiving information from one or more sensors and sending instructions to one or more electronic controls. The sensors and the electronic controls are each placed proximate to a respective component of the pump apparatus. The pump device further includes a network interface configured for sending and receiving communication from a device through a network. A status of the pump device is viewable and the pump device is controllable by one or more of an app, an application, and a server remotely through the network interface. The pump device is capable of being shut-off by an instruction of one or more of the app, the application, and the server.

In one aspect, the sensors include a resource pressure sensor, wherein the electronic controls include a motor control and a control valve control, and the processor is configured to perform an emergency shut-off procedure. The emergency shut-off procedure includes receiving information from the resource pressure sensor configured to indicate a relative resource pressure reading and responsive to determining, based on the relative resource pressure reading, that resource pressure is outside of a threshold value, controlling one or more of the motor control and the control valve control to shut off the pump apparatus.

In another aspect, the sensors include an resource flow rate sensor, and the processor is configured to perform an resource flow rate optimization procedure. The resource flow rate optimization procedure includes receiving information from the resource flow rate sensor configured to indicate a relative resource flow rate reading and responsive to determining, based on the relative resource flow rate reading, that resource flow rate is outside of a threshold value, and responsive to determining that one of increasing or decreasing a pump speed of the pump apparatus is possible, performing one of increasing or decreasing the pump speed for correcting the resource flow rate to within the threshold value.

In yet another aspect, the sensors include a proximity sensor, and the processor is configured to perform a pump height adjustment procedure. The pump height adjustment procedure include receiving information from the proximity sensor configured to indicate a proximate obstruction reading and responsive to determining, based on the proximate obstruction reading, that an obstruction is proximate to an arm of the pump apparatus, reducing a maximum height of the arm for avoiding the obstruction.

In yet another aspect, the sensors include a location sensor, and the processor is configured to perform a location tracking procedure. The location tracking procedure includes receiving information from the location sensor indicating a location reading, responsive to determining, based on the location reading, that a location of the pump apparatus has changed from a previous location reading, and transmitting a status of the location through the network.

In yet another aspect, the sensors include one or more maintenance sensors, and the processor is configured to perform a service alert procedure. The service alert procedure includes receiving information from at least one of the maintenance sensors configured to indicate a maintenance level reading, responsive to determining, based on the maintenance level reading, that a maintenance level of the pump apparatus is outside of a threshold value, transmitting a status of the maintenance level through the network. The transmitting of the status of the maintenance level is configured to elicit a service call to the pump apparatus. The maintenance sensors include a hydraulic fluid level sensor and the maintenance level includes a hydraulic fluid level.

In yet another embodiment, a tank device for storing one or more resources extracted by a pump device includes one or more tanks configured for receiving and storing the resources and a processor configured for receiving information from one or more sensors and sending instructions to one or more electronic controls. The sensors and the electronic controls are each placed proximate to a respective component of the tanks or a pump apparatus of the pump device. The tank device further includes a network interface configured for sending and receiving communication from a device through a network. the sensors include a tank filled volume sensor, and wherein the processor is configured to perform a service alert procedure. The service alert procedure includes receiving information from the tank filled volume sensor indicating a tank filled volume reading, and responsive to determining, based on the tank filled volume reading, that a filled volume of the tanks is above a threshold value, transmitting a status of the filled volume through the network. The sensors further include a resource flow rate sensor. The electronic controls include one or more controls to the pump device, and the service alert procedure further includes controlling the pump device to reduce a resource flow rate through the one or more controls.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "module," as used herein, refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation or technique.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, alone or in combination, one or more of the features set forth above or described in detail below.

BRIEF DESCRIPTION OF THE DRAWINGS

FIG. 7B illustrates an exemplary side view of the frame of FIG. 7A;

FIG. 7C illustrates an exemplary top view of the frame of FIG. 7A;

FIGS. 13A and 13B illustrate exemplary cross-sectional views of an enlarged upper end of the cylinder assembly of FIG. 10;

FIGS. 14A and 14B illustrate exemplary cross-sectional views of an inner piston ram of the cylinder assembly of FIG. 10;

FIGS. 15A and 15B illustrate exemplary cross-sectional views of a piston end of the cylinder assembly of FIG. 10;

FIGS. 16A, 16B, and 16C illustrate exemplary cross-sectional views of an inner smaller diameter piston shaft of the cylinder assembly of FIG. 10;

FIGS. 17A and 17B illustrate exemplary cross-sectional views of a piston end of the cylinder assembly of FIG. 10;

FIGS. 20A and 20B illustrate exemplary cross-sectional views of a large diameter cylinder barrel of the cylinder assembly of FIG. 10;

FIGS. 25A and 25B illustrate exemplary cross-sectional views of an outer concentric barrel of the cylinder assembly of FIG. 10;

Figure 1A:
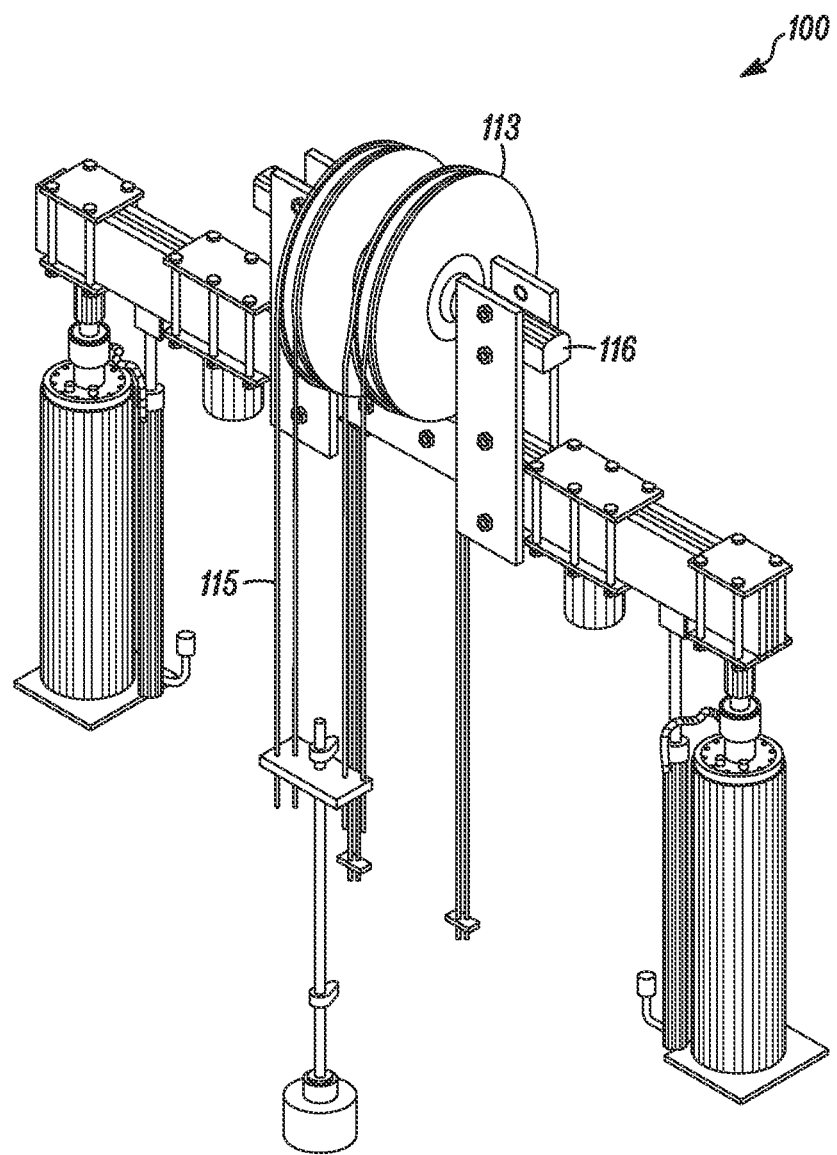
FIGS. 1A and 1B illustrate exemplary schematic views of a pump apparatus for operating in a subsurface environment according to an embodiment of the invention.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In order to provide a more full disclosure of a pump system and method, the following U.S. Patents and Patent Publications are fully incorporated herein by reference:

(a) U.S. Pat. No. 6,967,589, entitled "Gas/Oil Well Monitoring System," which is directed to a system for monitoring a gas/oil well is provided with a monitoring unit, a relay unit and a host interface. A monitoring unit collects data regarding the status of the gas/oil well and wirelessly transmits that data to a relay unit. The relay unit, in turn, connects to a host interface using cellular communications and transmits the data. The monitoring unit can transmit information on demand or after an alarm condition is sensed. In either case, the monitoring unit is normally in a sleep mode. The relay unit can request information from the monitoring unit or respond to a wake up transmission sent to it from either the host interface or monitoring unit. The host interface receives data from the relay unit and then informs an end user of that data.

(b) U.S. Pat. No. 8,851,860, entitled "Adaptive Control of An Oil or Gas Well Surface-Mounted Hydraulic Pumping System and Method," which is directed to intelligent adaptive control for optimization of production output, energy efficiency and safety of a linear reciprocating long stroke hydraulic lift system, for use at the surface of oil and gas wells to extract fluids or gas after free flowing stopped due to natural decline of reservoir pressure. The hydraulic pump and its adaptive control system introduced are capable of optimizing its production capacity by varying multiple operating parameters, including its stroking length and speed characteristics continuously and instantaneously at any point. Merits and benefits include significant increase in production efficiency, improved durability and longevity of the pumping equipment, significant power consumption savings and an ability to adapt effectively to changing well conditions.

(c) U.S. Pat. No. 9,013,322, entitled "Real-Time Onsite Internet Communication with Well Manager for Constant Well Optimization," which is directed to an apparatus and method for well control and monitoring including an independent web server computer integrated with a pump controller located at each well in an oil field. The well controller locally controls the well pump, processes well and pump data, generates surface and downhole cards, and communicates production reports, recommendations for production improvements, and production statistics to remote sites via the internet. The controller can be queried remotely to provide production reports, etc. Furthermore, the controller can initiate alerts via email, text messaging, or internet messaging, for example, during fault conditions.

(d) U.S. Pat. Pub. No. 2013/0076525, entitled "System and Method for Remote Well Monitoring," which is directed to systems and methods for remote monitoring of a wellsite operation may include receiving login information from a user and displaying a wellsite listing. The user may select at least one wellsite and may provide input regarding at least one parameter of interest for the at least one wellsite. A server may receive data regarding the at least one wellsite via a transceiver from a sensor disposed at a wellsite measuring the at least one parameter of interest. The data regarding the at least one parameter of interest may be transmitted as a dashboard after creation and rendering of the dashboard at a server. The dashboard may be displayed via a wellsite information display module on a personal mobile device. The display of the at least one parameter of interest is customizable by the user or administrator of the system.

(e) U.S. Pat. Pub. No. 2013/0306326, entitled "Low Profile Rod Pumping Unit with Pneumatic Counterbalance for the Active Control of the Rod String," which is directed to adaptable systems for a surface pumping unit that includes a low inertia pumping unit mechanism having a pneumatic counterbalance assembly are described, as well as methods for the use of such systems for subterranean fluid recovery. The system is capable of being integrated with well management automation systems, thereby allowing for response to active control commands, and automatically altering and/or maintaining a counterbalance force in the pumping unit by adding or removing air mass from a containment vessel associated with the pumping unit.

(f) U.S. Pat. Pub. No. 2013/0343928, entitled "Lift System," which is directed to a hydraulic lift system comprises a plurality of hydraulic cylinders with pistons therein, having piston rods that are mechanically interconnected so that the pistons and piston rods move upwards and downwards in unison. A hydraulic fluid communication sub-system is operable to deliver fluid from a source of pressurized hydraulic fluid to at least a first cylinder to drive the pistons through an upstroke, from the source of pressurized hydraulic fluid to a second cylinder to drive the pistons through a downstroke, and from the first cylinder to the second cylinder. A hydraulic fluid flow control system selectively directs fluid from the source of pressurized hydraulic fluid either to the first cylinder to drive the pistons upwardly or to the second cylinder to drive the pistons downwardly. During the downstroke, hydraulic fluid flow control system directs hydraulic fluid from the first cylinder to the second cylinder to help drive the pistons downwardly.

U.S. Pat. Nos. 7,490,674 and 7,600,563 disclose previous generations of dual cylinder lift pump systems and methods; both of which are herein incorporated by reference for all purposes.

Reference will now be made in detail to an embodiment of the present invention, an example of which is illustrated in the accompanying drawings.

Figure 1B:
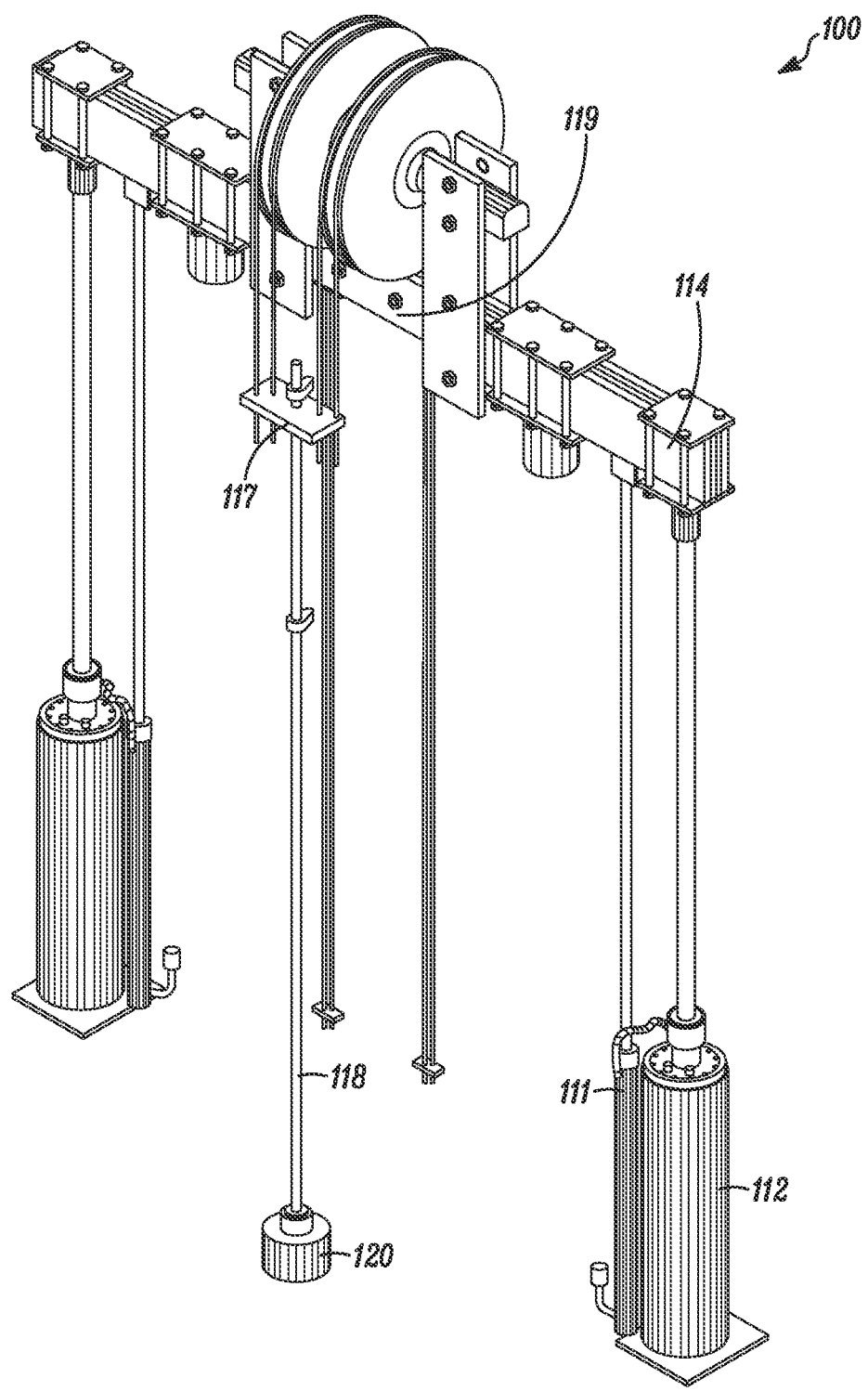

FIGS. 1A and 1B illustrate exemplary schematic views of a pump apparatus for operating in a subsurface environment according to an embodiment of the invention.

A pump apparatus 100 includes the hydraulic cylinder, which may include one or more of cylinder assemblies 112, regulators 111, cross bar 114, cable shifts 113, cable shaft 116, cable 115, cross bar 117, and pump rod 118. The cylinder assemblies 112 and the regulators 111 are anchored by the cross bar 114. The cylinder assemblies 112 and the regulators 111 may be filled with a fluid (e.g., air, nitrogen gas, or other gas or fluid) which may be compressed and/or pressurized in the cylinder assemblies 112 and the regulators 111 and flow between each pair of the connected cylinder assembly 112 and the regulator 111. In an embodiment, the filled (with compressed/pressurized gas or fluid) cylinder assembly 112 and the regulator 111 naturally holds substantially the weight of the pump apparatus (including the cross bar 114, cable shifts 113, cable shaft 116, and cable 115) in the various vertical positions (e.g., heights as shown in the either of FIGS. 1A and 1B).

In a preferred embodiment, the pump apparatus 100 shown in FIGS. 1A and 1B includes two pairs of the cylinder assembly 112 and the regulator 111, with each pair of the cylinder assembly 112 and the regulator 111 anchored on one side of the cross bar 114. In an embodiment, the pump apparatus 100 may have one (single) or more (e.g., two or more) pairs of the cylinder assembly 112 and the regulator 111 (e.g., just one of each of cylinder assembly 112 and the regulator 111 anchored in a configuration rather than the two pairs as shown in FIGS. 1A and 1B). In an embodiment, the position/configuration of the cylinder assembly 112 and the regulator 111 may change for each pair. For example, the regulator 111 is anchored at an inside position from the cylinder assembly 112 for the pump apparatus 100 as shown in FIGS. 1A and 1B (e.g., where the regulator 111 is closer to the pump rod 118 in the middle of the pump apparatus 100 than the cylinder assembly 112). However, the regulator 111 may be anchored at an outside position from the cylinder assembly 112 in another embodiment. In an embodiment, the cylinder assemblies 112 may further contain hydraulic fluids. The cross bar 114 connects to an existing well casing 120 through a cable shifts 113 and cable 115 (forming a cable shifts-and-cable assembly) by which the cable shifts-and-cable assembly is anchored on the cross bar 114.

In installing/configuring a pump apparatus 100 for an existing well (e.g., an oil well), the cable 115 may be attached to a pump rod 118 that extends downwardly through the existing well casing 120. The cable 115 is attached to the pump apparatus 100 through the cable shifts 113, which is anchored on the cross bar 114. The cable shifts are attached to the cross bar 114 through shaft 116. The cylinder assemblies 112 is configured to lift or lower the cross bar 114 (e.g., as driven by a power source) in order to lift or lower the pump rod 118 in the well casing 120. The compressed/pressurized fluid inside the cylinder assemblies (and the regulators 111) is configured to be at a pressure level that counterbalances substantially the weight of the pump rod 118 (and the components attached to the pump rod 118), thus reducing the power needed to drive the pump apparatus 100.

In operating the pump apparatus 100, the compressed/pressurized fluid is configured to flow from the regulators 111 to the cylinder assemblies 112 as the cross bar 114 is lifted from the low position of the pump apparatus 100 as shown in FIG. 1A to the heightened position of the pump apparatus 100 as shown in FIG. 1B. The flow of the compressed/pressurized fluid into the cylinder assemblies 112 when the cross bar 114 is lifted helps counterbalance the cross bar 114 in the heightened position. When the cross bar 114 returns from the heightened position to the low position, the compressed/pressurized fluid that flowed from the regulators 111 to the cylinder assemblies 112 flows back to the regulators 111. In an embodiment, the cable shifts 113 may include a stroke multiplier that lifts and lowers the pump rod 118 in the existing well casing 120 a multiple ratio of the distance per stroke (e.g., a 1:10 ratio that lifts and lowers the pump rod 118 to a distance by a factor of 10 of the stroke provided by the input).

Figure 2:
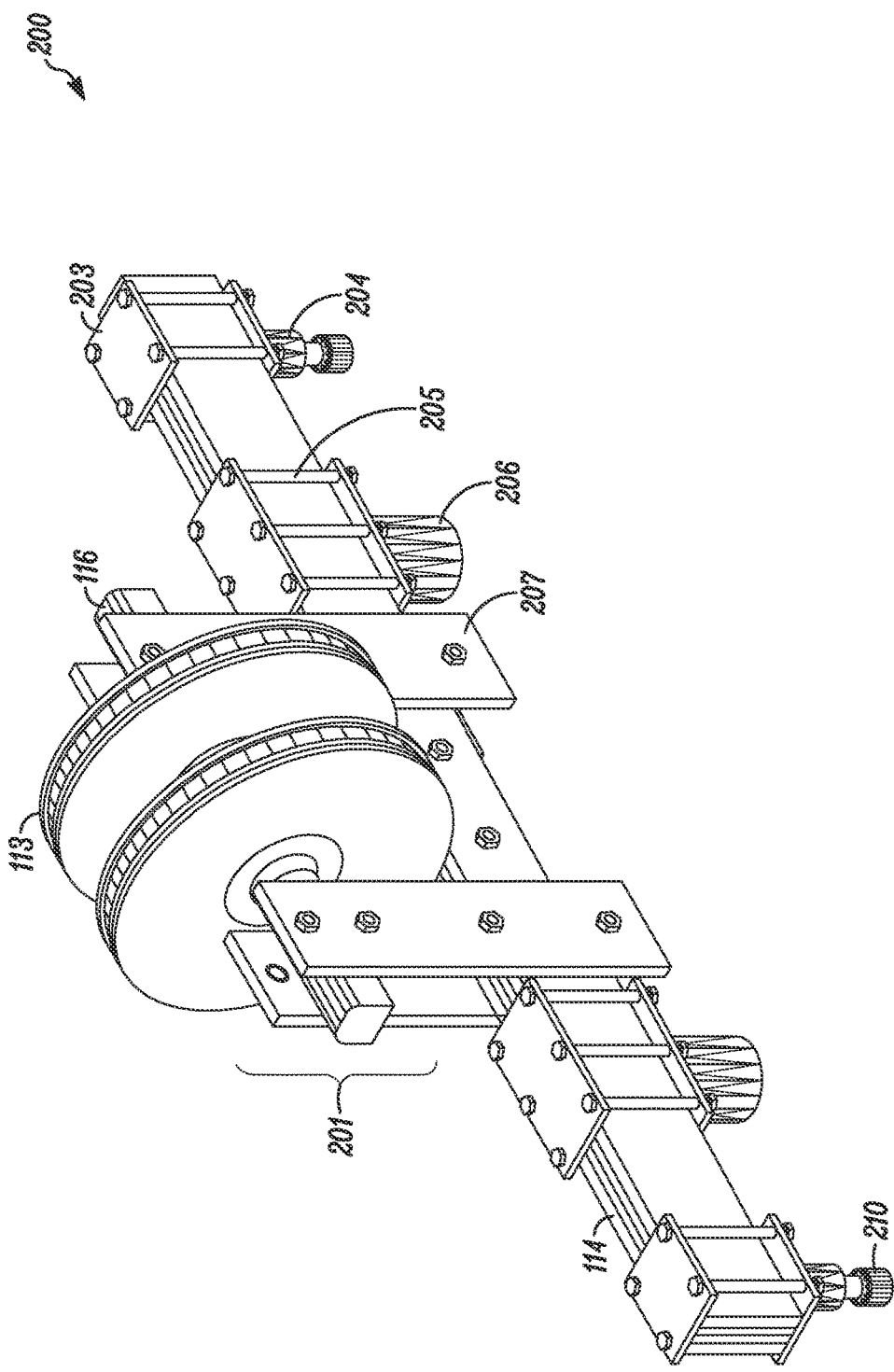
FIG. 2 illustrates an enlarged view of a cross bar apparatus of the apparatus shown in FIGS. 1A and 1B.

FIG. 2 illustrates an enlarged view of a cross bar apparatus of the apparatus shown in FIGS. 1A and 1B.

The cross bar apparatus 200 includes the cross bar 114 and the cable shifts portion 201. The cable shifts portion 201 includes the cable shifts 113 (e.g., a stroke multiplier) and a cable shaft 116 connecting the cable shifts 113 through the center of the cable shifts 113 to a vertical connector 207. The vertical connector 207 further connects the cable shifts portion 201 to the cross bar 114. The cross bar 114 includes receivers 206 each for receiving a piston shaft of a cylinder assembly and receivers 204 for receiving a piston shaft of a regulator (e.g., regulator 111).

Referring to FIG. 2, the cross bar 114 is shown as configured to receive the cylinder assemblies into receivers 206 at the inside position and the regulators into receivers 204 at the outside position. The receivers 206 and 204 are held in place to the cross bar 114 respectively by plates 203 and bolts 205. In an embodiment, the receivers 204 for the regulator may further include a self-aligning ball socket 210 for preventing bending or additional stresses to the regulators due to the alignment differential of the regulators and the pump apparatus 100 when the pump apparatus 100 is installed at a site.

Figure 3:
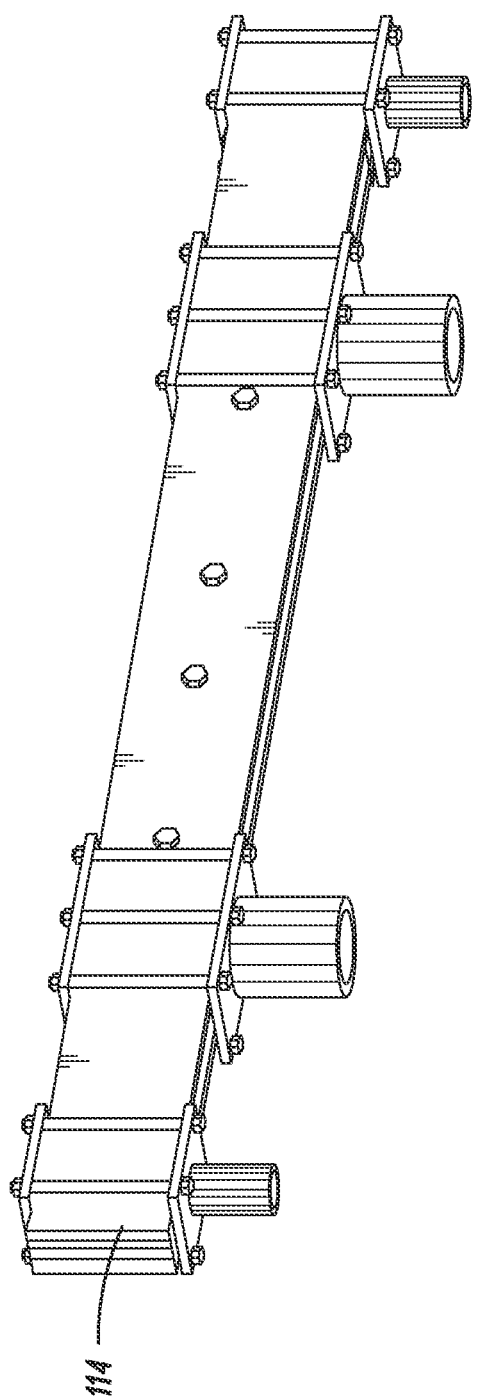
FIG. 3 illustrates an enlarged view of cross bar of the apparatus shown in FIG. 1.

FIG. 3 illustrates an enlarged view of cross bar of the apparatus shown in FIGS. 1A and 1B. The cross bar 114 of the cross bar apparatus 200 is shown without the cable shifts portion 201.

Figures 4A, 4B, 4C:
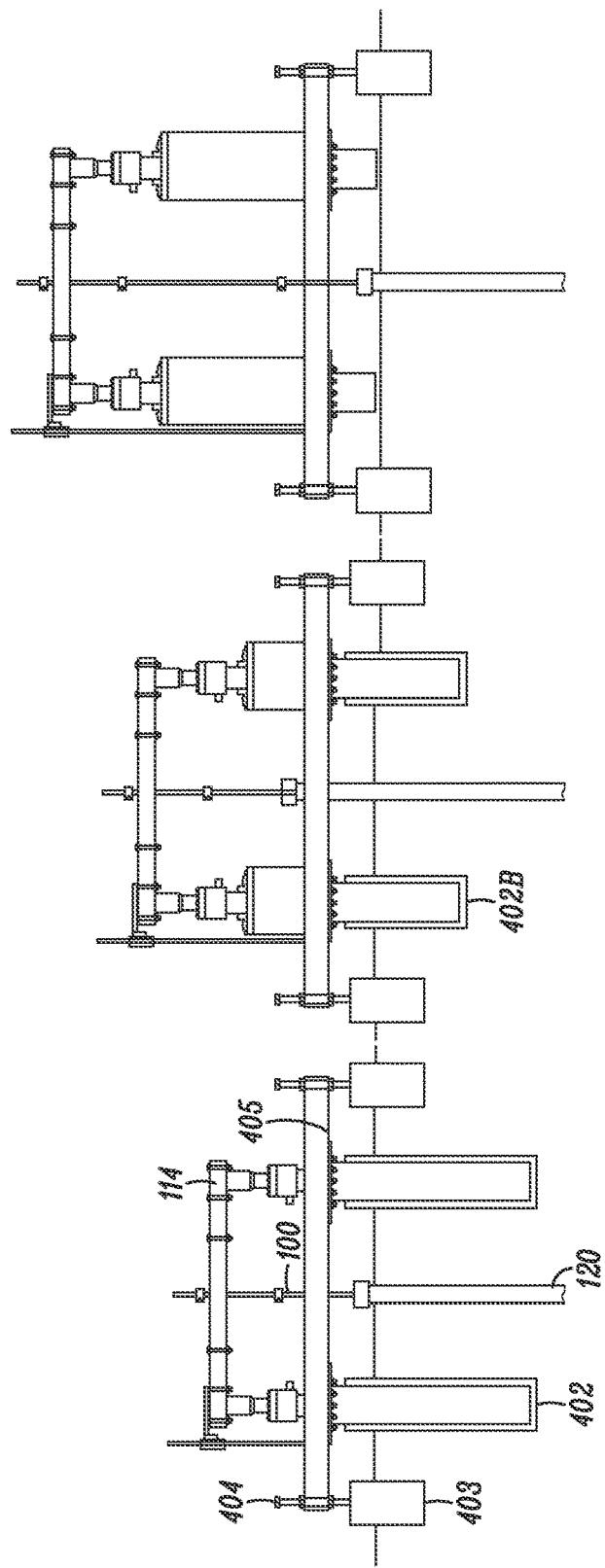
FIG. 4A illustrates a subsurface orientation of the apparatus of FIGS. 1A and 1B.
FIG. 4B illustrates a partial subsurface orientation of the apparatus of FIGS. 1A and 1B.
FIG. 4C illustrates an above surface orientation of the apparatus of FIGS. 1A and 1B.

FIG. 4A illustrates a subsurface orientation of the apparatus of FIGS. 1A and 1B. FIG. 4B illustrates a partial subsurface orientation of the apparatus of FIGS. 1A and 1B. FIG. 4C illustrates an above surface orientation of the apparatus of FIGS. 1A and 1B.

In embodiments, the pump apparatus 100 is installed over an existing well casing 120 in a number of configurations. The pump apparatus 100 may be secured over the existing well casing 120 by being attached to fixing sites 403 (e.g., precasted concrete, metal fixtures, or other sites and materials) on location proximate to the existing well casing 120 by pins 404 to a platform 405 also positioning the pump apparatus 100. The pump apparatus 100 may also be installed on separate casings 402, which are casings installed in holes on the ground proximate to the well casing 120. In an embodiment, the separate casings 402 may be made of steel or other metals or materials. The separating casings 402 are configured to fit the cylinder assemblies 112 and/or the regulators 111 of the pump apparatus 100.

Referring to FIGS. 4A-4C, various configurations of the installation of the pump apparatus 100 over the well casing 120 with respect to the separate casings 402 are disclosed. For example, referring to FIG. 4A, the separate casings 402 fully support the fitting of the cylinder assemblies 112 and/or the regulators 111 below ground. As such, only the head of the cylinder assemblies 112 and/or the regulators 111 and the cross bar 114 may be above the platform 405. Referring to FIG. 4B, the separate casings 402B has a shorter profile below ground and is only configured to fit the cylinder assemblies 112 and/or the regulators 111 partially. As such, at least a portion of the cylinder assemblies 112 and/or the regulators 111 may remain above the platform 405. Referring to FIG. 4C, there is no separate casing and the cylinder assemblies 112 and/or the regulators 111 are fully above ground.

In the configuration where the separate casings 402 may fully or partially fit the cylinder assemblies 112 and/or the regulators 111, the pump apparatus may take on a shorter height above ground, which may be advantageous as being more aesthetically pleasing (e.g., where the pump apparatus 100 is installed over a well casing 120 in a fenced urban area and may not be visible from outside the fence) or allowing more clearance above the pump apparatus 100 (e.g., where the pump is installed in an irrigated field and allows the passing of an irrigation sprinkler over the pump). In the case where the pump apparatus 100 is fully above ground, it may also be advantageous as it requires less preparation (e.g., digging the hole in the ground to place the separate casings) to install the pump. In an embodiment, the installation of a full, partial, or no separate casings may also depend on the well type, ground and soil constitution, and other factors.

Figure 5A:
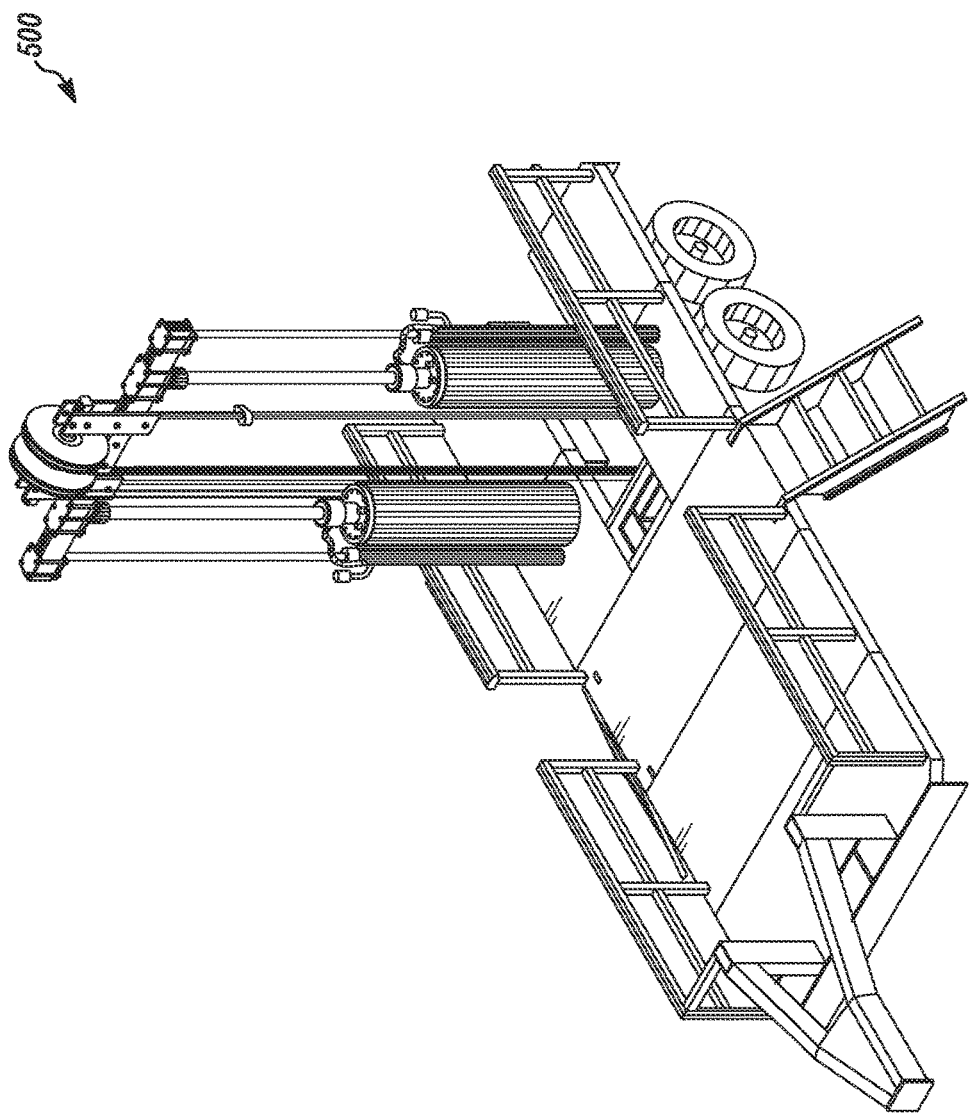
FIG. 5A illustrates an exemplary perspective view of a mobile pump apparatus for operating in a subsurface environment in a first orientation according to an embodiment of the invention.
Figure 5B:
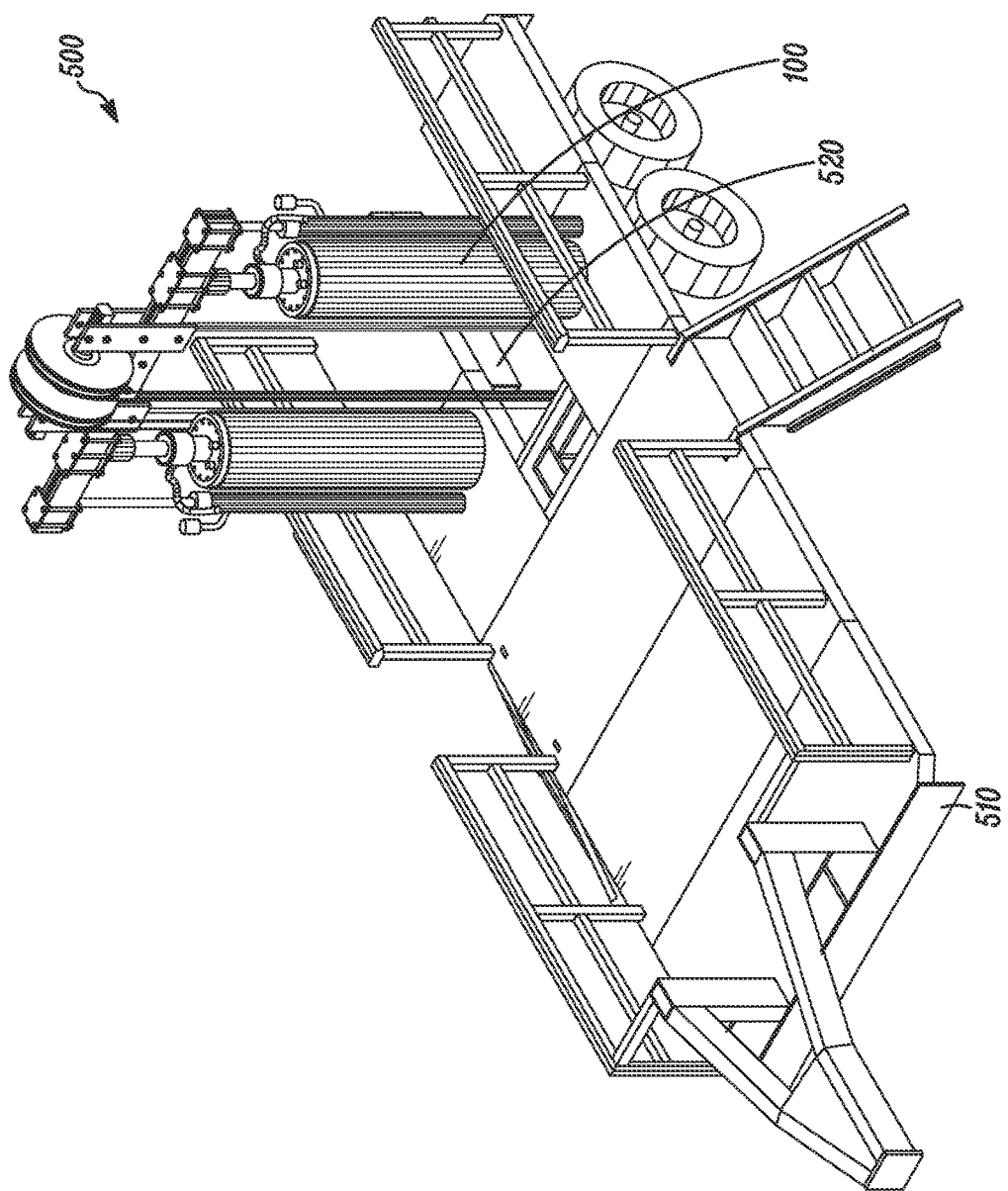
FIG. 5B illustrates an exemplary perspective view of a mobile pump apparatus for operating in a subsurface environment in a second orientation according to an embodiment of the invention.
Figure 5D:
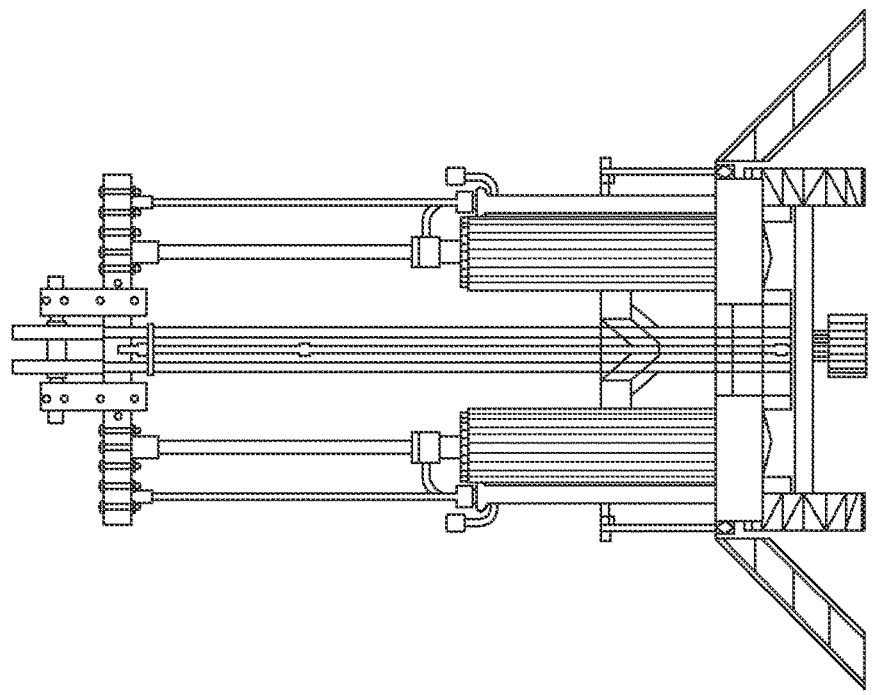
FIG. 5D illustrates an exemplary front view of a mobile pump apparatus for operating in a subsurface environment in a second orientation according to an embodiment of the invention.
Figure 5C:
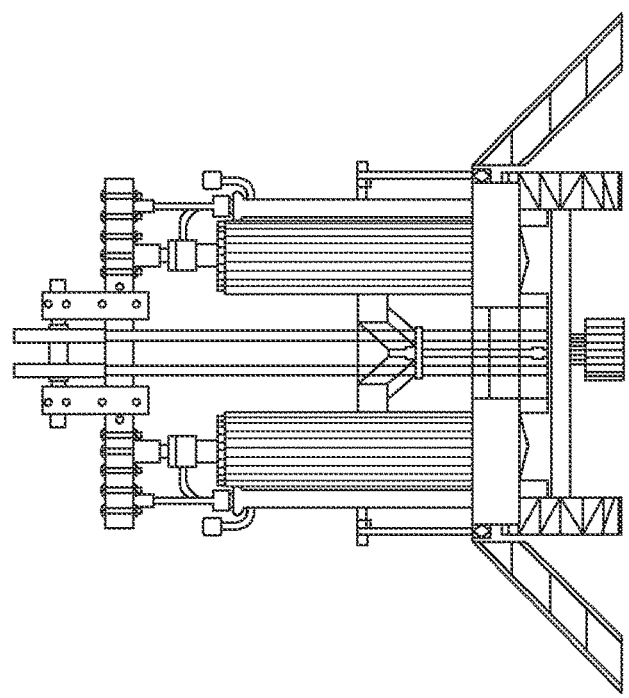
FIG. 5C illustrates an exemplary front view of a mobile pump apparatus for operating in a subsurface environment in a first orientation according to an embodiment of the invention.
Figure 5E:
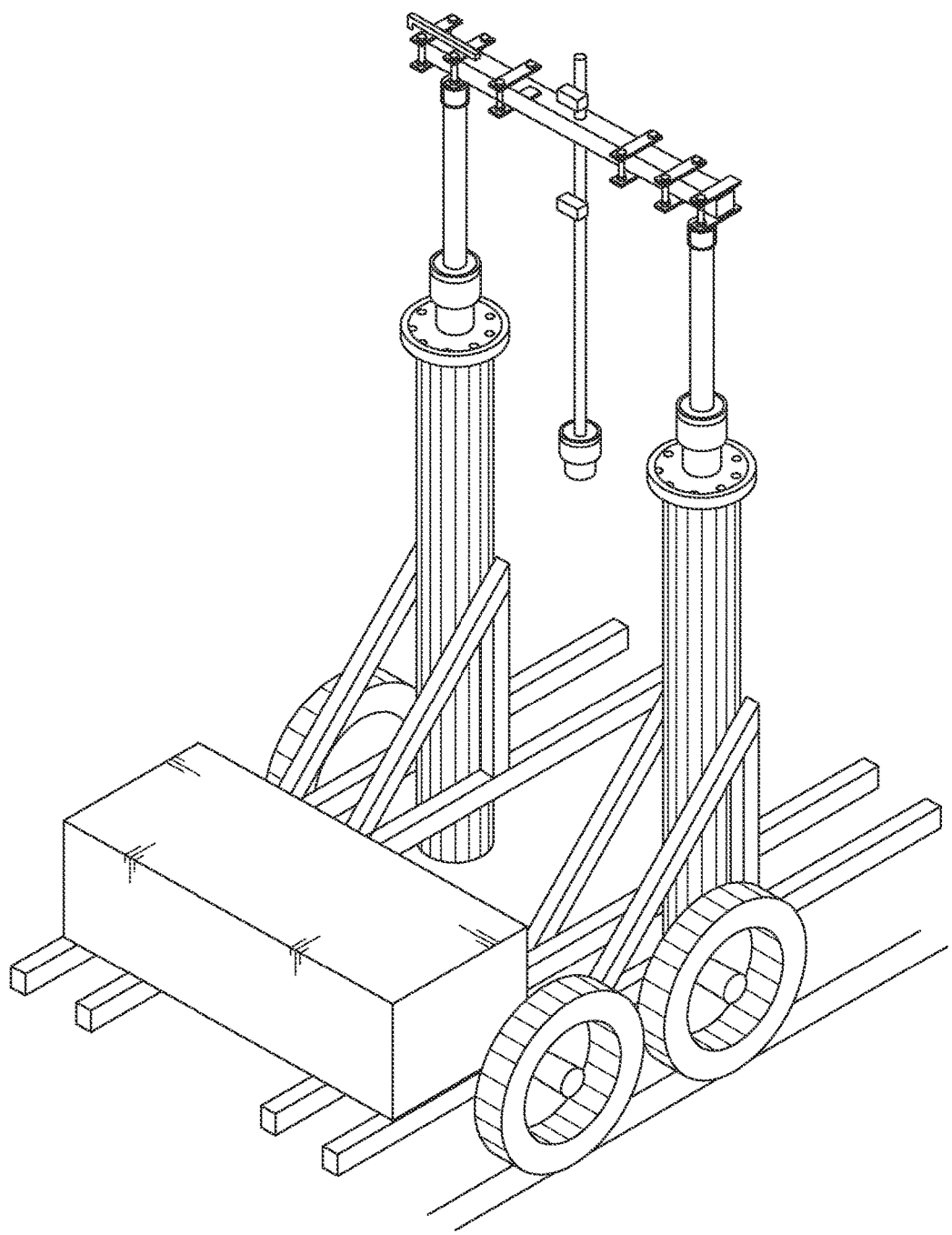
FIG. 5E illustrates an exemplary perspective view of a mobile pump apparatus for transport in a vertical orientation according to an embodiment of the invention.
Figure 5F:
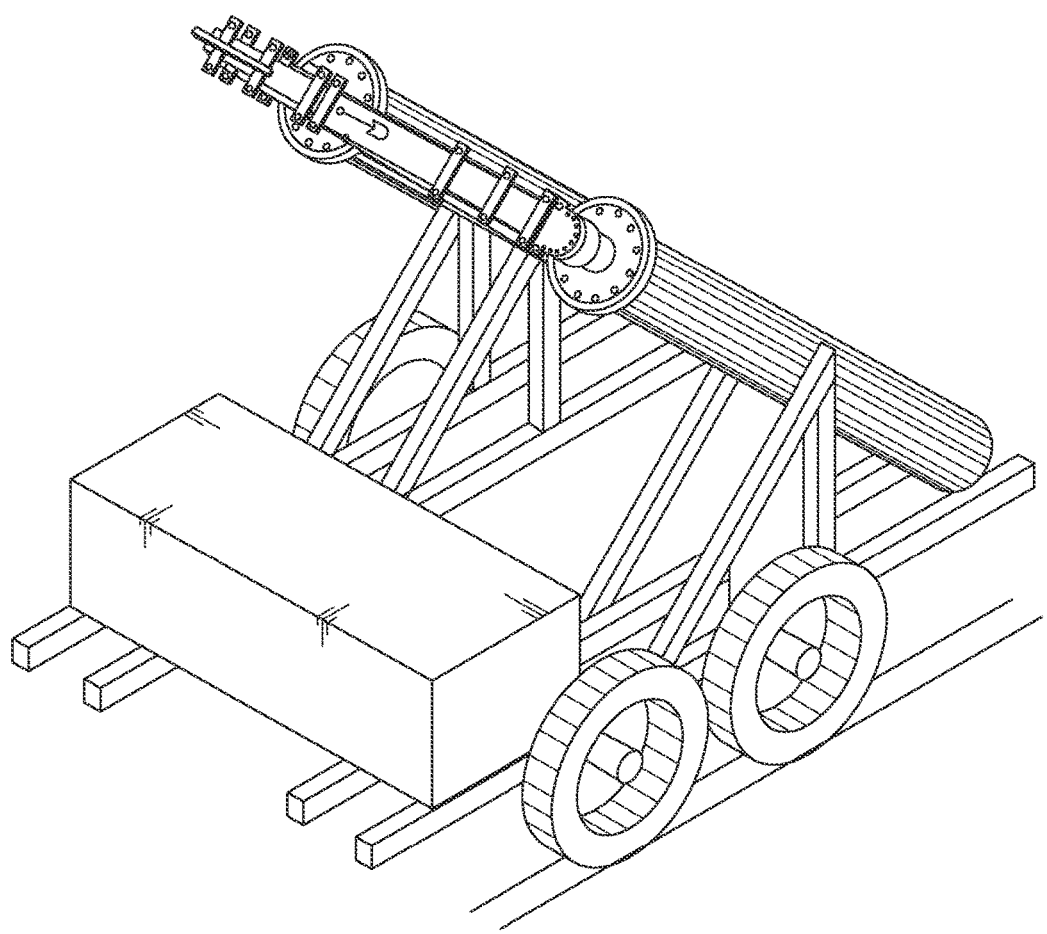
FIG. 5F illustrates an exemplary perspective view of a mobile pump apparatus for transport in a tilted orientation according to an embodiment of the invention.

FIG. 5A illustrates an exemplary perspective view of a mobile pump apparatus for operating in a subsurface environment in a first orientation according to an embodiment of the invention. FIG. 5B illustrates an exemplary perspective view of a mobile pump apparatus for operating in a subsurface environment in a second orientation according to an embodiment of the invention. FIG. 5C illustrates an exemplary front view of a mobile pump apparatus for operating in a subsurface environment in a first orientation according to an embodiment of the invention. FIG. 5D illustrates an exemplary front view of a mobile pump apparatus for operating in a subsurface environment in a second orientation according to an embodiment of the invention. FIG. 5E illustrates an exemplary perspective view of a mobile pump apparatus for transport in a vertical orientation according to an embodiment of the invention. FIG. 5F illustrates an exemplary perspective view of a mobile pump apparatus for transport in a tilted orientation according to an embodiment of the invention.

A mobile pump apparatus 500 may include a pump apparatus 100 on a trailer 510. The trailer 510 includes a cavity 520 for allowing at least the cable 115 of the pump apparatus 100 to connect to the existing well casing 120. In an embodiment, the installation of the mobile pump apparatus 500 is similar to the pump apparatus 100 (e.g., see FIGS. 4A-4C). In a preferred embodiment, no separate casing (e.g., separate casings 402) would be needed as the mobile pump apparatus may be installed to over an existing well casing (e.g., well casing 120) while staying on the trailer 510 (e.g., as a platform and as described above with respect to FIG. 4C).

Referring to FIG. 5E, the pump apparatus 100 is shown in a transport position in a vertical orientation with a retracted cable 115. Referring to FIG. 5F, the pump apparatus 100 is shown in a transport position in a tilted orientation. In an embodiment, the pump apparatus 100 in the titled orientation may by tilted at an angle less than 90 degrees (e.g., 30-60 degrees) with the plane of the trailer 510. The tilted orientation requires less vertical clearance over the vertical orientation during transport (e.g., to meet regulatory or other requirements regarding the maximum height of the payload during transport). The pump apparatus 100 in both FIGS. 5E and 5F are shown without the regulator 111.

Figure 6A:
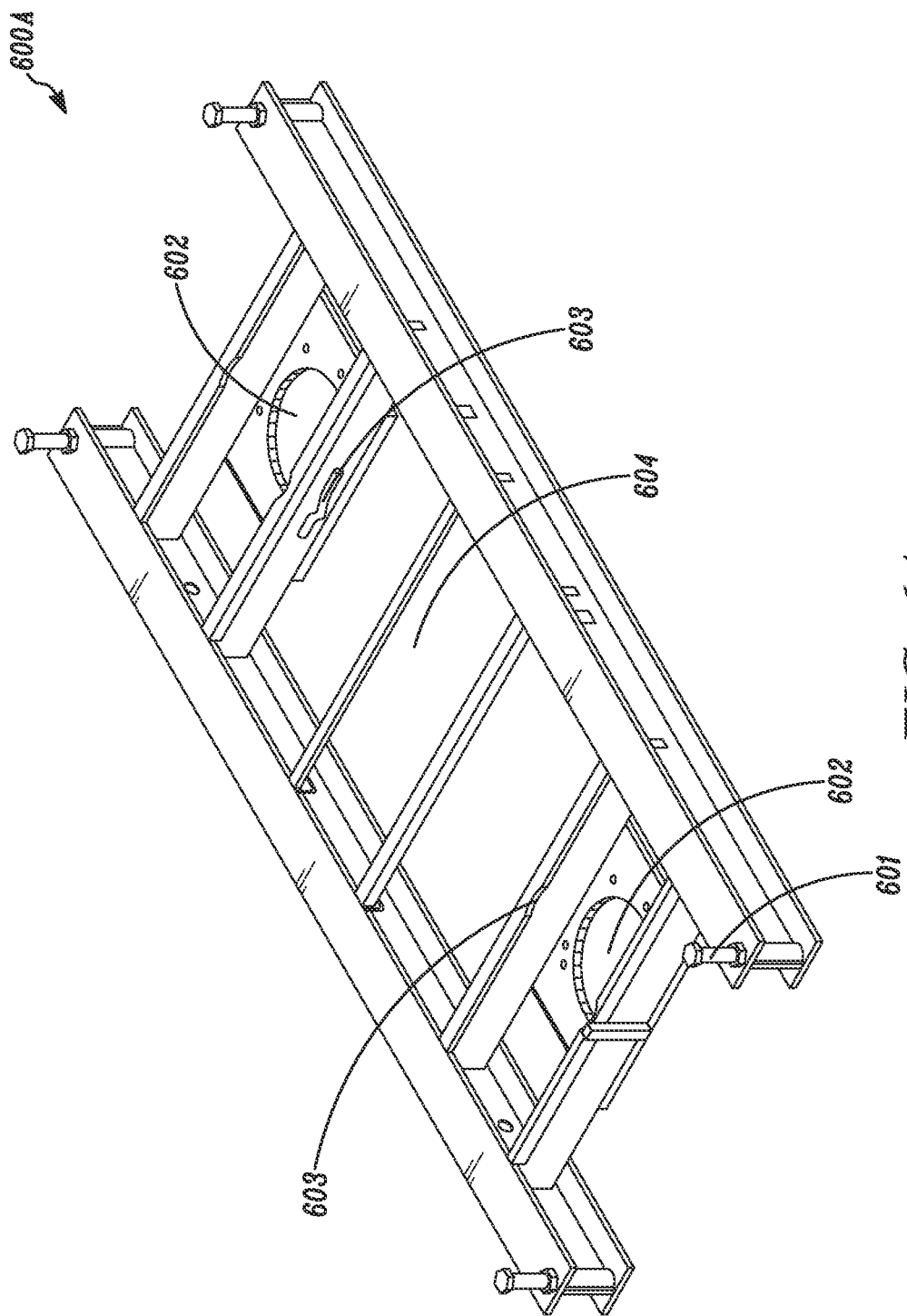
FIG. 6A illustrates an exemplary perspective view of a frame for supporting a pump apparatus according to an embodiment of the invention.
Figure 6B:
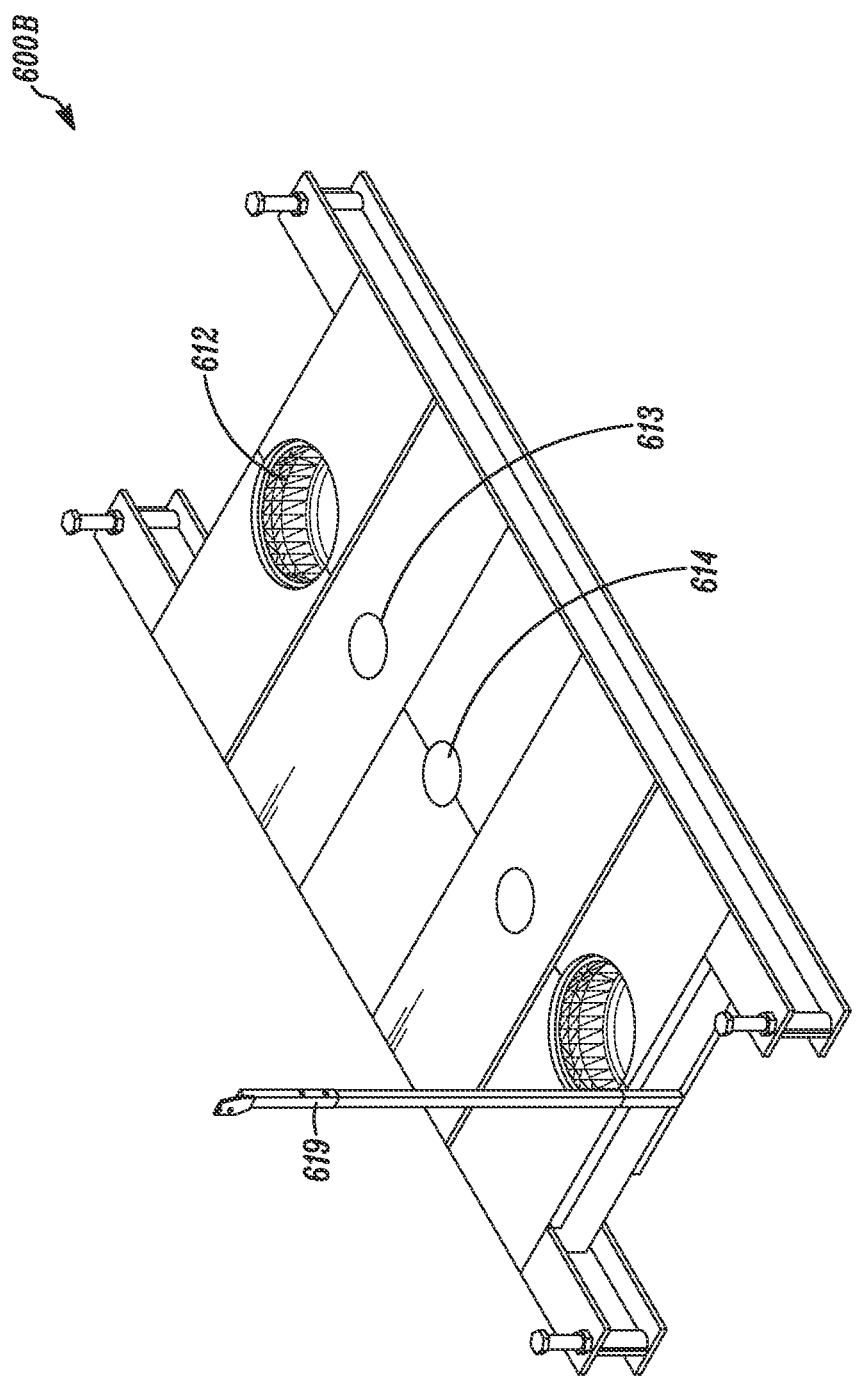
FIG. 6B illustrates an exemplary perspective view of a frame for supporting a pump apparatus according to an embodiment of the invention.

FIG. 6A illustrates an exemplary perspective view of a frame for supporting a pump apparatus according to an embodiment. FIG. 6B illustrates an exemplary perspective view of a frame for supporting a pump apparatus according to an embodiment of the invention.

Referring to FIG. 6A, frame 600A for supporting a pump apparatus 100 is made up of two horizontal beams connected by crossing beams. The beams may be secured by bolts 601 or other fastening devices and/or mechanisms (e.g., other fittings). The frame 600A further includes plates 602 for supporting the cylinder assemblies 112 and plates 603 for supporting the regulators 111. The opening 604 made by the beams allows the cable 120 to connect to an existing well casing 120 during installation. In an embodiment, the frame 600A may be used for a stationary pump unit (e.g., as illustrated in FIGS. 4A-4C). In another embodiment, the frame 600A may be placed over the trailer 510 (e.g., as illustrated in FIGS. 5A-5F).

Referring to FIG. 6B, frame 600B for supporting a pump apparatus 100 may be made up of two horizontal beams and connecting plates. The beams and plates may be secured by bolts 601 or other fastening means. The frame 600B further includes plates 612 for supporting the cylinder assemblies 112 and plates 603 for supporting the regulators 111. An opening in plate 614 allows the cable 120 to connect to an existing well casing 120 during installation. In an embodiment, the frame 600B may be used for a stationary pump unit (e.g., as illustrated in FIGS. 4A-4C). In an embodiment, the frame 600B may be placed over the trailer 510 (e.g., as illustrated in FIGS. 5A-5F).

In an embodiment, a position mount 619 may be placed on the frame 600B. The position mount 619 is configured to help guide the cross bar 114 into various height positions during operation (e.g., home position, lifted position). In a preferred embodiment, the position mount 619 may work with magnetic mechanism (e.g., magnets positioned at one or more positions along the position mount 619). For example, the position mount 619 may define a home position as the lowest position of the pump apparatus 100 (i.e., as defined by the position of the cross bar 114). When the pump apparatus 100 returns to (is lifted to) a certain height position defined as the home position, the magnetic marker detects such event and a signal may be sent to a control box, switch, or the like. For example, a switch controlling a motor for the pump apparatus 100 may switch the direction of the pump (e.g., from an upward stroke to a downward stroke) once a target height position is detected.

In an embodiment, a timer may start counting (e.g., in seconds, milliseconds, nanoseconds, or other units) the time since the switch of direction, which would indicate a distance moved in a direction for the pump apparatus 100 in order to switch the direction of the pump. For example, the pump apparatus 100 may be detected to be at the home position and switches direction. In a certain time after the pump apparatus 100 started moving in the switched direction, the pump apparatus 100 may be deemed to have traveled a certain distance and a switch of direction may occur to move the pump apparatus 100 back towards the home position.

In other embodiments, the home position may be defined at other positions (e.g., not just at the lowest position), such as the middle of the highest position of the pump apparatus 100. In another embodiment, the height and position sensor may take the form of a laser beam, light, sight, beacon, proximity, altimeter, or other position sensors as known now or may be later derived. For example, the height and position sensor may be a laser alignment system detecting when the pump apparatus 100 is at the home position or at various heights. As such, the height and position sensor may not need the position mount 619 for similar functionality in embodiments.

In another embodiment, a frame for supporting a pump apparatus 100 may be arranged in other configurations that allow for the placement and support of the cylinder assemblies 112 and regulators 111.

Figure 7A:
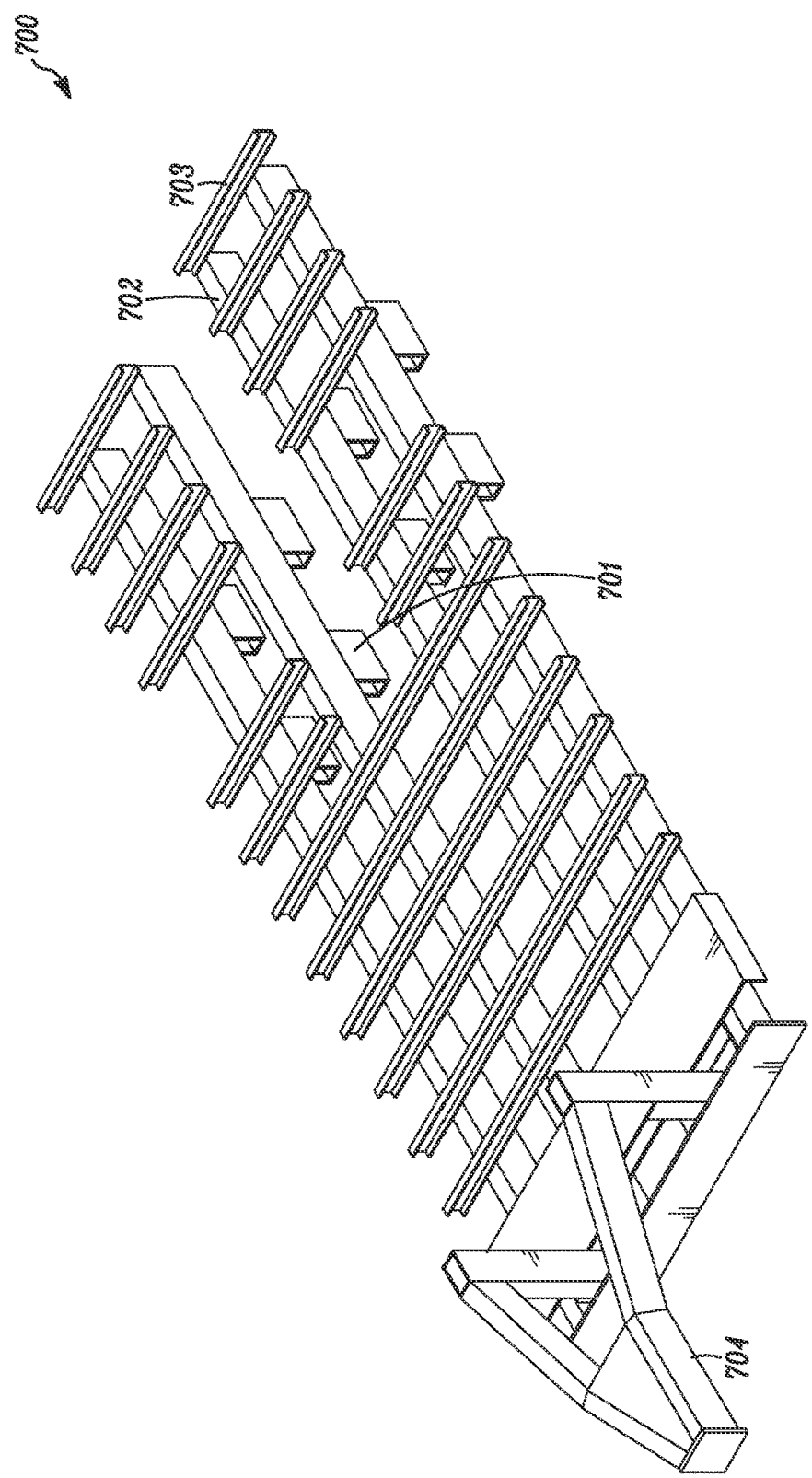
FIG. 7A illustrates an exemplary perspective view of a frame for supporting a mobile pump apparatus according to an embodiment of the invention.
Figure 7D:
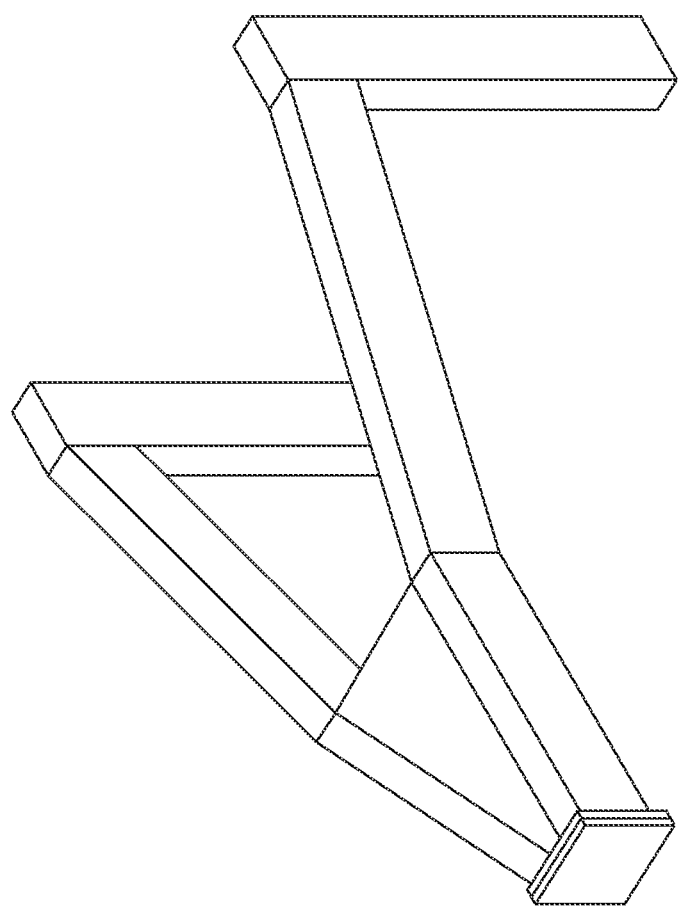
FIG. 7D illustrates an exemplary enlarged view of a component of the frame of FIG. 7A.

FIG. 7A illustrates an exemplary perspective view of a frame for supporting a mobile pump apparatus according to an embodiment of the invention. FIG. 7B illustrates an exemplary side view of the frame of FIG. 7A. FIG. 7C illustrates an exemplary top view of the frame of FIG. 7A. FIG. 7D illustrates an exemplary enlarged view of a component of the frame of FIG. 7A.

Frame 700 includes alternating I-beam or square tubing 702 and cross I-beam or square tubing 703 for supporting a pump apparatus 100. A space 701 is left open for positioning over a well casing 120 and allowing cable 115 to connect to well casing 120. Frame 700 further includes brace 704 for connecting to a trailer head for transport.

Figure 8:
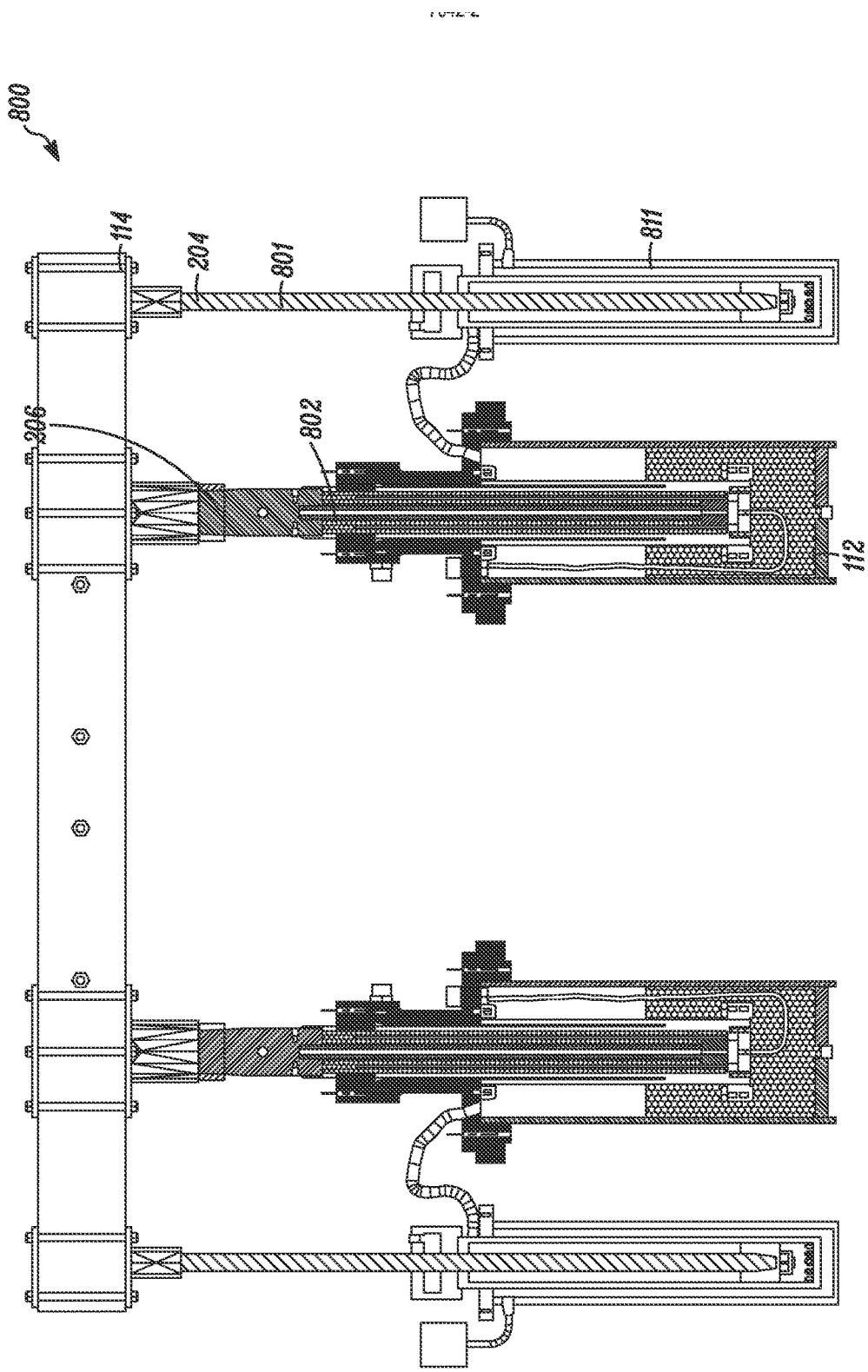
FIG. 8 illustrates an exemplary cross-sectional view of cylinder assembly and the regulator connected to cross bar according to FIGS. 1A and 1B.

FIG. 8 illustrates an exemplary cross-sectional view of the cylinder assembly and the regulator connected to cross bar according to FIGS. 1A and 1B.

Referring to FIG. 8, the cylinder assembly 112 is connected to the cross bar 114 through receiver 206 through the inner piston ram 802 of the cylinder assembly 112. The regulator 811 is connected to the cross bar 114 through receiver 204 through the piston shaft 801 of the regulator 811.

Figure 9:
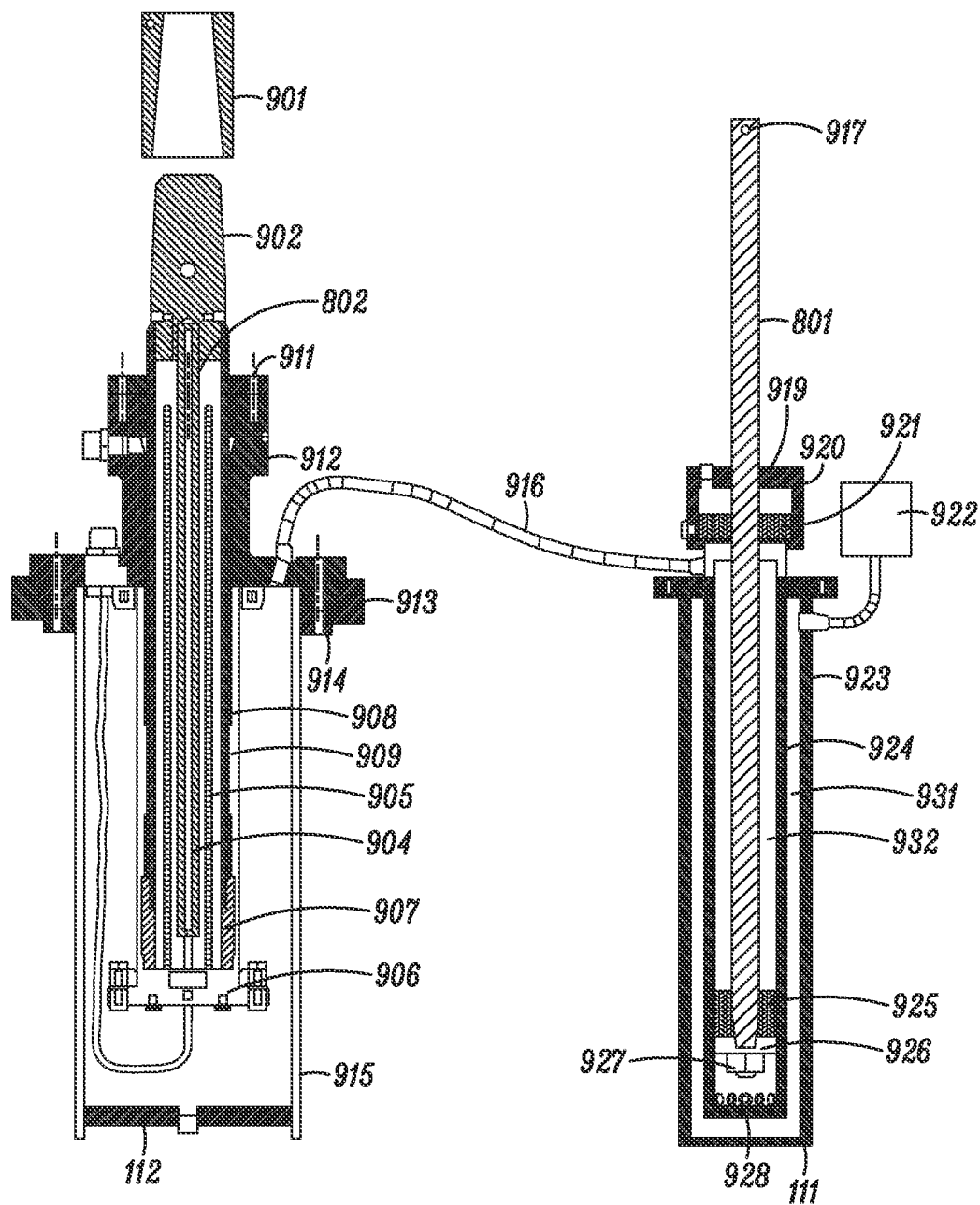
FIG. 9 illustrates an exemplary cross-sectional view of cylinder assembly and the regulator according to FIGS. 1A and 1B.

FIG. 9 illustrates an exemplary cross-sectional view of cylinder assembly and the regulator according to FIGS. 1A and 1B.

The regulator 111 includes an external casing 923. Within the external casing 923 is a nitrogen barrel/piston 924 for containing the compressed/pressurized fluid 932 (e.g., pressurized nitrogen gas according to a preferred embodiment). The space 931 between the external casing 923 and the nitrogen barrel 924 may be filled with air or other gas or fluid, which may be filtered by air filter 922.

A piston 926 separates the top portion of the nitrogen barrel 924 from the bottom portion of the nitrogen barrel. The piston 926 is connected by the piston shaft 801, which is connected to the cross bar 114 and is configured to lift the piston 926 when the cross bar 114 is lifted. The top of the piston 926 is filled with a layer of oil (or other lubricant) configured for lubrication. The piston 926 further acts to seal in the compressed/pressurized fluid 932 and the oil 925 from the bottom of the nitrogen barrel. The piston shaft 801 is connected to the piston 926 by bolts 928 or by other attachment mechanism or device.

In the bottom of the nitrogen barrel 924 are vent holes 928 for allowing the air from the space 931 to flow to the bottom of the nitrogen barrel 924. Beyond the top of the nitrogen barrel 924 is a top shaft lubrication box 920 containing oil (or other lubricant) 921 configured for lubricating the part of the piston shaft 801 that is beyond the top of the nitrogen barrel 924. The top of the top shaft lubrication box 920 includes a seal 919 that keeps the pressurized gas from escaping the cylinder 111. Optionally, the oil 921 may be pressurized to prevent leaking. The gas hose 916 connects the nitrogen barrel 924 to the cylinder assembly 112.

In a neutral position (e.g., when the pump is not moving or pumping), the compressed/pressurized fluid 932 is balanced (e.g., balancing the weight of the load, such as the pump rod in the well casing, including the weight of petroleum or other resources obtained from the well) and does not flow between the regulator 111 and the cylinder assembly 112. In operation (e.g., when the pump moves as being driven by a power source), the piston 926 is configured to move as the piston shaft 801 moves with the cross bar 114. When the piston 926 is moved upward, the compressed/pressurized fluid 932 flows from the nitrogen barrel 924 to the cylinder assembly 112. The space at the bottom of the nitrogen barrel 924 created by the upward moving piston 926 is filled by free air from space 931. When the piston 926 is moved downward, there is a reversal of the compressed/pressurized fluid 932 flow (e.g., the compressed/pressurized fluid 932 flows from the cylinder assembly 112 to the nitrogen barrel 924 and free air is pushed back into the space 931 through the vent holes 927).

The cylinder assembly 112 is further discussed with respect to FIG. 10 below.

Figure 10:
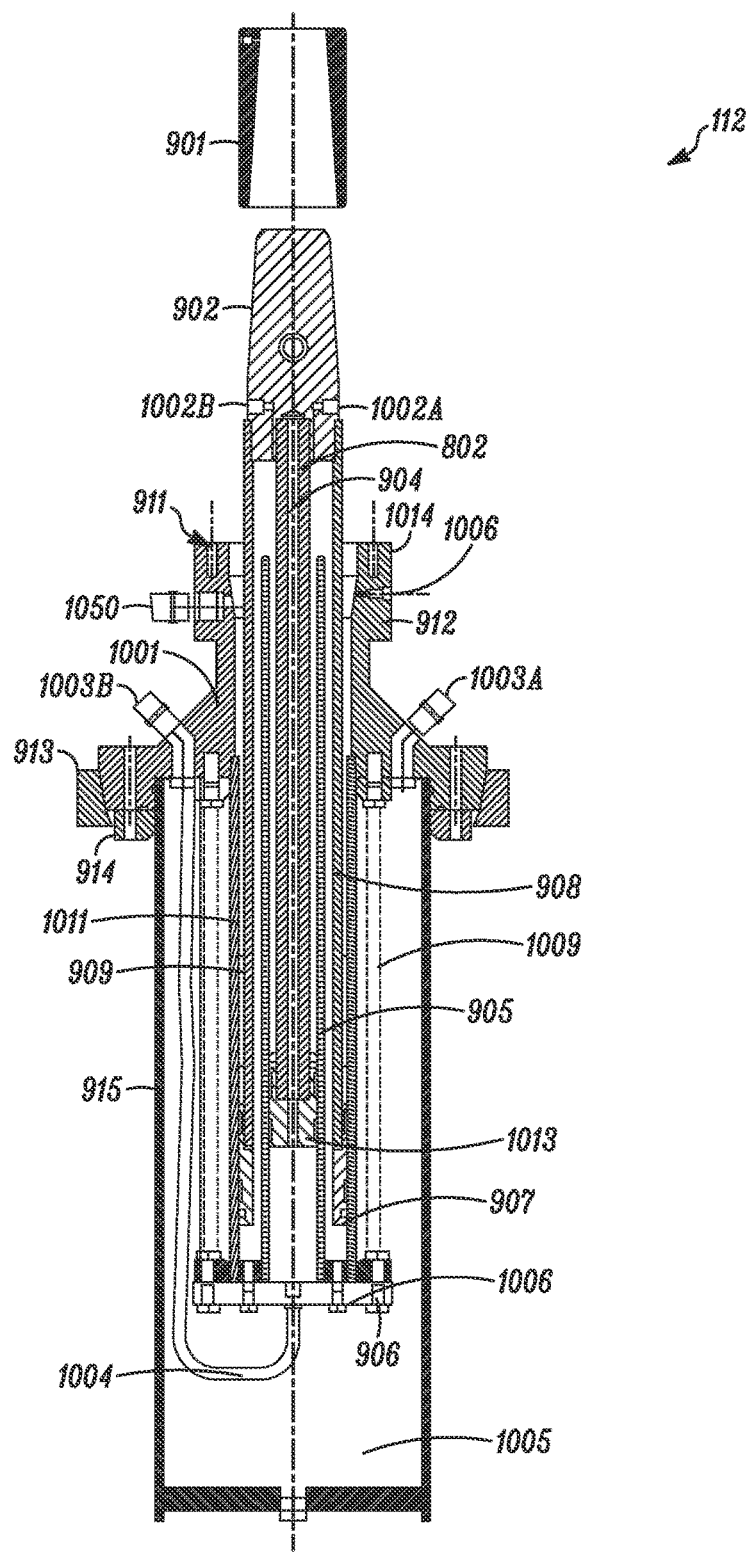
FIG. 10 illustrates an enlarged exemplary cross-sectional view of the cylinder assembly according to FIG. 9.

FIG. 10 illustrates an enlarged exemplary cross-sectional view of the cylinder assembly according to FIG. 9.

Cylinder assembly 112 includes an inner piston ram 802 configured for connecting with the cross bar 114. In an embodiment, the inner piston ram 802 has an enlarged upper end 902, which may have a tapered upper edge. In an embodiment, the enlarged upper end 902 may be configured to fit into a tubular receiver 901, of which the interior wall of the tubular receiver 901 may be tapered for securely receiving the enlarged upper end 902 within the tapered upper edge. In an embodiment, the top of the tubular receiver 901 may be connected (e.g., welded or attached by other method or mechanism) to the cross bar 114 and serves as the receiver 206 for connecting the cylinder assembly 112 to the cross bar 114.

The inner piston ram 802 is aligned in the inner smaller diameter piston shaft 905 and is connected by a piston end 1013 at the end of the inner piston ram 802. In an embodiment, the inner piston ram 802 may have a hollowed space 904 along the longitudinal axis of the inner piston ram 802 to allow the flow of gas (or fluid) through the inner piston ram 802. Air bleeders 1002A and 1002B may be placed in the enlarged upper end 902 to allow gas (or fluid) to vent from the hollowed inner piston ram 802 (the hollowed space 904) to release tension in the case of some build-up of gas (or fluid) within the hollowed space 904.

The piston end 1013 may also include a vent to allow the flow of compressed/pressurized gas (fluid) from the piston end 1013 to the inner smaller diameter piston shaft 905 beneath the inner piston ram 802. The bottom of the inner smaller diameter piston shaft 905 may be connected to a pipe 1004 for facilitating the flow of gas (e.g., free air) between a port 1003B and the bottom of the inner smaller diameter piston shaft 905.

The outer piston ram 908 encloses the piston tube 905 and is connected to the bottom of the enlarged upper end 902 at the top of the outer piston ram 908. A sleeve spacer 909 may be fitted between the outer piston ram 908 and the large diameter cylinder barrel 1011, which is further connected to an alignment ring 913 at the top of the large diameter cylinder barrel 1011. As such, the sleeve spacer 909 spaces the outer piston ram 908 and the large diameter cylinder barrel 1011. The bottom of outer piston ram 908 may include a piston end 907.

The cylinder assembly 112 is enclosed by an outer concentric cylinder (or outer nitrogen over oil barrel) 915, which may be connected at the top to the alignment ring 913. The space 1005 formed by the interior of the outer concentric cylinder 915 may be filled with compressed/pressurized gas (fluid) from a port 1003A that is connected to the pipe 1004 and may facilitate gas (fluid) flow to and from regulator 111 by gas hose 916 through port 1003A. The bottom of the outer piston ram 908 includes air vents 906 for facilitating the flow of the compressed/pressurized gas (fluid) to and from the space 1005 and into the interior of the larger diameter piston tube 908.

In an embodiment, the air vents 906 are located on a cylinder end 1006, which may be secured (e.g., by screw, bolt, and other attachment/connection mechanism or method) to the larger diameter cylinder barrel 1011 and inner smaller diameter piston shaft 905. In another embodiment, the outer concentric cylinder 915 may also be secured to the cylinder end 1006 (e.g., by long bolts, screws, or other attachment/connection mechanism or method). The bolt and long bolt securing mechanism include advantages as will be further described below with respect to FIGS. 22A and 22B.

A port 1050 is used for the flow of hydraulic fluid to and from an external control configured in using the hydraulic fluid to direct the upward and downward action of the cylinder assembly 114.

Figure 11A:
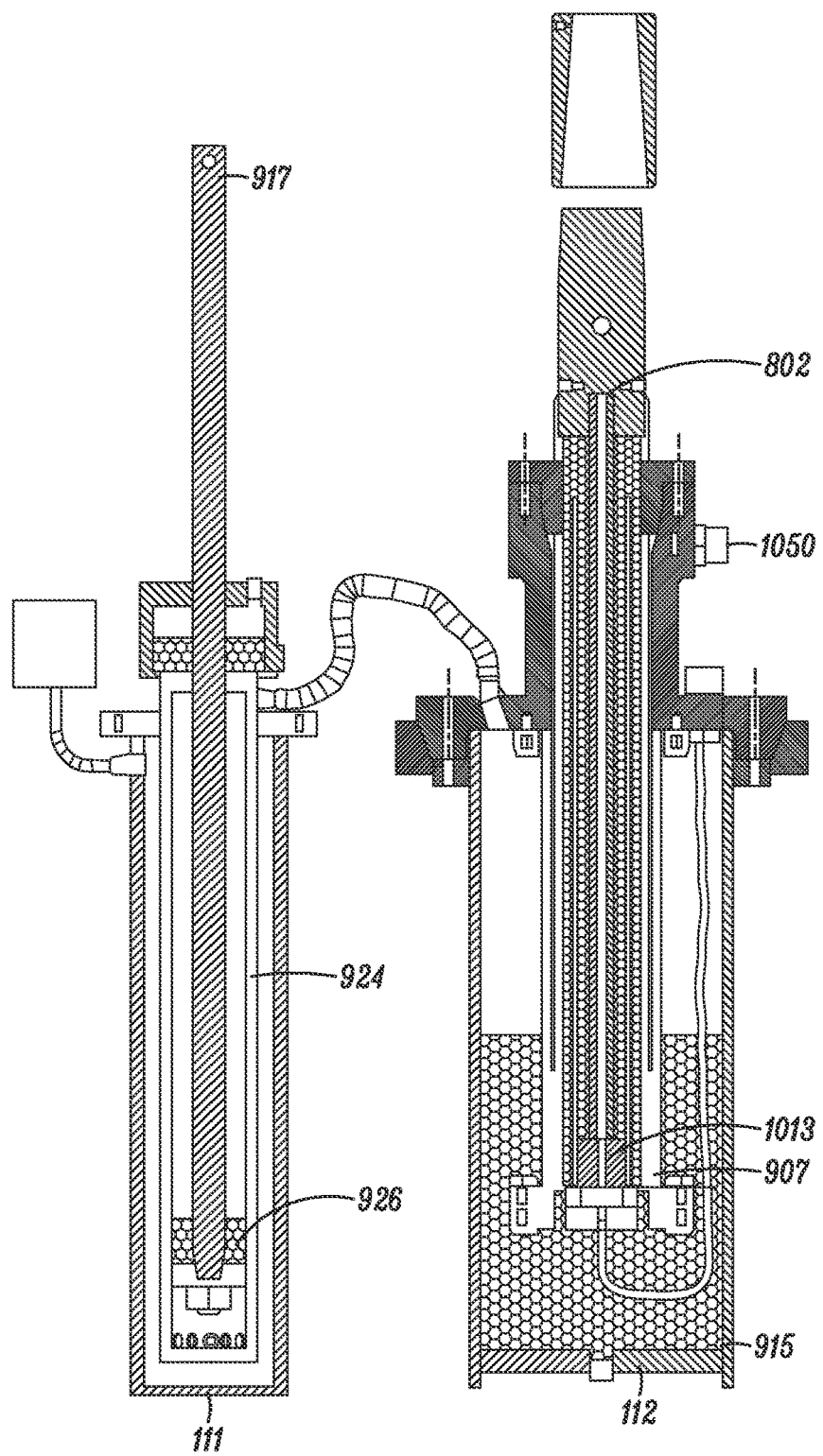
FIG. 11A illustrates an exemplary cross-sectional view of the cylinder assembly being illustrated in FIG. 8 at the completion of a downstroke or home position.

FIG. 11A illustrates an exemplary cross-sectional view of the cylinder assembly being illustrated in FIG. 8 at the completion of a down stroke or home position.

In a configuration, at the down stroke position, the piston 926 of the regulator 111 is at a relatively low position. As such, the volume of the compressed/pressurized gas (fluid) within the nitrogen barrel 924 is relatively larger. In complement to this, the piston end 907 of the outer piston ram 908 is at a relatively low position. As such, the volume of the compressed/pressurized gas (fluid) within the space (shown as not shaded in FIG. 11A) created by the outer piston ram 908 (and the large diameter cylinder barrel 1011) is relatively smaller. Further, the outer concentric cylinder 915 may be filled with enough oil (or other fluid and/or lubricant) at the bottom such that the oil fills the space not covered by the pressurized gas (shown as shaded in FIG. 11B). In one view, practically, the compressed/pressurized gas (fluid) may be considered stored in the regulator 111 when the pump apparatus 100 is at down stroke position.

In an embodiment, hydraulic fluid is configured to enter the cylinder assembly 112 from port 1050 and to depress (push down) the piston end 907 to the down stroke position. This action also leads to the depression (pushing down) of the piston 917 of the regulator 111 by the connection of both the piston 917 and the inner piston ram 802 to the cross bar 114, which is also depressed (pushed downward) to the down stroke position.

Figure 11B:
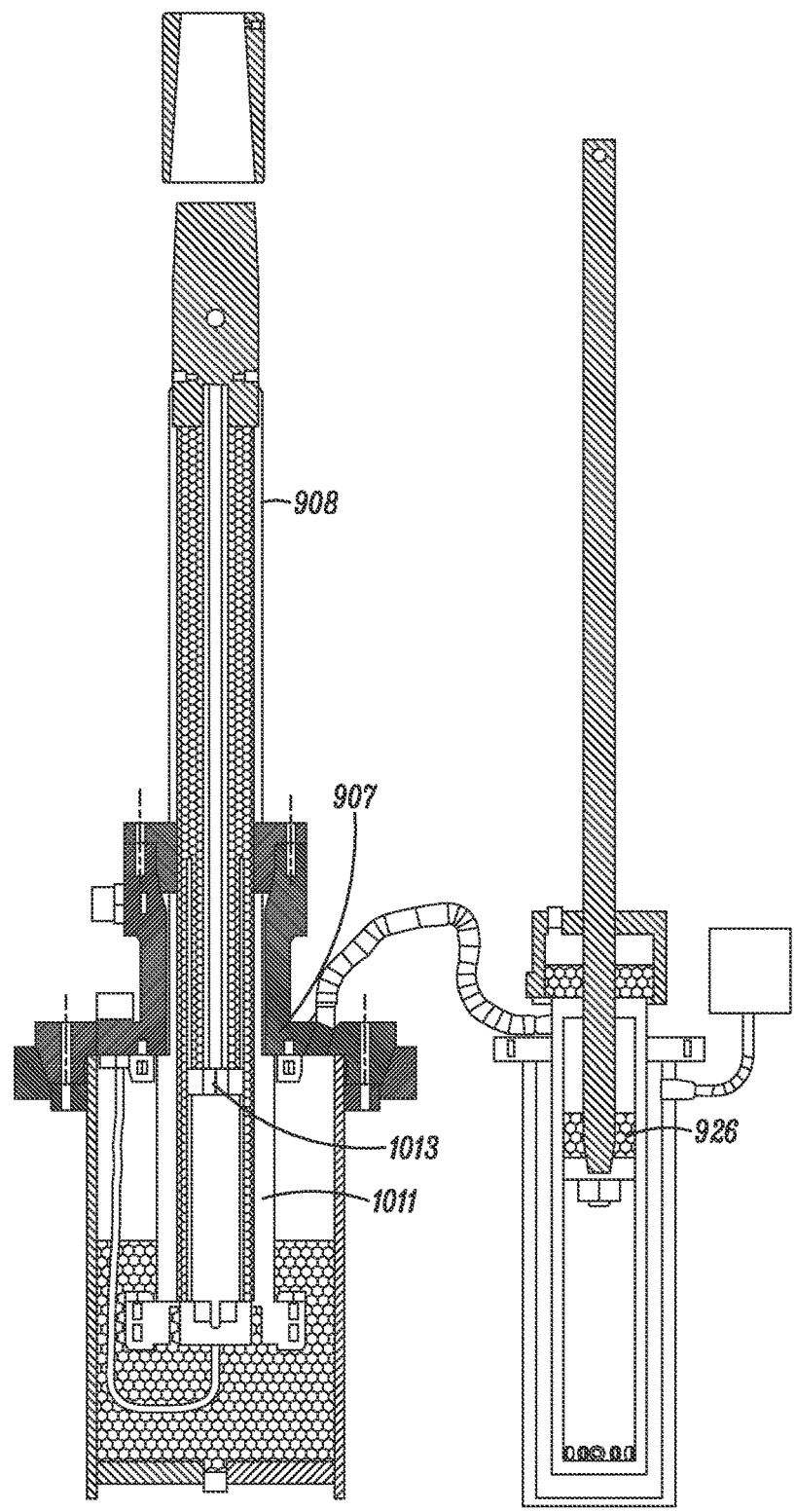
FIG. 11B illustrates an exemplary cross-sectional view of the cylinder assembly being illustrated in FIG. 8 at the completion of an upstroke or raised position.

FIG. 11B illustrates an exemplary cross-sectional view of the cylinder assembly being illustrated in FIG. 8 at the completion of an upstroke or raised position.

At the up stroke position, the piston 926 of the regulator 111 is at a relatively high position. As such, the volume of the compressed/pressurized gas (fluid) within the nitrogen barrel 924 is relatively small. In complement to this, the piston end 907 of the outer piston ram 908 is at a relatively high position. As such, the volume of the compressed/pressurized gas (fluid) within the space (shown as shaded in FIG. 11B) created by the outer piston ram 908 (and the large diameter cylinder barrel 1011) is relatively larger. As such, the volume of the compressed/pressurized gas (fluid) within the space (shown as not shaded in FIG. 11B) created by the outer piston ram 908 (and the large diameter cylinder barrel 1011) is relatively smaller.

Further, the outer concentric cylinder 915 may be filled with enough oil (or other fluid and/or lubricant) at the bottom such that the oil fills the space not covered by the compressed/pressurized gas (fluid). In one view, practically, the compressed/pressurized gas (fluid) is stored in the regulator 111 and is released to the cylinder when the pump apparatus 100 is at up stroke position. In an embodiment, the spaces beneath the piston 926 and the piston end 1013 created by the up stroke may be filled by free air as discussed above with respect to FIGS. 9-10.

In an embodiment, hydraulic fluid leaves the cylinder assembly 112 from port 1050 and pulls up the piston end 907 to the up stroke position. This action also pulls up the piston 917 of the regulator 111 by the connection of both the piston 917 and the inner piston ram 802 to the cross bar 114, which is also pulled upward to the up stroke position.

With reference to both FIGS. 11A-11B, it is noted that in the downstoke position (e.g., the position with respect to FIG. 11A), both the piston 917 of the regulator 111 and the piston rams 802 and 908 of the cylinder assembly 112 are at a down position. In an embodiment, this downstoke position would correspond to an "up" position of the connected pump rod 118 (e.g., the pump rod 118 being at its high position inside the well casing 120 due to the cable 115 being pulled by the downstoke). However, in the upstoke position (e.g., the position with respect to FIG. 11B), both the piston 917 of the regulator 111 and the piston rams 802 and 908 of the cylinder assembly 112 are at an up position. In an embodiment, this upstoke position would correspond to a "down" position of the connected pump rod 118 (e.g., the pump rod 118 being at its low position inside the well casing 120 due to the cable 115 being released by the upstoke).

As such, it is noted that, in a preferred embodiment, the pump rod 118 would be counterbalanced by the piston 917 and the piston rams 802 and 908 (and other components of the pump apparatus 100), being that the pump rod 118 would be up when the piston 917 and the piston rams 802 and 908 would be down, and vice versa. In the preferred embodiment, the compressed/pressurized gas (fluid) is would be calibrated/pressurized to a pressure that works as a neutral counterbalancing medium (e.g., accounting for the unbalanced weight (e.g., weight differences) and other parameters between the pump rod 118 and the piston rams 802 and 908). For example, the pressure of the compressed/pressurized gas (fluid) would be at a level that would to bear and balance the load (e.g., the unbalanced weight or weight difference as discussed above) at the available volume of the space in the pump apparatus 100 for the compressed/pressurized gas (fluid).

In an embodiment, the available volume for the compressed/pressurized gas (fluid) would remain substantially unchanged even through the movements of the relevant parts of the pump apparatus 100 (e.g., the space created by the nitrogen barrel 924 of the regulator 111 would offset the space of the piston tube 905 being occupied by the piston ram 802 in the down position). In another embodiment, the compressed/pressurized gas (fluid) would be pressurized to a pressure such that the pressure would be able to sustain and balance the load (e.g., the unbalanced weight) when the compressed/pressurized gas (fluid) would be occupying the largest available volume (which would lower the pressure of the fluid) in the space of the pump apparatus 100.

In an embodiment, the pressure calibration of the compressed/pressurized gas (fluid) may be performed during the setup of the pump apparatus 100 (e.g., when the pump apparatus 100 is first installed to the well casing 120). For example, when the various components of the pump apparatus 100 (including the pump rod 118) is connected, the compressed/pressurized gas (fluid) may be gradually introduced until enough pressure is built up in the space of the pump apparatus 100 for the compressed/pressurized gas (fluid) independently to support the load (e.g., the pump rod 118 could stay stationary without any other support mechanism).

It is further noted the pressure required for the compress/pressurized gas (fluid) may be a function of at least the unbalanced weight as discussed above. As such, in an embodiment, the pressure needed by the compressed/pressurized gas (fluid) may be determined (calculated) or looked up based on known and/or standard weight of the various components (e.g., the pump rod 118).

Figure 12A:
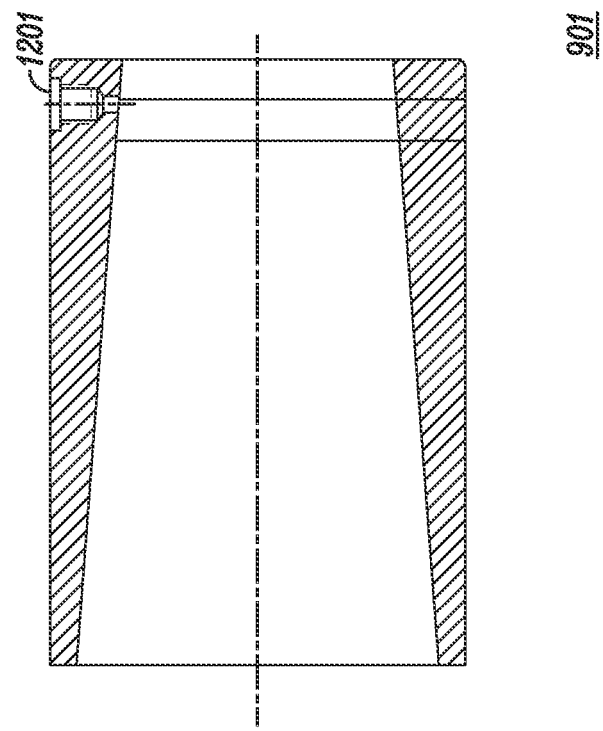
FIGS. 12A and 12B illustrate exemplary cross-sectional views of a tubular receiver of the cylinder assembly of FIG. 10.
Figure 12B:
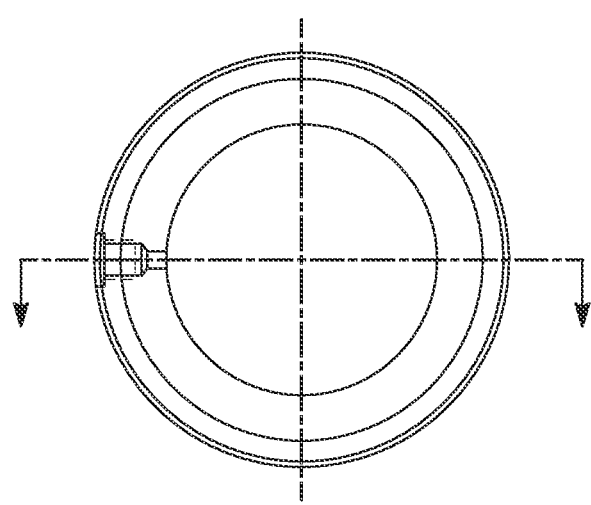

FIGS. 12A and 12B illustrate exemplary cross-sectional views of a tubular receiver of the cylinder assembly of FIG. 10.

The tubular receiver 901 may also include a grease fitting 1201 for the insertion of the enlarged upper end 902 into the tubular receiver 901.

FIGS. 13A and 13B illustrate exemplary cross-sectional views of an enlarged upper end of the cylinder assembly of FIG. 10.

The enlarged upper end 902 may also include receiver 1303 for receiving the inner piston ram 802. Receiver 1303 and an outer edge of the lower portion of the enlarged upper end 902 may include threads 1304 for receiving (e.g., screwing-on fit, or other types of fitting or attachment mechanism or method such as compression fit) the inner piston ram 802 (in the receiver 1303) and the outer piston ram 908 (on the outer edge of the lower portion of the enlarged upper end 902).

Receiver 1303 is connected to air bleeder 1002A by a space 1305 such that gas (fluid) build-up in the hollowed space 904 of the inner piston ram 802 may be released by the air bleeders 1002A through the space 1305 when the inner piston ram 802 is connected to the receiver 1303. The air bleeder 1002B is connected to channel 1307 such that gas (fluid) build-up in the outer piston ram 908 can be released by the air bleeders 1002B. In an embodiment, the torque down hole 1306 may be used to aid the turning during the tightening of the enlarged upper end 902.

FIGS. 14A and 14B illustrate exemplary cross-sectional views of an inner piston ram of the cylinder assembly of FIG. 10.

The inner piston ram 802 is shown with the hollowed space 904 along the longitudinal direction of the inner piston ram 802 for releasing trapped gas (fluid).

FIGS. 15A and 15B illustrate exemplary cross-sectional views of a piston end of the cylinder assembly of FIG. 10.

The piston end 1013 is configured to receive the bottom end of the inner piston ram 802 in the receiver 1501. The piston end 1013 also includes a hollowed space 1504 for allowing gas (fluid) flow (e.g., free air) to and from the space under the piston end 1013, which is connected to the regulator 111 through the pipe 1004 and the port 1003B. The piston end 1013 is configured to move within the inner smaller diameter piston shaft 905 as the inner piston ram 802 moves upward and downward along with the cross bar 114.

In an embodiment, the wear bands 1503 may be placed at the sides of the piston end 1013 and are configured to reduce the friction of the contact between the wear bands 1503 and the interior sides of the inner smaller diameter piston shaft 905. In an embodiment, the wear bands 1503 may be made of fiber or other materials. In a further embodiment, the wear bands 1503 and the interior sides of the inner smaller diameter piston shaft 905 may be lubricated with oil (or other lubricant). The oil and the gas (fluid) may be sealed with the seals 1502. In an embodiment, the seal may be made of a poly-seal (or other sealing) material.

FIGS. 16A, 16B, and 16C illustrate exemplary cross-sectional views of an inner smaller diameter piston shaft of the cylinder assembly of FIG. 10.

In an embodiment, the lower face of the inner smaller diameter piston shaft 905 may include a bolt down flange 1602. The bolt down flange 1602 includes one or more openings 1604 for securing (e.g., by welding, bolting, or other attachment/connection mechanism and/or method) the inner smaller diameter piston shaft 905 to the cylinder end 1006. The bolt down flange further includes one or more openings 1603 that allows the gas (fluid) to flow into the inner smaller diameter piston shaft 905.

FIGS. 17A and 17B illustrate exemplary cross-sectional views of a piston end of the cylinder assembly of FIG. 10.

The piston end 907 is configured to receive the bottom end of outer piston ram 908 at the top portion of the piston end 907. The interior of the top portion of the piston end 907 may include threads 1702 for securing (e.g., screwing-in, compression fit, or other attachment/connection mechanism and/or method) the outer piston ram 908. The piston end 907 is configured to move within the outer piston ram 908 as the inner piston ram 802 moves upward and downward along with the cross bar 114. The wear bands 1701 are placed at the sides of the piston end 1013 and to reduce the friction of the contact between the wear bands 1503 and the interior sides of the outer piston ram 908. In an embodiment, the wear bands 1503 may be made of fiber or other materials. In a further embodiment, the wear bands 1503 and the interior sides of the outer piston ram 908 may be lubricated with oil (or other lubricant). The oil and the pressurized gas may be sealed with the seals 1703. In an embodiment, the seal may be made of a poly-seal (or other sealing) material.

Figure 18:
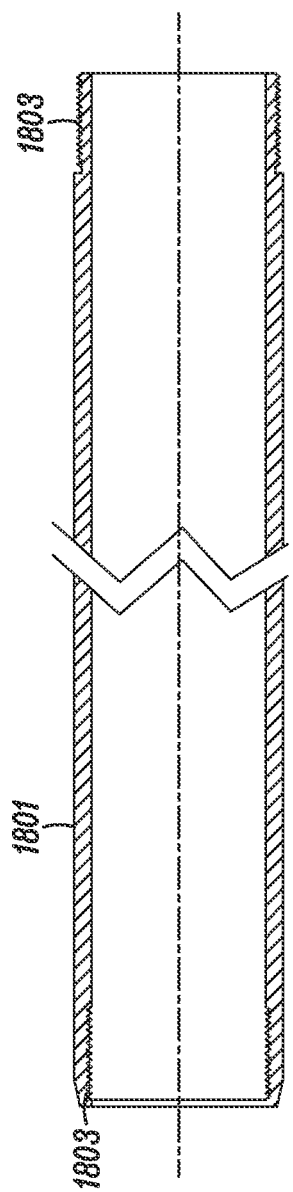
FIG. 18 illustrates an exemplary cross-sectional view of an outer piston ram of the cylinder assembly of FIG. 10.

FIG. 18 illustrates an exemplary cross-sectional view of an outer piston ram of the cylinder assembly of FIG. 10.

The outer piston ram 908 is configured to connect with the bottom of the enlarged upper end 902 at the top of the outer piston ram 908. The outer piston ram 908 is configured to connect with the top portion of the piston end 907 at the bottom of the outer piston ram 908. The relevant portions of the outer piston ram 908 for the connections may be threaded 1803 (e.g., for a screw-in attachment/connection).

Figure 19B:
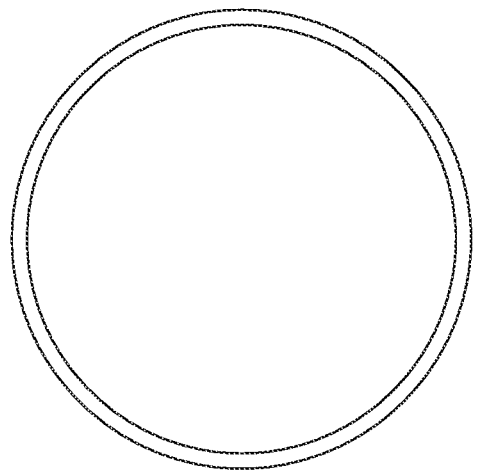
FIGS. 19A and 19B illustrate exemplary cross-sectional views of a sleeve spacer of the cylinder assembly of FIG. 10.
Figure 19A:
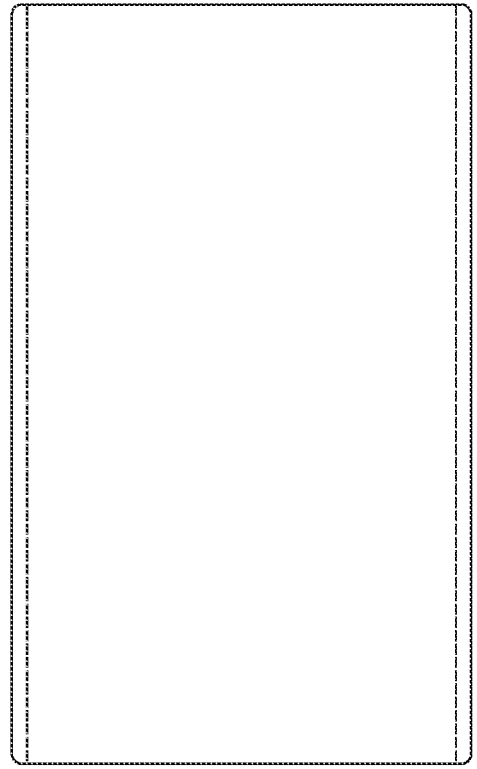

FIGS. 19A and 19B illustrate exemplary cross-sectional views of a sleeve spacer of the cylinder assembly of FIG. 10.

Sleeve spacer 909 may be used to keep the outer piston ram 908 rigid and to stop further upward travel of the outer piston ram 908. In an embodiment, the sleeve space 909 may be made of steel, metal, or other materials.

FIGS. 20A and 20B illustrate exemplary cross-sectional views of a large diameter cylinder barrel of the cylinder assembly of FIG. 10.

A large diameter cylinder barrel 1011 is configured to be connected to the alignment ring 913 at the top of a large diameter cylinder barrel 1011 and to the cylinder head 1011 at the bottom of the large diameter cylinder barrel 1011. In an embodiment, the bottom face of the large diameter cylinder barrel 1011 includes one or more bolt holes 2001 for bolting the bottom face to the cylinder barrel 1011. The bottom face of a large diameter cylinder barrel 1011 may also include one or more pusher holes 2002. In an embodiment, flanges 2004 may be welded to the exterior wall of a large diameter cylinder barrel 1011 for bolts for connecting the large diameter cylinder barrel 1011 to the various components of cylinder assembly 112, including long bolt 1009. The bolt securing mechanism includes advantages which will be further discussed below with respect to FIGS. 22A and 22B.

Figure 21B:
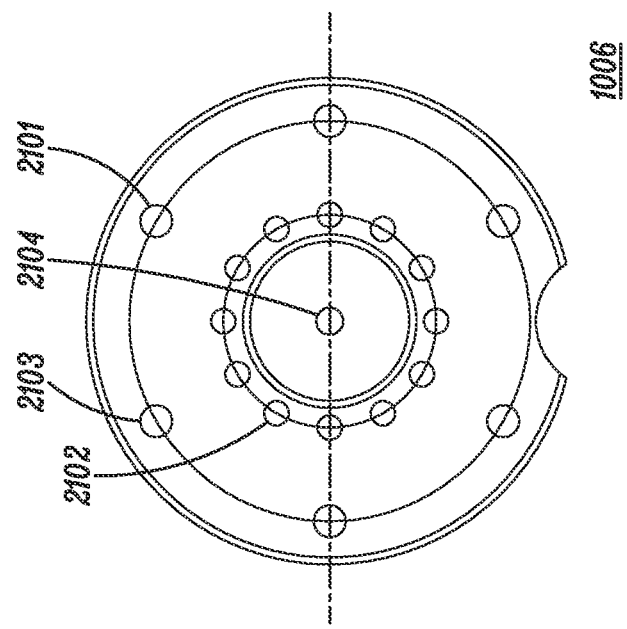
FIGS. 21A and 21B illustrate exemplary cross-sectional views of a cylinder end of the cylinder assembly of FIG. 10.
Figure 21A:
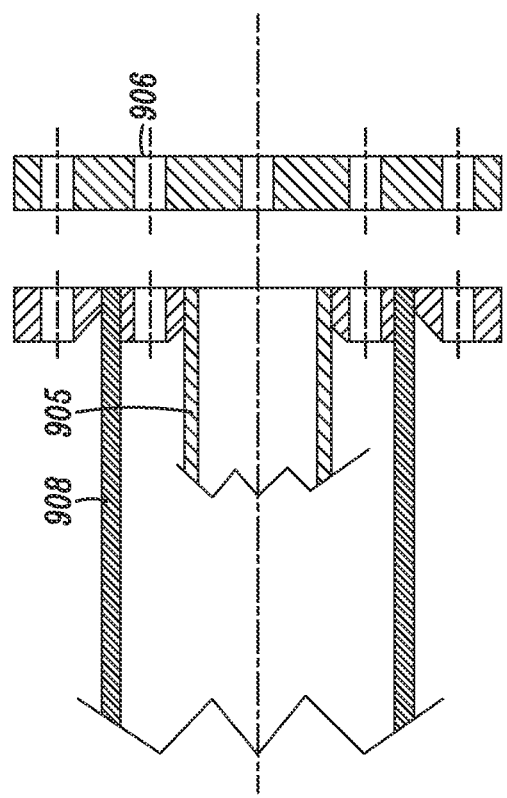

FIGS. 21A and 21B illustrate exemplary cross-sectional views of a cylinder end of the cylinder assembly of FIG. 10.

The cylinder end 1006 includes a center gas hole 2104 and a number of bolt and gas holes 2101-2103 aligned in two concentric circles. The center gas hole 2104 is configured to align with the bottom of the inner smaller diameter piston shaft 905 for facilitating gas (fluid) flow from the pipe 1004. The bolt holes 2103 and the gas holes 2102 of the inner concentric circle are configured to align and be secured with the air holes 1603 and the bolt holes 1604 of the bolt down flange 1602 of the inner smaller diameter piston shaft 905. The air channel created by the alignment of the air holes 1603 and the air holes 2102 are configured as the air vents 906 that allows gas (fluid) to enter and exit the inner smaller diameter piston shaft 905.

In an embodiment, the bolt holes 2101 of the outer concentric circle are configured to align and be secured with the bolt holes 2101 of the outer piston ram 908. In an embodiment, this bolt securing mechanism as shown in FIGS. 21A and 21B differentiates from a screw-in mechanism disclosed with respect to U.S. Pat. Nos. 7,600,563 and 7,490,674, in that the screw-in mechanism pulls (or stretches) long parts such as the outer piston ram 908 at installation, effectively "egg-shaping" the parts. This pulling (or stretching) has undesirable features such as the parts being difficult to come loose at uninstallation of the pump apparatus 100 (e.g., for maintenance, transport, or other purposes). Also, screwed-in parts being immersed in oil (or lubricant) and may become loose and unscrewed during operation, thus affecting the safety and/or reliability of the pump apparatus 100. Another advantage of the bolt securing mechanism is an overall reduction in time of installation of the pump apparatus 100.

Figure 22B:
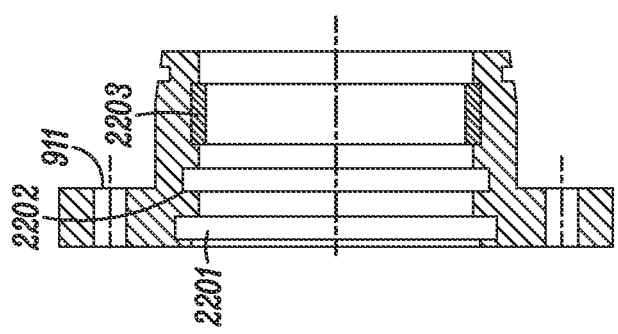
FIGS. 22A and 22B illustrate exemplary cross-sectional views of a cylinder head of the cylinder assembly of FIG. 10.
Figure 22A:
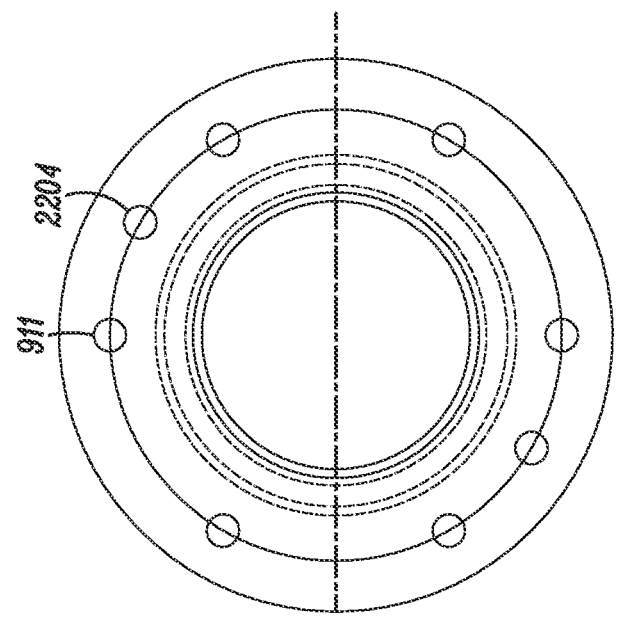

FIGS. 22A and 22B illustrate exemplary cross-sectional views of a cylinder head of the cylinder assembly of FIG. 10.

According to an embodiment, the cylinder head 1014 for securing the top of the cylinder assembly 112 includes bolt holes 911 for being secured to the rest of the cylinder assembly 112 and pusher holes 2204. The cylinder head 1014 may further include the dust seal 2201, the oil seal 2202, and the wear bands 2203. In an embodiment, the oil seal 2202 may be made of poly or other materials; the wear bands 2203 may be made of nylon, fiber, or other materials.

Figure 23B:
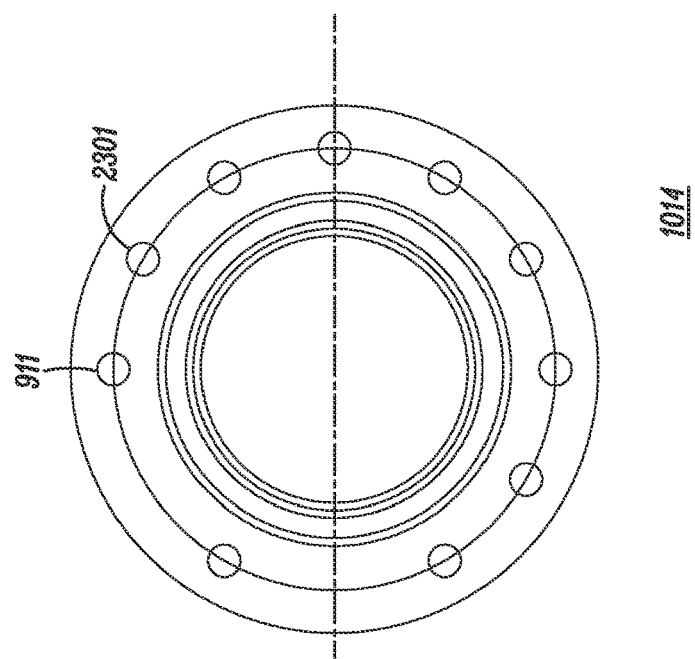
FIGS. 23A and 23B illustrate exemplary cross-sectional views of a cylinder head of the cylinder assembly of FIG. 10.
Figure 23A:
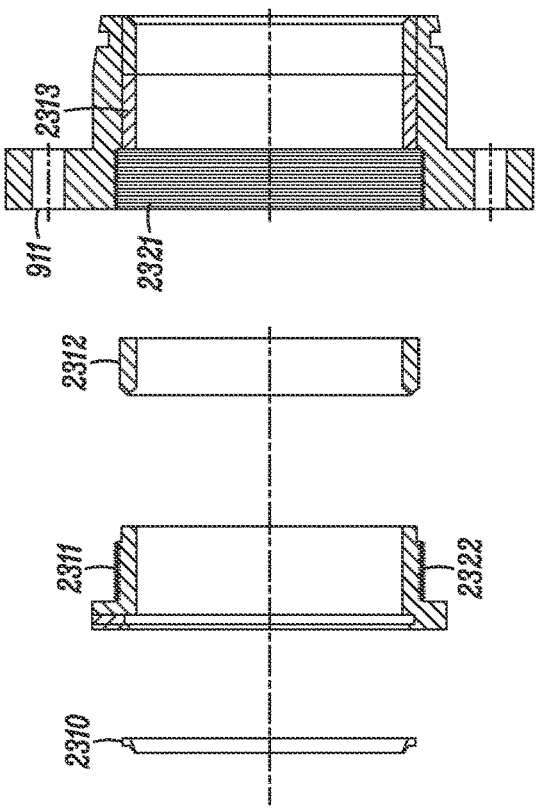

FIGS. 23A and 23B illustrate exemplary cross-sectional views of a cylinder head of the cylinder assembly of FIG. 10.

According to another embodiment, the cylinder head 1014 for securing the top of the cylinder assembly 112 includes bolt holes 911 for being secured to the rest of the cylinder assembly 112 and pusher holes 2301. The cylinder head 1014 further includes the chevron packings 2313 and the threads 2321, which may be used for assembling the wear band 2312, the brass unit 2311 with connecting threads 2322, and capped with a dust seal 2310. The chevron packings 2313 may be of Teflon, wax, thermo plastic, rope, or other types of seals and seals leaking oil (or lubricant) by furthering tightening of the chevron packing. The bolt securing mechanism includes advantages as discussed above with respect to FIG. 22.

Figure 24A:
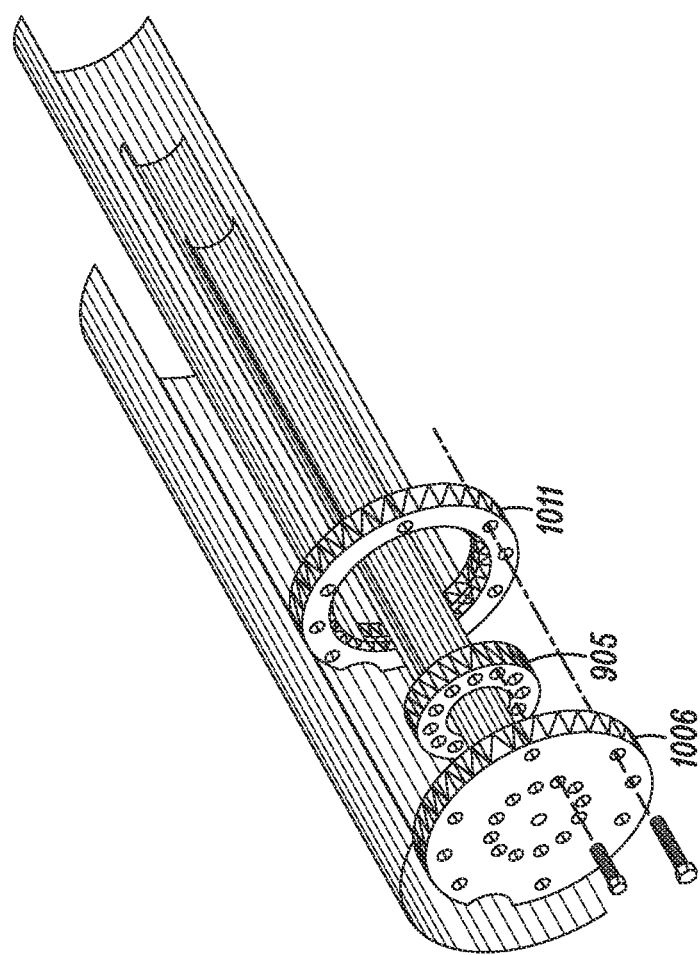
FIGS. 24A, 24B, and 24C illustrate exemplary three-dimensional assembly views of a cylinder end of the cylinder assembly of FIG. 10.
Figure 24B:
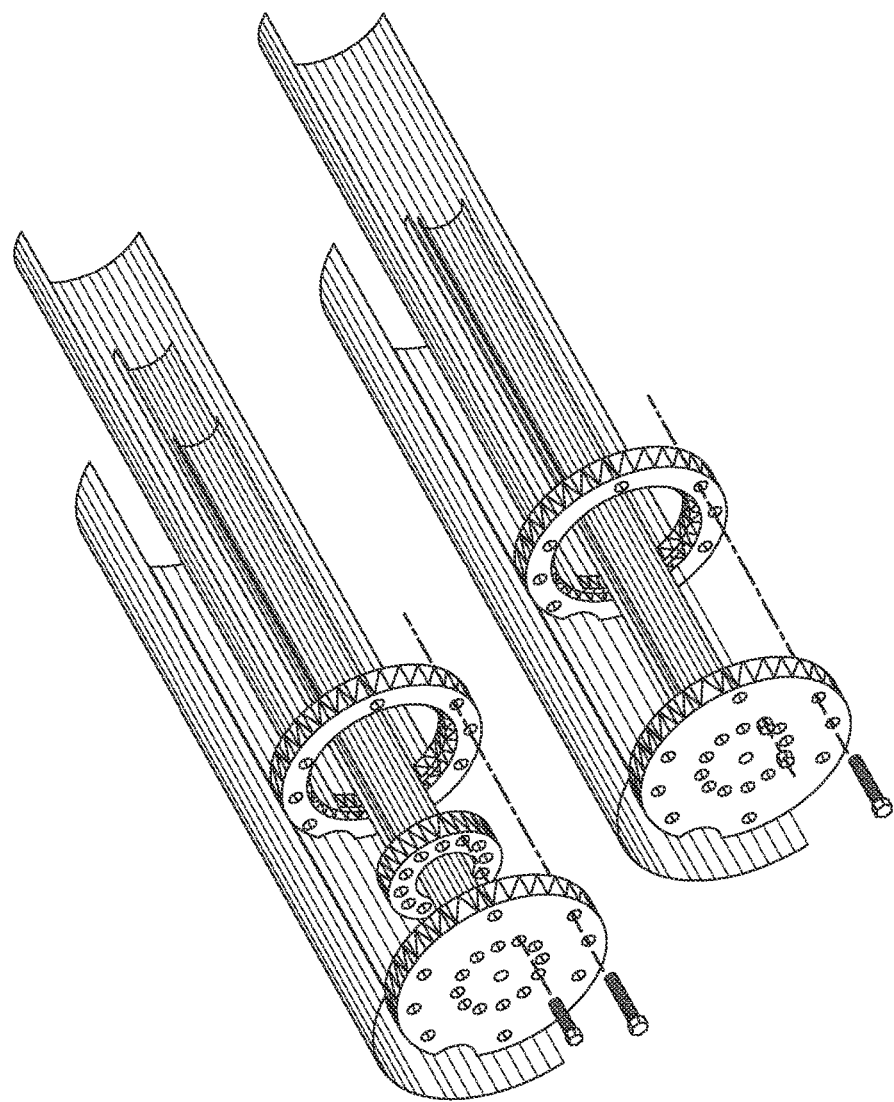
Figure 24C:
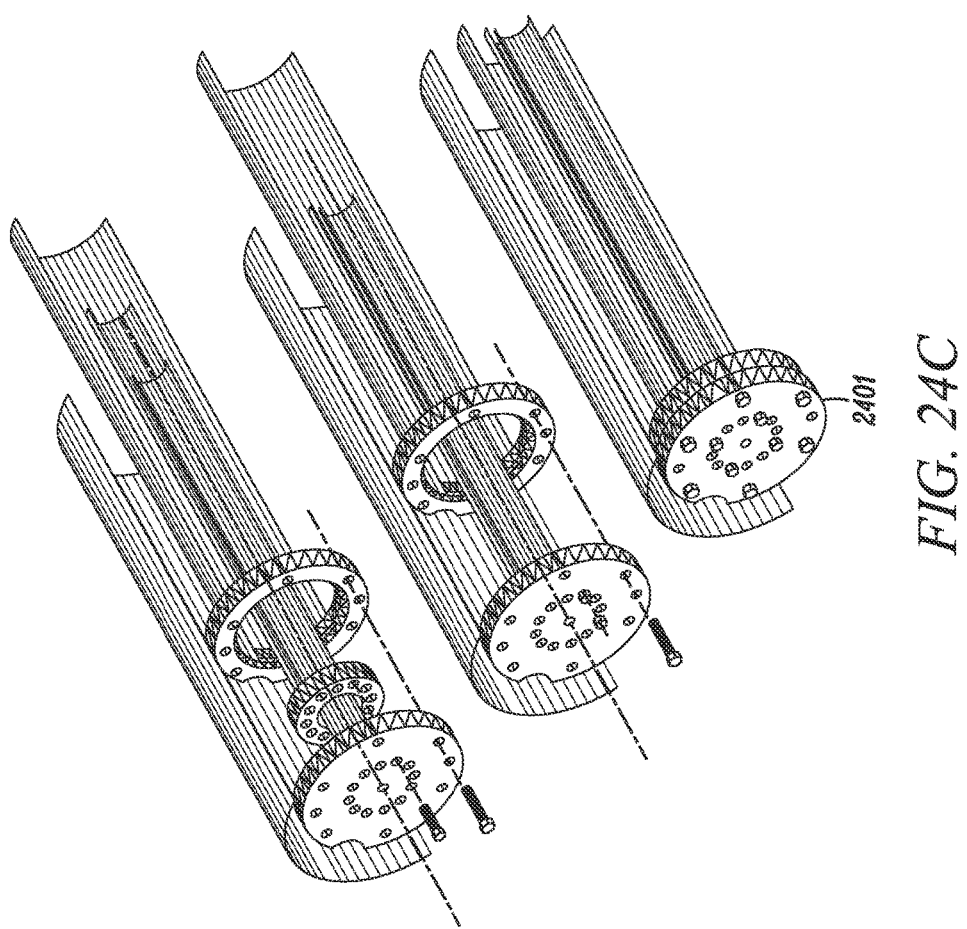

FIGS. 24A, 24B, and 24C illustrate exemplary three-dimensional assembly views of a cylinder head of the cylinder assembly of FIG. 10.

According to an embodiment, the cylinder end 1006 may be assembled with the bottom end of the inner smaller diameter piston shaft 905 and the bottom end of the large diameter cylinder barrel 1011. The cylinder end 1006 may be first secured (e.g., bolted) with the bottom end of the inner smaller diameter piston shaft 905. The bottom end of the large diameter cylinder barrel 1011 may then be secured (e.g., bolted) with the cylinder head 1006. As the ring feature of the bottom of a large diameter cylinder barrel 1011 is hollowed and fit the size of the bottom of the inner smaller diameter piston shaft 905, the resulting assembly 2401 contains two levels of the cylinder end 1006 and the bottom of the large diameter cylinder barrel 1011 when viewed from an exterior vantage point.

FIGS. 25A and 25B illustrate exemplary cross-sectional views of an outer concentric barrel of the cylinder assembly of FIG. 10.

Outer cylinder barrel 908 includes a bolt hole 2502 on a flange 2503 welded at a top portion of the outer cylinder barrel 908. The bolt hole 2502 is used to connect the outer cylinder barrel 908 to the rest of the cylinder assembly 112.

Figure 26:
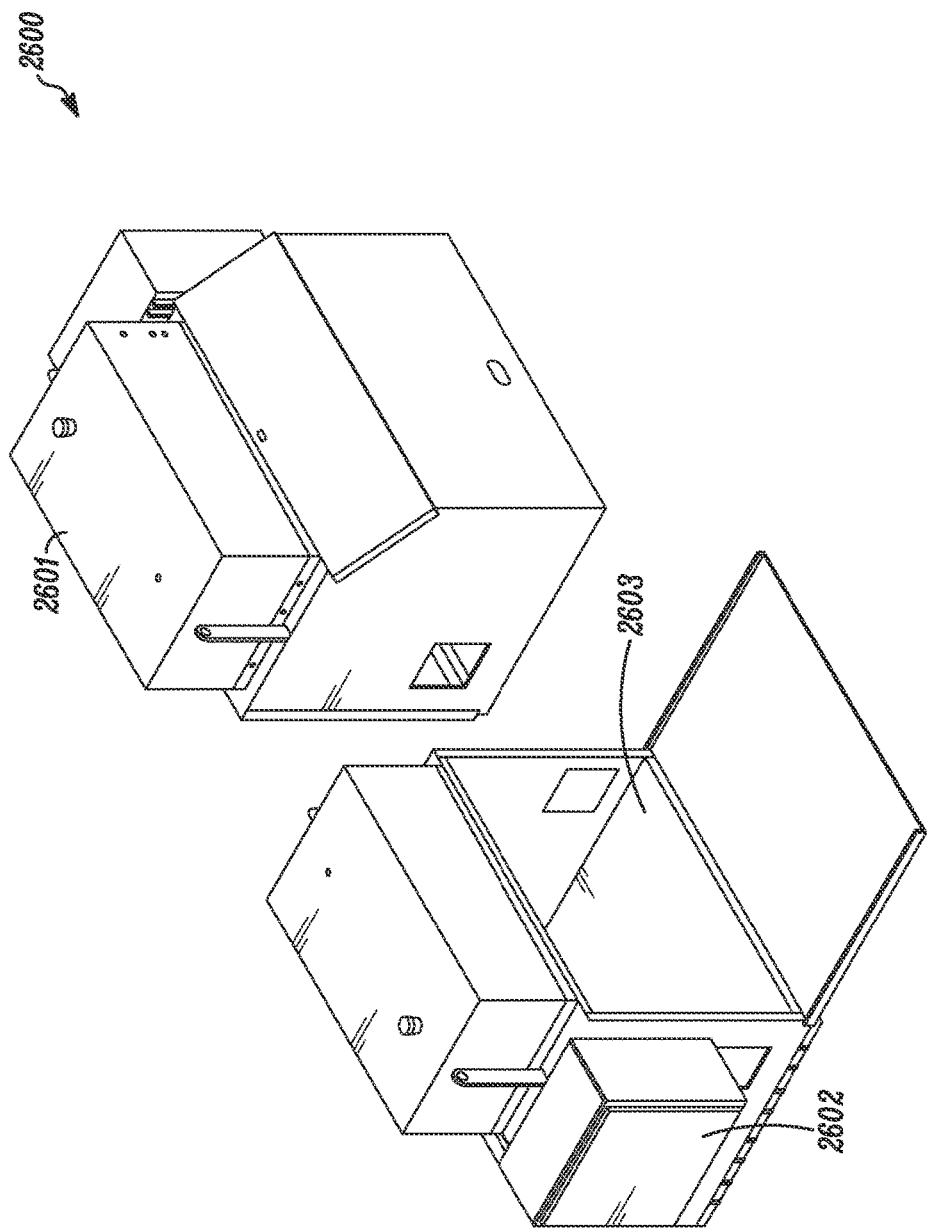
FIG. 26 illustrates an exemplary three-dimensional view of control boxes according to an embodiment of the invention.

FIG. 26 illustrates an exemplary three-dimensional view of control boxes according to an embodiment of the invention.

Control box 2600 may include components such as oil tank 2601 for the hydraulic oil (or fluid) used to run the cylinder assembly 114. Control box 2600 may also include a main housing 2603 for housing the motors, gas and oil pumps, and other mechanical devices. Control box 2600 may also include an electronics housing 2602 for housing the electronics for controlling the motors, gas and oils pumps, and the mechanical devices in the main housing 2603. The electronics may also control and receive readings to and from various sensors on the pump apparatus 100 and electronics (as will be discussed with respect to FIGS. 31-40 below).

Figure 27:
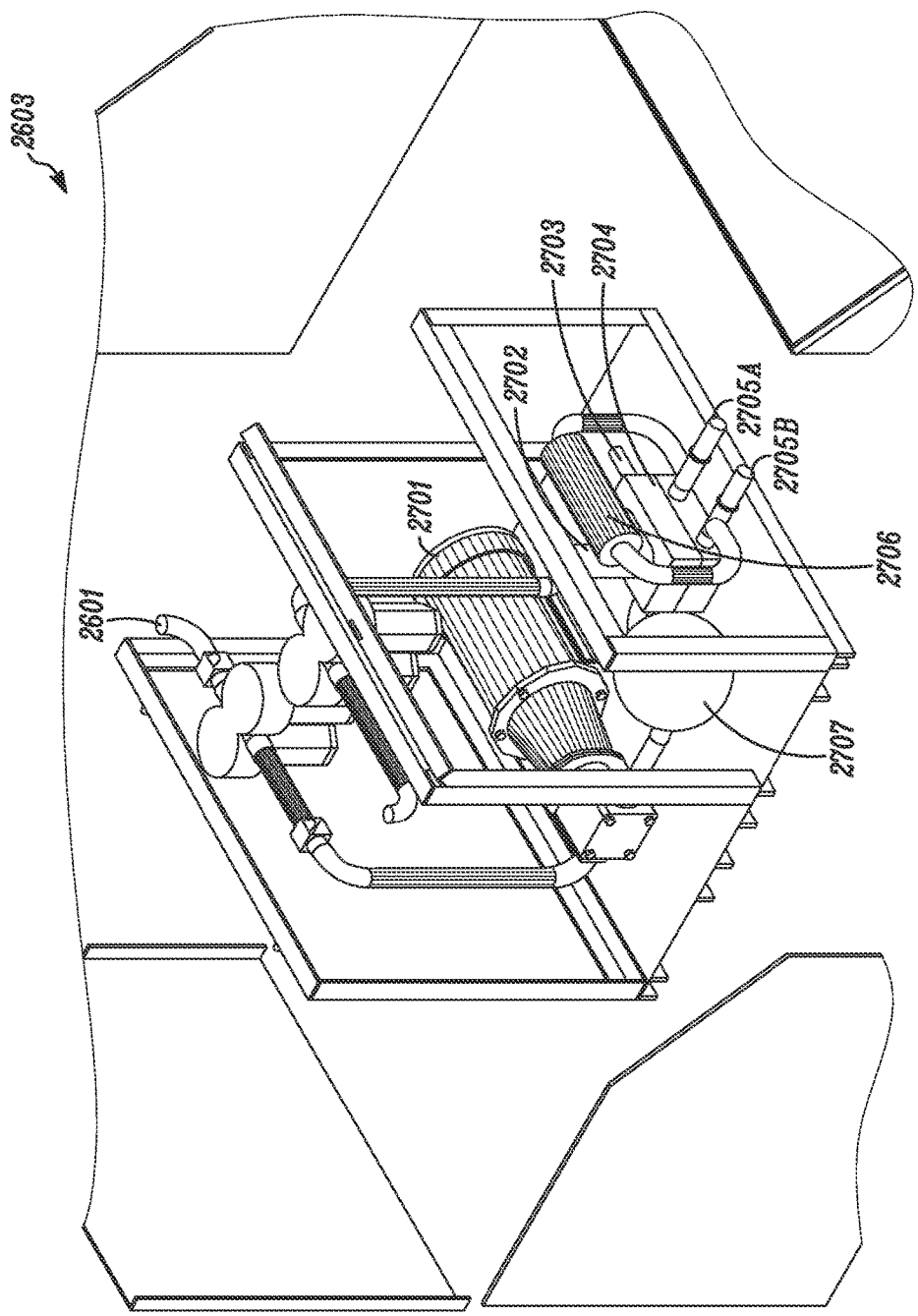
FIG. 27 illustrates an exemplary three-dimensional view of a mechanical housing for the control box of FIG. 26.

FIG. 27 illustrates an exemplary three-dimensional view of a mechanical housing for the control box of FIG. 26.

According to an embodiment, mechanical housing 2603 may include a motor pump 2701 (e.g., electric motor pump) for pumping the hydraulic oil (or fluid) to and from the oil tank 2601 into and out of the pump apparatus 100. The pump apparatus 100 may be connected by oil ports (e.g., port 1050) to oil flow ports 2705A and 2705B. In an embodiment, one of the oil flow ports 2705A and 2705B controls flow in one direction (e.g., from the control box 2600 to the pump apparatus 100 or from the pump apparatus 100 to the control box 2600) and the other is in the reverse direction.

The mechanical housing 2603 further includes an electric shifter 2702, a relief valve 2703, a control valve 2704, and a soft shifter 2706 within the path of the hydraulic oil (or fluid). The electronic shifter 2702 is configured to control the control valve 2704 to shift the direction of oil flow through the oil flow ports 2705A and 2705B when the pump apparatus is detected at a pre-determined highest and lowest point of the height of the pump. In an embodiment, the height of the pump may be detected by height sensors on the pump apparatus 100. For example, the height of the pump may be detected by a magnetic position mount 619. When the height of the pump is detected by the magnetic position mount 619 as at the pre-determined highest or lowest point, the magnetic position mount 619 may set a switch to the electric shifter 2702 to direct the control valve 2704 to switch the direction of the oil (or fluid) flow.

In an embodiment, the soft shifter 2706 is configured to soften the switch of the direction of the oil (or fluid) flow. For example, when the electric shifter 2702 directs the control valve 2704 to switch the direction of the oil (or fluid) flow, the switch may be abrupt, which may cause unwanted loud noises (e.g., clicks or other unwanted sounds) and unnecessary wear on the pump apparatus 100 (e.g., stress and fatigue of metal or other materials of the pump apparatus 100). The soft shifter 2706 may act to slow the switch of the direction of the oil (or fluid) flow (e.g., the pressurized gas accumulator 2706 does not release the oil flow in the switch of a port 2705A or 2705B until the switched port reaches a predetermined pressure, such as 100 psi). The relief valve 2703 is configured to release pressure in case of a pressure build-up in the various components or in the oil (or fluid) over a pre-determined or an unsafe pressure value.

In an embodiment, the mechanical housing 2603 may also include a high pressure high volume filter 2707 in the flow path of the oil (or fluid).

Figure 28:
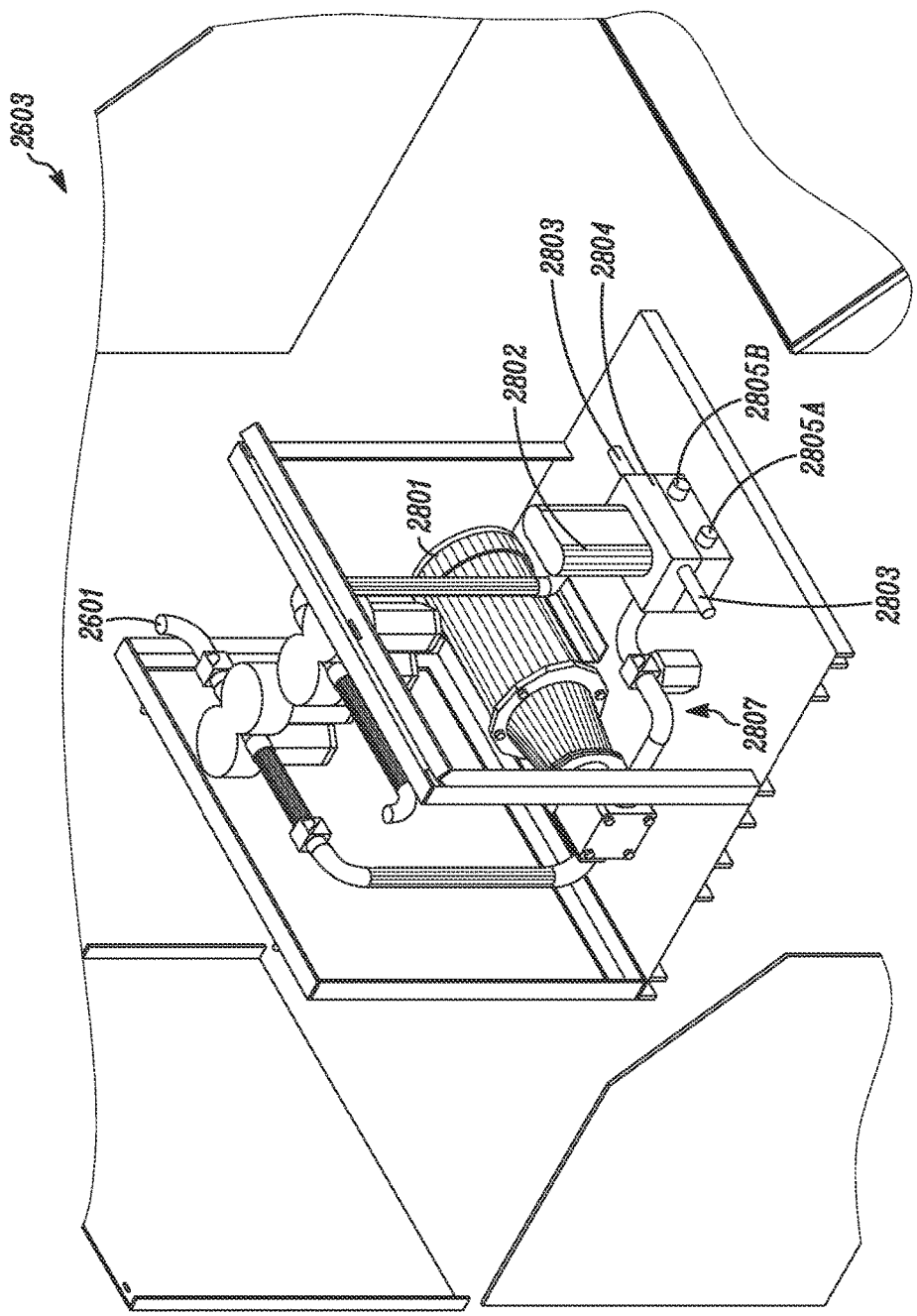
FIG. 28 illustrates an exemplary three-dimensional view of a mechanical housing for the control box of FIG. 26.

FIG. 28 illustrates an exemplary three-dimensional view of a mechanical housing for the control box of FIG. 26.

According to another embodiment, mechanical housing 2603 may include a motor pump 2801 (e.g., an electric motor pump) for pumping the hydraulic oil (or fluid) to and from the oil tank 2601 into and out of the pump apparatus 100. The pump apparatus 100 is connected by oil ports (e.g., port 1050) to oil flow ports 2805A and 2805B. In an embodiment, one of the oil flow ports 2805A and 2805B controls flow in one direction (e.g., from the control box 2600 to the pump apparatus 100 or from the pump apparatus 100 to the control box 2600) and the other is in the reverse direction.

The mechanical housing 2603 may further include an electric shifter 2802, relief valves 2803, and a control valve 2804 within the path of the hydraulic oil (or fluid).

The electronic shifter 2702 is configured to control the control valve 2804 to shift the direction of oil flow through the oil flow ports 2805A and 2805B when the pump apparatus 100 is detected at a pre-determined highest and lowest point of the height of the pump. In an embodiment, the height of the pump may be detected by height sensors on the pump apparatus 100. For example, the height of the pump may be detected by a magnetic position mount 619. When the height of the pump is detected by the magnetic position mount 619 as at the pre-determined highest or lowest point, the magnetic position mount 619 may set a switch to the electric shifter 2802 to direct the control valve 2804 to switch the direction of the oil (or fluid) flow. The relief valves 2803 are configured to release pressure in case of a pressure build-up in the various components or in the oil over a pre-determined or an unsafe pressure value. In an embodiment, the mechanical housing 2603 may also include a high pressure high volume filter 2707 in the flow path of the oil.

Figure 29:
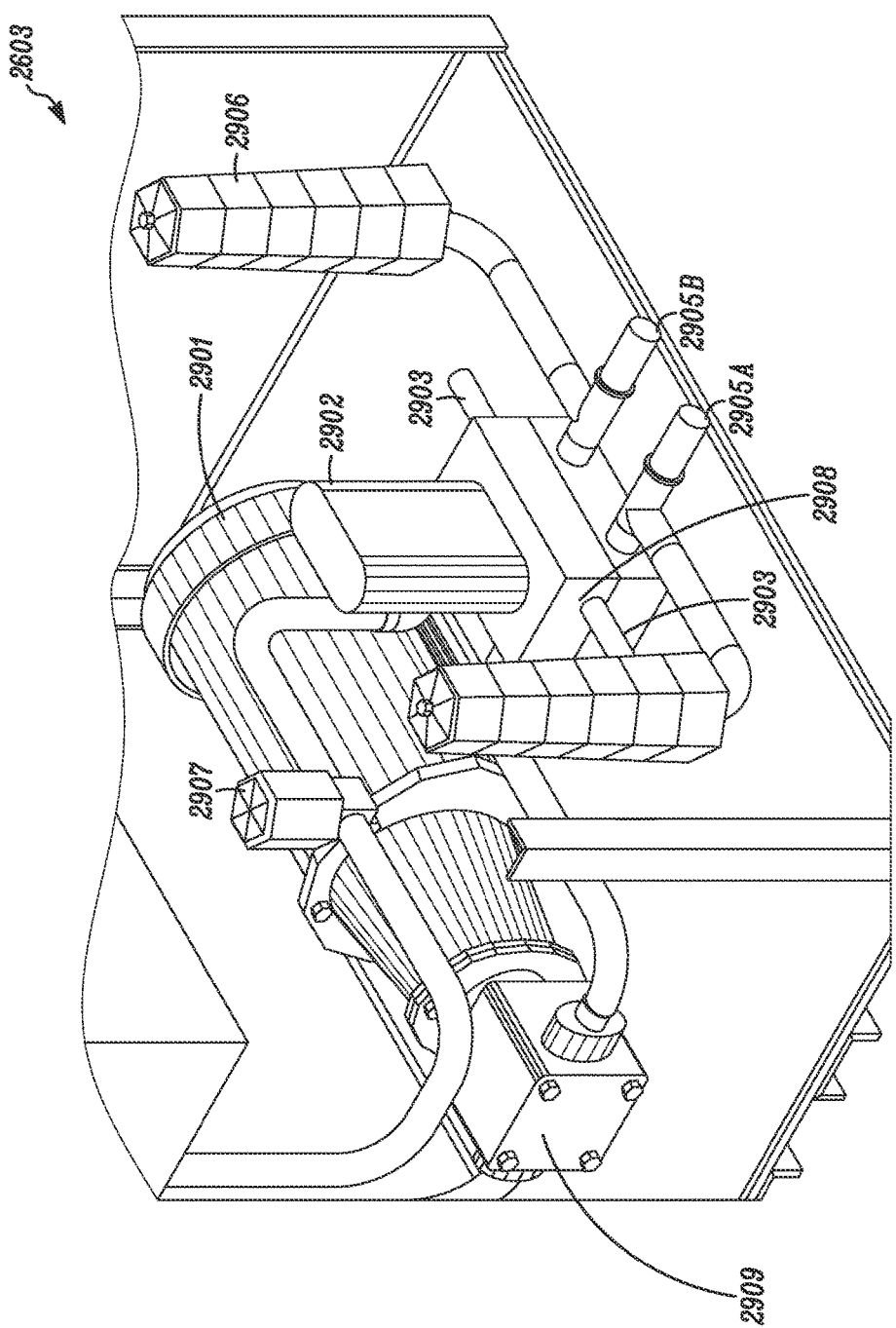
FIG. 29 illustrates an exemplary three-dimensional view of a mechanical housing for the control box of FIG. 26.

FIG. 29 illustrates an exemplary three-dimensional view of a mechanical housing for the control box of FIG. 26.

According to an embodiment, mechanical housing 2603 may include a motor pump 2901 (e.g., electric motor pump) for pumping the hydraulic oil (or fluid) to and from the oil tank 2601 into and out of the pump apparatus 100. The pump apparatus 100 is connected by oil ports (e.g., port 1050) to oil flow ports 2905A and 2905B. In an embodiment, one of the oil flow ports 2905A and 2905B controls flow in one direction (e.g., from the control box 2600 to the pump apparatus 100 or from the pump apparatus 100 to the control box 2600) and the other is in the reverse direction.

The mechanical housing 2603 further includes an electric shifter 2902, relief valves 2903, a pressure compensator 2908, and pressurized gas accumulator 2903 within the path of the hydraulic oil (or fluid). The electronic shifter 2702 is configured to shift the direction of oil (or fluid) flow through the oil flow ports 2905A and 2905B when the pump apparatus is detected at a pre-determined highest and lowest point of the height of the pump. In an embodiment, the height of the pump may be detected by height sensors on the pump apparatus 100. For example, the height of the pump may be detected by a magnetic position mount 619. When the height of the pump is detected by the magnetic position mount 619 as at the pre-determined highest or lowest point, the magnetic position mount 619 may set a switch to the electric shifter 2902 to switch the direction of the oil (or fluid) flow.

In an embodiment, the pressurized gas accumulators 2906 are configured to soften the switch of the direction of the oil (or fluid) flow. For example, when the electric shifter 2902 switches the direction of the oil (or fluid) flow, the switch may be abrupt, which may cause unwanted loud noises (e.g., clicks or other sounds) and unnecessary wear on the pump apparatus 100 (e.g., stress and fatigue of metal or other materials of the pump apparatus 100). The pressurized gas accumulators 2906 may act to slow the switch of the direction of the oil (or fluid) flow (e.g., the pressurized gas accumulators 2906 do not release the oil flow in the switch of a port 2905A or 2905B until the switched port reaches a predetermined pressure, such as 100 psi). The relief valves 2903 are configured to release pressure in case of a pressure build-up in the various components or in the oil over a pre-determined or an unsafe pressure value.

In an embodiment, the mechanical housing 2603 may also include an inline filter 2907 for filtering the hydraulic oil through the system. The oil pump 2909 is connected to the motor 2907 for pumping the oil through the system.

Figure 30A:
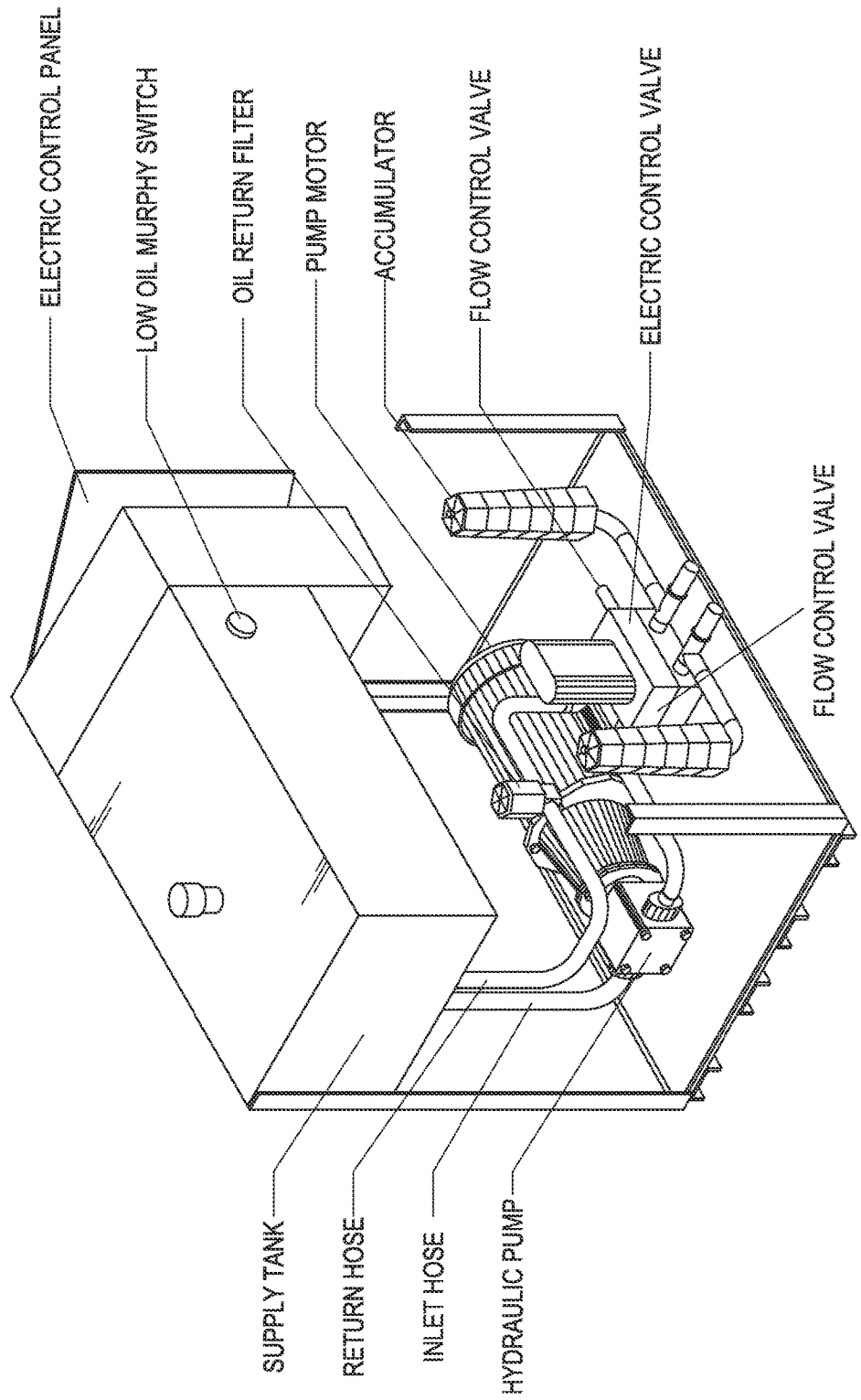
FIGS. 30A and 30B illustrate exemplary three-dimensional views of the control box of FIG. 26.
Figure 30B:
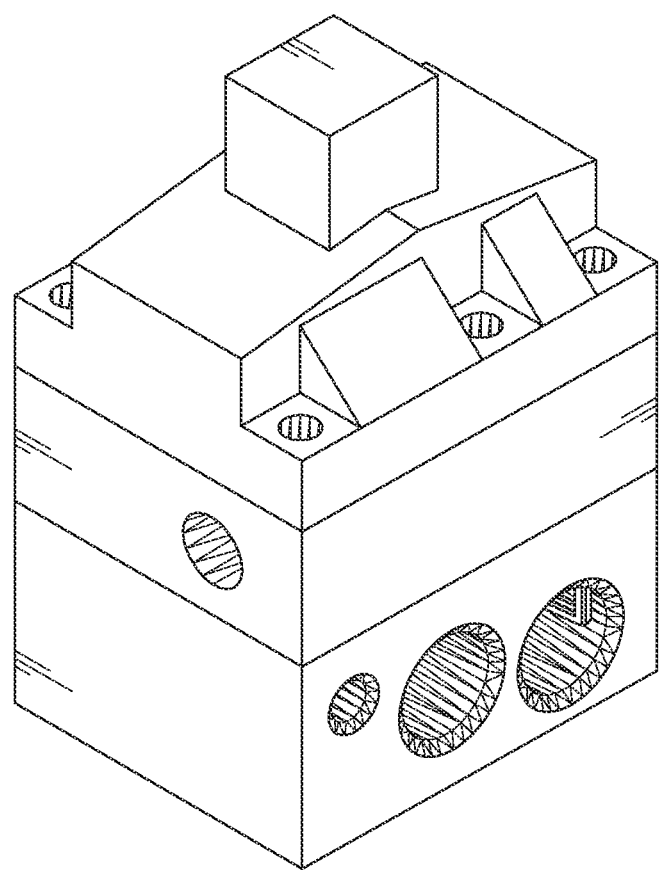

FIGS. 30A and 30B illustrate exemplary three-dimensional views of the control box of FIG. 26.

In further embodiments, existing petroleum or other pumps may be modified and/or fitted with the pump apparatus 100. In an embodiment, the cylinder assembly 112 and the regulator 111 may be included as part of a counterbalance and/or drive system (assembly) of a pump.

For example, in a typical horsehead pump in the related art (e.g., as disclosed in U.S. Pat. No. 3,621,723, entitled "Lift Pump Units," herein incorporated by reference), power may be supplied by an engine or motor driving (through a transmission and pulley) a crank, which in turn is attached to an arm (e.g., a pitman arm) that is attached to a horsehead to move the horsehead in a up-and-down motion. The horsehead is positioned at the mouth of the well (e.g., a petroleum well). A pump rod (e.g., a sucker rod) inserted into the well is attached to the horsehead by a cable (e.g., a steel cable), which moves up-and-down within the well to pump the resource (e.g., oil) from the well. A counterbalance is further attached to the crank for conserving torque/providing additional torque for the upstoke of the pump rod.

In an embodiment, the pump apparatus 100 may be used as a replacement for at least the crank and counterweight assembly of the existing pumps. For example, the motor or engine of the existing pump may be attached to and drive the pistons of the pumps apparatus 100, which may be attached to the cable of the pump rod of the existing pump, either at the horsehead or bypassing the horsehead completely and attached directly to the pump rod. In an further embodiment, the motor or engine of the existing pump may be moved closer to the well, and the pump apparatus 100 may be installed directly above the well being attached to the motor or engine and the pump rod of the existing pump.

In another example, in a pump with a pneumatic counterbalance in the related art (e.g., as disclosed in U.S. Pat. Pub. No. 2013/0306326, entitled "Low Profile Rod Pumping Unit with Pneumatic Counterbalance for the Active Control of the Rod String," herein incorporated by reference), the counterbalance system of pump apparatus 100 as discussed above may replace the pneumatic counterbalance of the related art.

In other examples, others pumps in the related art, such as Lufkin Industries' beam pumping units, hydraulic pump units, and other pump units (e.g., as disclosed in U.S. Pat. No. 8,240,221, entitled "Beam Pumping Unit for Inclined Wellhead," herein incorporated by reference), Weatherford International's hydraulic and other pump units, pumps by Dynapump, pumps by Jensen International (e.g., as disclosed in U.S. Pat. No. 7,406,887, entitled "Pumping Unit with Variable Work Stroke and Return Stroke Torque Factor Characteristics," herein incorporated by reference), and other pumps.

In an embodiment, the counterbalancing system of pump apparatus 100 and other components may be included in a kit for modifying the other pumps in the related art. Further components in the kit for modifications to the other pumps in the related art will be discussed below with respect to FIG. 33.

Presented further herein are embodiments of pump apparatus communication systems and methods of using the pump apparatus and the communication systems. Embodiments herein presented are not exhaustive, and further embodiments may be now known or later derived by one skilled in the art.

Embodiments herein presented are not exhaustive, and further embodiments may be now known or later derived by one skilled in the art.

Functional units described in this specification and figures may be labeled as modules, or outputs in order to more particularly emphasize their structural features. A module and/or output may be implemented as hardware, e.g., comprising circuits, gate arrays, off-the-shelf semiconductors such as logic chips, transistors, or other discrete components. They may be fabricated with Very-large-scale integration (VLSI) techniques. A module and/or output may also be implemented in programmable hardware such as field programmable gate arrays, programmable array logic, programmable logic devices or the like. Modules may also be implemented in software for execution by various types of processors. In addition, the modules may be implemented as a combination of hardware and software in one embodiment.

An identified module of programmable or executable code may, for instance, include one or more physical or logical blocks of computer instructions that may, for instance, be organized as an object, procedure, or function. Components of a module need not necessarily be physically located together but may include disparate instructions stored in different locations which, when joined logically together, include the module and achieve the stated function for the module. The different locations may be performed on a network, device, server, and combinations of one or more of the same. A module and/or a program of executable code may be a single instruction, or many instructions, and may even be distributed over several different code segments, among different programs, and across several memory devices. Similarly, data or input for the execution of such modules may be identified and illustrated herein as being an encoding of the modules, or being within modules, and may be embodied in any suitable form and organized within any suitable type of data structure.

In one embodiment, the system, components and/or modules discussed herein may include one or more of the following: a server or other computing system including a processor for processing digital data, memory coupled to the processor for storing digital data, an input digitizer coupled to the processor for inputting digital data, an application program stored in one or more machine data memories and accessible by the processor for directing processing of digital data by the processor, a display device coupled to the processor and memory for displaying information derived from digital data processed by the processor, and a plurality of databases or data management systems.

In one embodiment, functional block components, screen shots, user interaction descriptions, optional selections, various processing steps, and the like are implemented with the system. It should be appreciated that such descriptions may be realized by any number of hardware and/or software components configured to perform the functions described. Accordingly, to implement such descriptions, various integrated circuit components, e.g., memory elements, processing elements, logic elements, look-up tables, input-output devices, displays and the like may be used, which may carry out a variety of functions under the control of one or more microprocessors or other control devices.

In one embodiment, software elements may be implemented with any programming, scripting language, and/or software development environment, e.g., Fortran, C, C++, C#, COBOL, Apache Tomcat, Spring Roo, Web Logic, Web Sphere, assembler, PERL, Visual Basic, SQL, SQL Stored Procedures, AJAX, extensible markup language (XML), Flex, Flash, Java, .Net and the like. Moreover, the various functionality in the embodiments may be implemented with any combination of data structures, objects, processes, routines or other programming elements.

In one embodiment, any number of conventional techniques for data transmission, signaling, data processing, network control, and the like as one skilled in the art will understand may be used. Further, detection or prevention of security issues using various techniques known in the art, e.g., encryption, may be also be used in embodiments of the invention. Additionally, many of the functional units and/or modules, e.g., shown in the figures, may be described as being "in communication" with other functional units and/or modules. Being "in communication" refers to any manner and/or way in which functional units and/or modules, such as, but not limited to, input/output devices, computers, laptop computers, PDAs, mobile devices, smart phones, modules, and other types of hardware and/or software may be in communication with each other. Some non-limiting examples include communicating, sending and/or receiving data via a network, a wireless network, software, instructions, circuitry, phone lines, Internet lines, fiber optic lines, satellite signals, electric signals, electrical and magnetic fields and/or pulses, and/or the like and combinations of the same.

By way of example, communication among the users, subscribers and/or server in accordance with embodiments of the invention may be accomplished through any suitable communication channels, such as, for example, a telephone network, an extranet, an intranet, the Internet, cloud based communication, point of interaction devices (point of sale device, personal digital assistant, cellular phone, kiosk, and the like), online communications, off-line communications, wireless communications, RF communications, cellular communications, Wi-Fi communications, transponder communications, local area network (LAN) communications, wide area network (WAN) communications, networked or linked devices and/or the like. Moreover, although embodiments of the invention may be implemented with TCP/IP communications protocols, other techniques of communication may also be implemented using IEEE protocols, IPX, Appletalk, IP-6, NetBIOS, OSI or any number of existing or future protocols. Specific information related to the protocols, standards, and application software utilized in connection with the Internet is generally known to those skilled in the art and, as such, need not be detailed herein.

In embodiments of the invention, the system provides and/or receives a communication or notification via the communication system to or from an end user. The communication is typically sent over a network, e.g., a communication network. The network may utilize one or more of a plurality of wireless communication standards, protocols or wireless interfaces (including LTE, CDMA, WCDMA, TDMA, UMTS, GSM, GPRS, OFDMA, WiMAX, FLO TV, Mobile DTV, WLAN, and Bluetooth technologies), and may be provided across multiple wireless network service providers. The system may be used with any mobile communication device service (e.g., texting, voice calls, games, videos, Internet access, online books, etc.), SMS, MMS, email, mobile, land phone, tablet, smartphone, television, vibrotactile glove, voice carry over, video phone, pager, relay service, teletypewriter, and/or GPS and combinations of the same.

Figure 31:
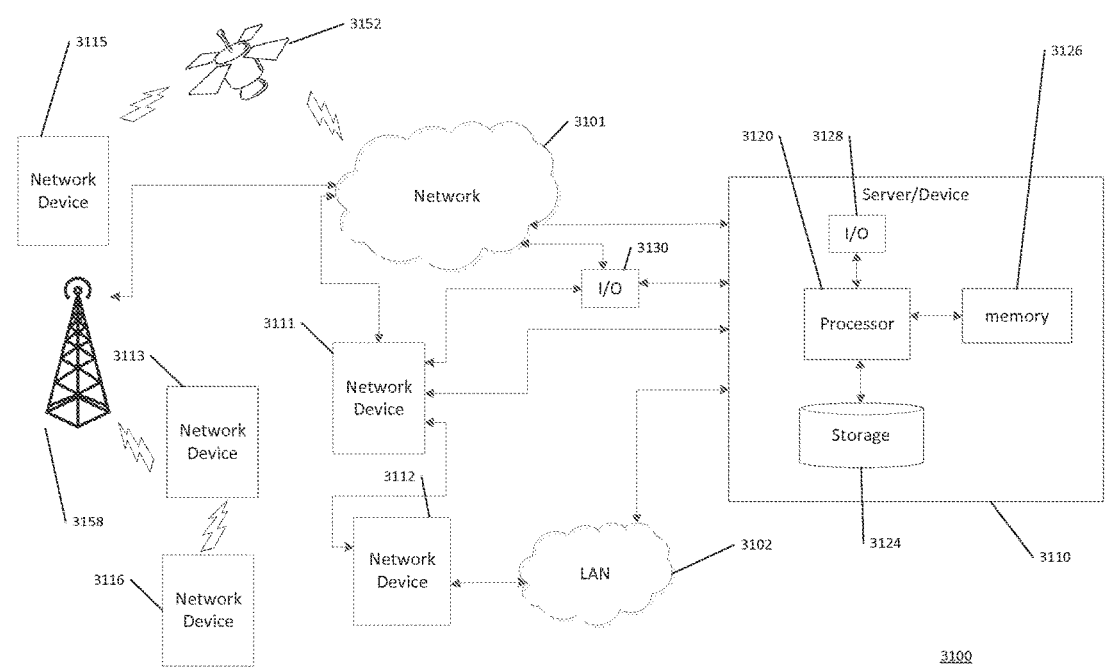
FIG. 31 illustrates an exemplary block diagram of a communication network for a pump system according to an embodiment.

FIG. 31 illustrates an exemplary block diagram of a communication network according to an embodiment.

Referring to FIG. 31, communication network 3100 includes one or more networks, including wide-area network 3101, e.g., the Internet, company or organization intranet, and/or sections of the Internet (e.g., virtual private networks, cloud, and the deep), and local-area network 3102, e.g., interconnected computers localized at a geographical and/or organization location and ad-hoc networks connected using various wired means, e.g., Ethernet, coaxial, fiber optic, and other wired connections, and wireless means, e.g., Wi-Fi, Bluetooth, and other wireless connections. Communication network 3100 includes a number of network devices 3110-3115 that are in communication with the other devices through the various networks 3101 and 3102 and through other means, e.g., direct connection through an input/output port of a network device 3130, direct connection through a wired or wireless means, and indirect connection through an input-output box, e.g., a switch.

Network devices 3110-3115, which may also connect through the networks 3101 and 3102 using various routers, access points, and other means. For example, network device 3113 wirelessly connects to a base station 3158, which acts as an access point to the wide area network 3101. Base station 3158 may be a cellular phone tower, a Wi-Fi router or access point, or other devices that allow a network device, e.g., wireless network device 3113, to connect to a network, e.g., wide area network 3101, through the base station 3158. Base station 3158 may be connected directly to network 3101 through a wired or wireless connection or may be routed through additional intermediate service providers or exchanges. Wireless device 3113 connecting through base station 3158 may also act as a mobile access point in an ad-hoc or other wireless network, providing access for network device 3115 through network device 3113 and base station 3158 to network 3101.

In some scenarios, there may be multiple base stations, each connected to the network 3101, within the range of network device 3113. In addition, a network device, e.g., network device 3113, may be travelling and moving in and out of the range of each of the multiple base stations. In such case, the base stations may perform handoff procedures with the network device and other base stations to ensure minimal interruption to the network device's connection to network 3101 when the network device is moved out of the range of the handling base station. In performing the handoff procedure, the network device and/or the multiple base stations may continuously measure the signal strength of the network device with respect to each base station and handing off the network device to another base station with a high signal strength to the network device when the signal strength of the handling base station is below a certain threshold.

In another example, a network device, e.g., network device 3115, may wirelessly connect with an orbital satellite 3152, e.g., when the network device is outside of the range of terrestrial base stations. The orbital satellite 3152 may be wirelessly connected to a terrestrial base station that provides access to network 3101 as known in the art.

In other cases, orbital satellite 3152 or other satellites may provide other functions such as global positioning and providing the network device with location information or estimations of location information of the network device directly without needing to pass information to the network 3101. The location information or estimation of location information is known in the art. The network device may also use geolocation methods, e.g., measuring and analyzing signal strength, using the multiple base stations to determine location without needing to pass information to the network 3101. In an embodiment, the global positioning functionality of the orbital satellite 3152 may use a separate interface than the communication functionality of the orbital satellite 3152 (e.g., the global position functionality uses a separate interface, hardware, software, or other components of the network device 3113 than the communication functionality). In another embodiment, the orbital satellite with the global position functionality is a physically separate satellite from the orbital satellite with communication functionality.

In one scenario, network device, e.g., network device 3112, may connect to wide area network 3101 through the local area network 3102 and another network device, e.g., network device 3110. Here, the network device 3110 may be a server, router, gateway, or other devices that provide access to wide area network 3101 for devices connected with local area network 3102.

Figure 32:
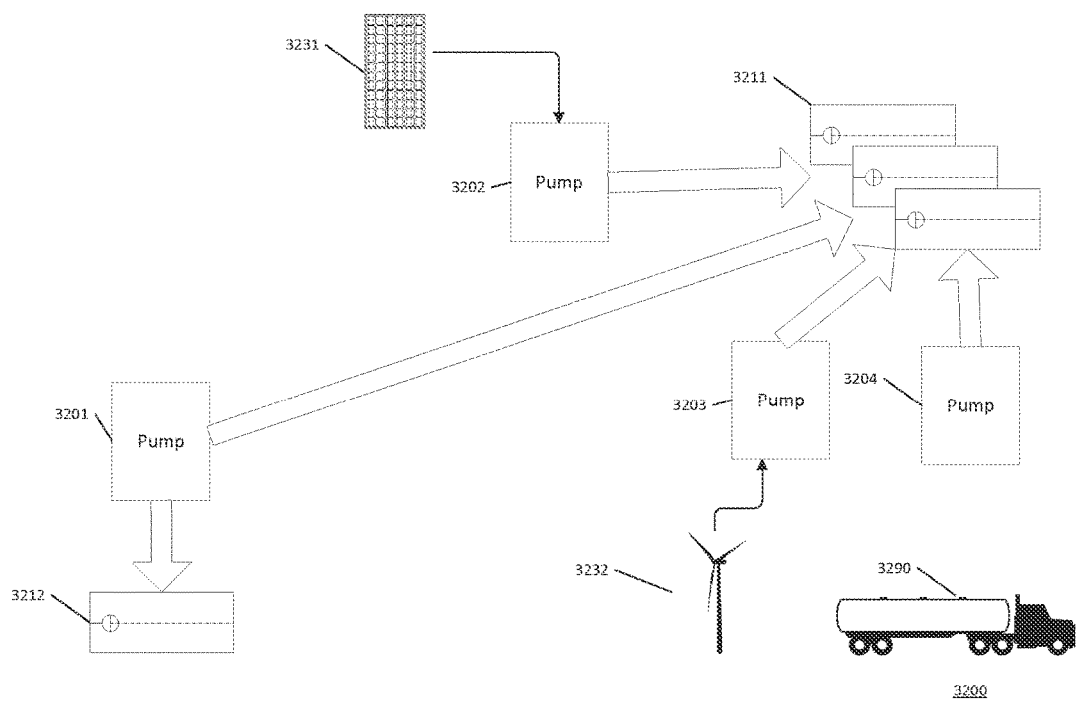
FIG. 32 illustrates an exemplary block diagram of a pump system according to an embodiment.

FIG. 32 illustrates an exemplary block diagram of a pump system according to an embodiment, Referring to FIG. 32, pump system 3200 may include a number of pumps 3201-3204. In a preferred embodiment, pumps 3201-3204 may be dual cylinder lift pump apparatuses 100 for pumping oil, which are described with respect to FIGS. 1-30.

In other embodiments, pumps 3201-3204 may include one or more of petroleum of other pumps as known now or may be later derived in the art, including a pump with a pneumatic counterbalance in the related art (e.g., as disclosed in U.S. Pat. Pub. No. 2013/0306326, entitled "Low Profile Rod Pumping Unit with Pneumatic Counterbalance for the Active Control of the Rod String," herein incorporated by reference), Lufkin Industries' beam pumping units, hydraulic pump units, and other pump units (e.g., as disclosed in U.S. Pat. No. 8,240,221, entitled "Beam Pumping Unit for Inclined Wellhead," herein incorporated by reference), Weatherford International's hydraulic and other pump units, pumps by Dynapump, pumps by Jensen International (e.g., as disclosed in U.S. Pat. No. 7,406,887, entitled "Pumping Unit with Variable Work Stroke and Return Stroke Torque Factor Characteristics," herein incorporated by reference), and other pumps.

In yet other embodiments, the existing pump units (e.g., presently in used pump units and/or as discussed above) may be modified with at least the counterbalance system of the pump apparatus 100 and may be further modified with components as will be discussed with respect to FIG. 33 below for further automation use. Further references to pump device, unit, and/or pump apparatus 100 below may also refer to these modified existing pump units.

In an embodiment, pumps 3201-3204 may be powered by solar power generator 3231 (e.g., solar panels), wind power generator 3232 (e.g., wind turbines), natural gas or oil from the wells (e.g., petroleum wells), or other energy sources as known now or may be later derived in the art. With respect to the pump apparatus 100, it is noted that the pump apparatus 100 because pump apparatus 100 can work at constant speed at a constant energy input (e.g., being driven by a motor of a constant power level at both the upstoke and downstoke). As such, the pump system can be efficient in taking advantage the maximum power rating of an energy source at all times of its operation cycle.

It is noted that a pump apparatus (e.g., pump apparatus 100) may require 5 HP or less (e.g., typically 2-2.5 HP) for operating with a 7,000-10,000 ft deep oil well because of the counterbalancing by the compressed/pressurized gas (fluid), as compared with an oil pump in the related art (e.g., horsehead pump), which may require 50-60 HP. This power requirement is within the range of a solar power panel as known in the art.

Pumps 3201-3204 are configured to pump petroleum or other resources and to fill the corresponding storage tank 3212 or a storage tank battery 3211 (e.g., attached to the pumps 3201-3204 or otherwise may receive the petroleum or the other resources from the pumps 3201-3204). Petroleum and/or other resources may be extracted by the pumps 3201-3204 and may be delivered to the storage tank 3212 or storage tank battery 3211 through hose, tubes, or other delivery systems. In one embodiment, the petroleum or other resources may be delivered directly to a third location (e.g., refineries) using pipelines or may be temporarily stored by tank 3212 or tank battery 3211 positioned proximate or otherwise to the pumps 3201-3204. Pumps 3201-3204 may be configured to fill one storage tank (e.g., pump 3201 to tank 3212), one or more tanks in a tank battery (e.g., pumps 3202-3204 to tank battery 3211), or a combination of the options (e.g., a pump configured to fill multiple tanks or only a portion of the tanks in a tank battery).

In an embodiment, pump system 3200 also includes one or more tankers 3290 for delivering the obtained petroleum or the other resources to a third location (e.g., a refinery) when the tank 3212 or the tank battery 3211 is at least partially filled.

Figure 33:
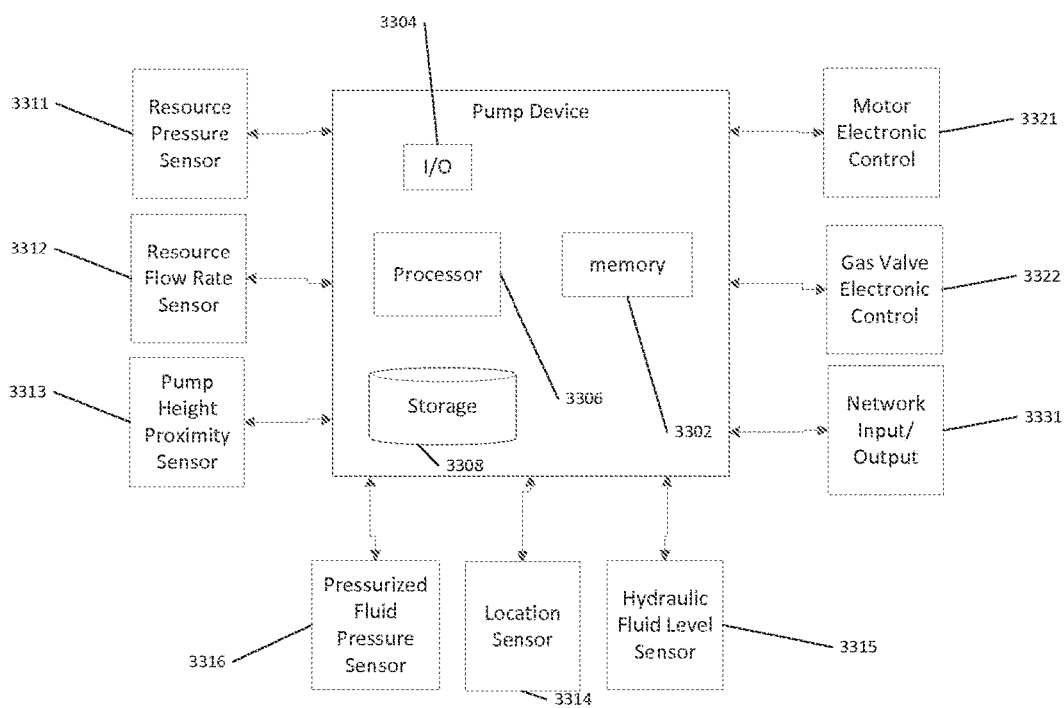
FIG. 33 illustrates an exemplary block diagram of a pump device for a pump system according to an embodiment.

FIG. 33 illustrates an exemplary block diagram of a pump device for a pump system according to an embodiment.

Referring to FIG. 33, a pump device 3300 may include electronic components that include one or more processors 3306, storages 3308, memories 3302, and input and output interfaces 3304. A pump device may or may not contain all of the above components depending on the purpose and use of the device. For example, the electronic components of a pump device 3300 may only be a dummy terminal that only requires an input and an output interface to send the input and receive the output from a device that contains a processor for processing the input and outputs.

In a further embodiment, the pump device 3300 may be connected with one or more displays, peripheral devices, and input devices. Displays may be visible screens, audible speakers, Braille text devices, or other devices that output information to a user. Peripheral devices may include printers, external storages, and other devices. Input devices may include keyboards, mice, and other input devices to input information to the device 3300. The one or more devices may be connected with or integral to the device 3300. For example, a pump device 3300 may have an integrated display which may pull up an input device, e.g., a soft keyboard, in a touch screen of the display. Another device may have a separate display monitor connected to a display port, e.g., VGA, DVI, and HDMI, of the pump device 3300 and a hardware keyboard connected to the pump device 3300 through an input port, e.g., keyboard port and USB. The displays, peripheral devices, and input devices facilitate local user input and output at the location of the pump device 3300.

In an embodiment, pump device 3300 may include network input and output interfaces 3331 for communication through communication network 3101 as one of the network devices 3110-3116. Network interfaces 3331 may include wired and wireless interfaces, as described with respect to FIG. 31, that connect the pump device 3300 to a network or other devices. The network interfaces 3331 is used to receive input (e.g., instructions) to the pump device 3330 and transmit output (e.g., device status and updates) from the pump device 3300 to the network or other devices. In a preferred embodiment with reference to pump apparatus 100, one or more of processors 3306, storages 3308, memories 3302, input and output interfaces 3304, and network input and output interfaces 3331 may be part of the control box 2600 and may be housed in the electronics housing 2602.

In an embodiment, pump device 3300 may include or receive inputs from a number of sensors for processing and to transmission through the network. The pump device 3300 may include or receive input from an oil pressure sensor 3311 for sensing the resource pressure (e.g., for a relatively fluidic resource such as petroleum or natural gas) from an well worked on by the pump. The pump device 3300 may also include or receive input from an resource flow rate sensor 3312 for sensing the flow rate of the resource pumped from the well (e.g., a petroleum or natural gas resource). In an embodiment with reference to the pump apparatus 100, the resource pressure sensor 3311 and the resource flow rate sensor 3312 (which may be a flow meter) may be installed at one or more of the cylinder assembly 112 or at the pump rod 118.

In another embodiment, the pump device 3300 may include a second resource flow rate sensor for sensing the resource flow rate from the pump device 3300 to an external storage tank (e.g., tank 3212 or tank battery 3211 as shown with reference to FIG. 32). As such, in an embodiment, the pump device 3300 may include two or more of the resource flow rate sensor 3312, at least one each for sensing the resource flow rate of the resource pumped from the well and the resource flowing from the pump device 3300 to the external tank. In a further embodiment, the resource flow rate of each of the resource flow rate sensors may be compared as the resource flow rate should be substantially the same if all of the pumped resources from the well flows to the external tank. Any discrepancies may indicate potential maintenance and/or other issues with the pump device 3300 and/or the well or the external tank, which may indicate that the pump apparatus 100 may need attention and/or servicing.

In yet another embodiment, the resource flow rate sensor may not be physically part of the pump device 3300 (e.g., a resource flow rate sensor 3312 that may be placed at the head of a well but not physically connected to the pump device 3300 or a resource flow rate sensor that may be physically placed at the external tank for measuring the resource flow rate from the pump apparatus 100 to the external tank). In an embodiment, readings from such resource flow rate sensors may still be sent (or read) to the pump device 3300 (e.g., through communication with such an resource flow rate sensor 3312 through the network interface 3310 or by other communication methods). In a further embodiment, such resource flow rate sensor may also be a network device 3111-3116. In yet a further embodiment, the other sensors (e.g., sensors 3311-3316) and/or the pump device controls (e.g., controls 3321-3322) may also not be physically placed on the pump device 3300 and/or may also be a network device 3111-3116 (e.g., for communicating with the pump device 3300 and/or other devices) as can be appreciated by one skilled in the art.

The pump device 3300 may also include or receive input from a pump height proximity sensor 3313 for sensing obstructions that may block an operation of the movable parts of the pump (e.g., an obstruction that passes over the pump as the arms (e.g., cross bar 114) are in a heightened position). In an embodiment with reference to the pump apparatus 100, the pump height proximity sensor 3313 may be positioned near the cross bar 114, as the cross bar 114 being the movable part of the pump apparatus 100 when the pump apparatus 100 is in operation. In another embodiment, the pump height proximity sensor 3313 may be positioned near the position mount 619, as the position mount 619 being a component that helps keep track of a height position of the cross bar 114. In an embodiment, the height proximity sensor 3313 may include one or more or a combination of magnetic proximity sensor (e.g., for detecting metallic objects such as sprinklers, e.g., passing overhead of the pump apparatus 100), light, laser, sight, beacon, sonar, or other proximity sensors as known now or may be later derived in the art.

The pump device 3300 may also include or receive input from a location sensor 3314 for sensing the location of the pump. In an embodiment, the location sensor 3314 may be configured to provide an absolute position (e.g., a real-world latitude and longitude geographic location on Earth or as defined by a predetermined coordinate system) or an assessed location relative to a certain position or object of the pump device 3300. In an embodiment, the location sensor 3314 may work by communicating with or accessing an external resource. For example, the location sensor 3314 may include a global navigation satellite system (GNSS) unit that tracks GNSS signals provided by GNSS satellites (such as the Global Positioning System (GPS), GLObal Navigation Satellite System (GLONSS), Galileo, Indian Regional Navigation Satellite System (IRNSS), or BeiDou-2) to calculate the latitude and longitude position of the UAV. In another example, geolocation information may be determined by communications with wireless telecommunication infrastructures (e.g., wireless networks such as local Wi-Fi networks or mobile cellular networks).

The pump device 3300 may also include or receive input from a hydraulic oil level sensor 3315 for sensing the level of hydraulic oil (fluid) running through the pump and a pressurized fluid pressure sensor 3316 for sensing the pressure of the compressed/pressurized gas (fluid) in the pump apparatus 100. In an embodiment, the hydraulic oil level sensor 3315 may be installed as a part in the mechanical housing 2603 that is in the flow path of the hydraulic oil (fluid). In an embodiment, the pressurized fluid pressure sensor 3316 may be installed in the space of the pump apparatus 100 where the compressed/pressurized gas (fluid) resides.

In an embodiment, the pump device 3300 may also be able to control various mechanical components of the pump that control the functionalities of the pump, including the motor electronic control 3321 for controlling the operation of the motor (e.g., speed, shutdown, and other functionalities) and the gas valve electronic control 3322 for controlling the operation of the gas valve (e.g., opening and closing of the gas valve).

In an embodiment, pump device 3300 may include an existing pump (e.g., pumps that are currently in use at a well) that is modified with the various sensors, electronics, and other components of the pump device 3300 as can be appreciated by one skilled in the art. For example, an existing pump may be modified to include one or more of the computational components (e.g., one or more of processors 3306, storages 3308, memories 3302, input and output interfaces 3304, and network input and output interfaces 3331), the sensors (e.g., sensors 3311-3315) and the controls (e.g., 3321-3322). In an embodiment, the computations components may be added or modified to the body or to a control center of the existing pump, and the sensors and controls may be placed at the relevant parts of the existing pump.

In a further embodiment, the kit including the counterbalancing system of pump apparatus 100 for modifying an existing pump (as discussed above) may further include these components (e.g., the computational components (e.g., one or more of processors 3306, storages 3308, memories 3302, input and output interfaces 3304, and network input and output interfaces 3331), the sensors (e.g., sensors 3311-3315) and the controls (e.g., 3321-3322)) as part of the kit.

Figure 34:
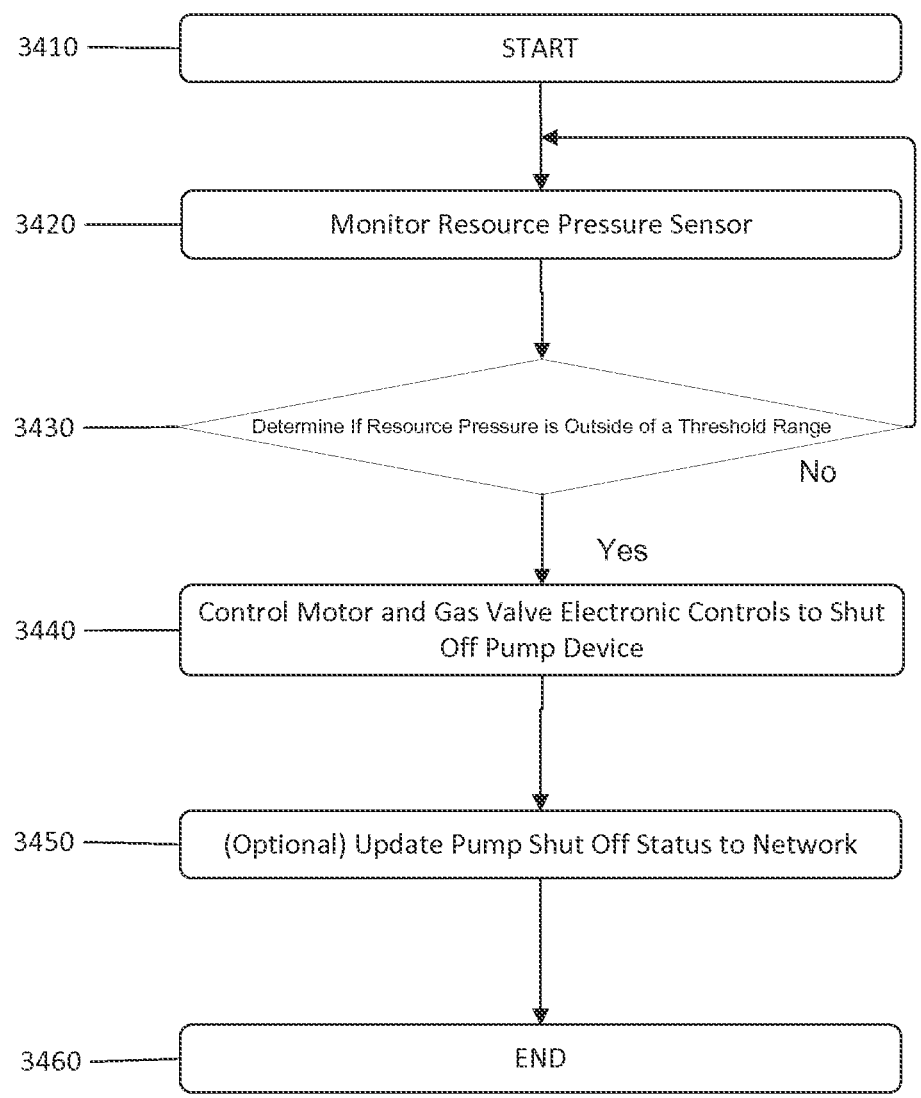
FIG. 34 illustrates an exemplary flow diagram of emergency shut-off for a pump device according to an embodiment.

FIG. 34 illustrates an exemplary flow diagram of emergency shut-off for a pump device according to an embodiment.

In an embodiment, the pump device 3300 may perform the emergency shut-off procedure 3400 for safety or other reasons. The emergency shut-off procedure 3400 starts with step 3410. As the emergency shut-off procedure 3400 is performed while the pump is operational (e.g., in operation), the procedure 3400 may be performed as a sub-operation of another procedure on the pump device 3300. For example, the pump device 3300 may be operating and performing the pumping operation (e.g., the resource pressure sensor 3311 and other parts of the pump device 3300 is active), and the emergency shut-off procedure 3400 may be called with step 3410 or may be continuously running in the background as the pump is in operation.

In step 3420, the resource pressure sensor 3311 is monitored continuously. In an embodiment, the procedure 3400 may continuously, or at some short time interval (e.g., every few seconds or minutes), pull data from the resource pressure sensor 3311 regarding the resource pressure of the pump. In another embodiment, the resource pressure sensor 3311 may include its own monitoring procedure and is configured to notify the procedure 3400 when procedure 3400 is needed (e.g., when the resource pressure sensor detects that the respective resource pressure (e.g., petroleum oil pressure inside the well) is outside of a threshold range).

In decision diamond 3430, the monitored resource pressure is determined if it is outside of a threshold range (or if the procedure 3400 has been notified by the oil pressure sensor 3311 because the resource pressure has been sensed by the resource pressure sensor 3311 to be outside the threshold range). For example, resource pressure below a certain value is indicative of the pumping enough resource to sustain operation (e.g., the oil well is dried up for petroleum oil inside the well). As such, continuing operation of the pump would be detrimental to operation and safety (e.g., the pump may heat up to a dangerous/above threshold degree).

In some cases, a pump having a reduced throughput (oil flow rate) may increase speed to maintain oil production rate (e.g., to maintain a consistent oil flow/production rate), as will be discussed with respect to FIG. 35. This would compound the dangerous situation of the pump heating up increasingly due to the increased speed (e.g., a positive feedback loop where the pump would uncontrollably speed up, e.g., due to the well being dried and no amount of increase in the pump speed can generate enough resource flow rate from the dried well). As such, the emergency shut-off procedure 3400 may be needed to quickly shut-off the pump when the dangerous/above threshold situation is detected.

In another embodiment, the decision 3430 may include other considerations, such as the monitoring and detection of a temperature sensor sensing that the pump has heated up dangerously. For example, the pump in a sunny, desert environment (and also the time of the day being noon or in the afternoon) may induce heating up of the pump more quickly than other environments (or time of day) and may create a dangerous/above threshold situation for the pump even though the resource pressure has not fallen below the threshold. In another example, other considerations may include a hydraulic fluid level (e.g., detected by the hydraulic fluid level sensor 3315) being below threshold which may indicate an unsafe running of the motor and/or engine (e.g., the motor running dry), a compressed/pressurized gas (fluid) pressure (e.g., detected by the pressurized fluid pressure sensor 3316) being below threshold which may indicate a leak of the compressed/pressurized gas (fluid) (e.g., leakage of the compressed/pressurized gas (fluid) may cause a drop in the pressure of the fluid and for the pump apparatus 100 to be unable sustain the unbalanced weight of the various components), or other events that may lead to an unsafe operation of the pump. The procedure 3400 and the decision 3430 may further take these additional considerations into account to continue to process the emergency shut-off procedure 3400.

In an embodiment, an acceptable resource pressure threshold may depend on the type of resource being extracted (e.g., for the petroleum being extracted from the well). For example, a heavier oil (e.g., paraffin) may induce more pressure on the pump than a lighter oil (e.g., Texas crude). In an embodiment, a threshold range for the resource pressure may be defined for a given pump at a given well. For example, a detected resource pressure value that is 10-15% of either above or below the threshold range may be considered outside of the threshold range, and may indicate an abnormal situation needing an emergency shut-down or a situation warranting attention and/or servicing of the pump apparatus 100.

If the resource pressure or other considerations are not outside of the threshold range, the procedure 3400 returns to step 3420 to continue monitoring the resource pressure sensor 3311 and other sensors for the other conditions. If the resource pressure or other considerations are outside of the threshold range, the procedure performs step 3440 to continue the emergency shut-down procedure.

In step 3440, one or more of the motor and the gas valve of the pump may be set to effectively shut off the pump device 3300 in a safe manner through the use of the motor electronic control 3321 and the gas valve electronic control 3322. For example, the motor may be shut off to prevent overheating. In an embodiment (e.g., the pump apparatus 100), the gas valve may be set to a setting that counteracts the weight of the arms (e.g., cross bar 114) of the pump such that the weight of the arms is supported without the motor running (e.g., by the inherent balancing provided by the compressed/pressurized gas (fluid)), preventing the potential unsafe dropping of the arms (e.g., the controls are able to regulate the compressed/pressurized fluid in regulators 111 and the cylinder assemblies 112 such that the compressed/pressurized fluid is able to sustain the weight of the parts of the pump apparatus).

Optionally, in step 3450, the status of the emergency shut-off may be updated to the network 3101. For example, a server may be controlling and monitoring a number of pumps from a centralized location. With the status update, the server may instruct the pump device 3300 to restart the pump when it has determined that the unsafe environment is no longer a concern or may instruct a field maintenance team to inspect the pump at location. In another example, a mobile device or other may be notified (e.g., one or more of a text message, a phone call, an electronic mail, a message on a mobile or computer application, or other communication methods to the owner (or designated person or system) of the pump) who may control the pump from the mobile device or may come to the pump's location for inspection. As such, the emergency shut-off procedure 3400 facilitates control and management of one or more pumps with minimal user intervention while maintaining safety.

Figure 35:
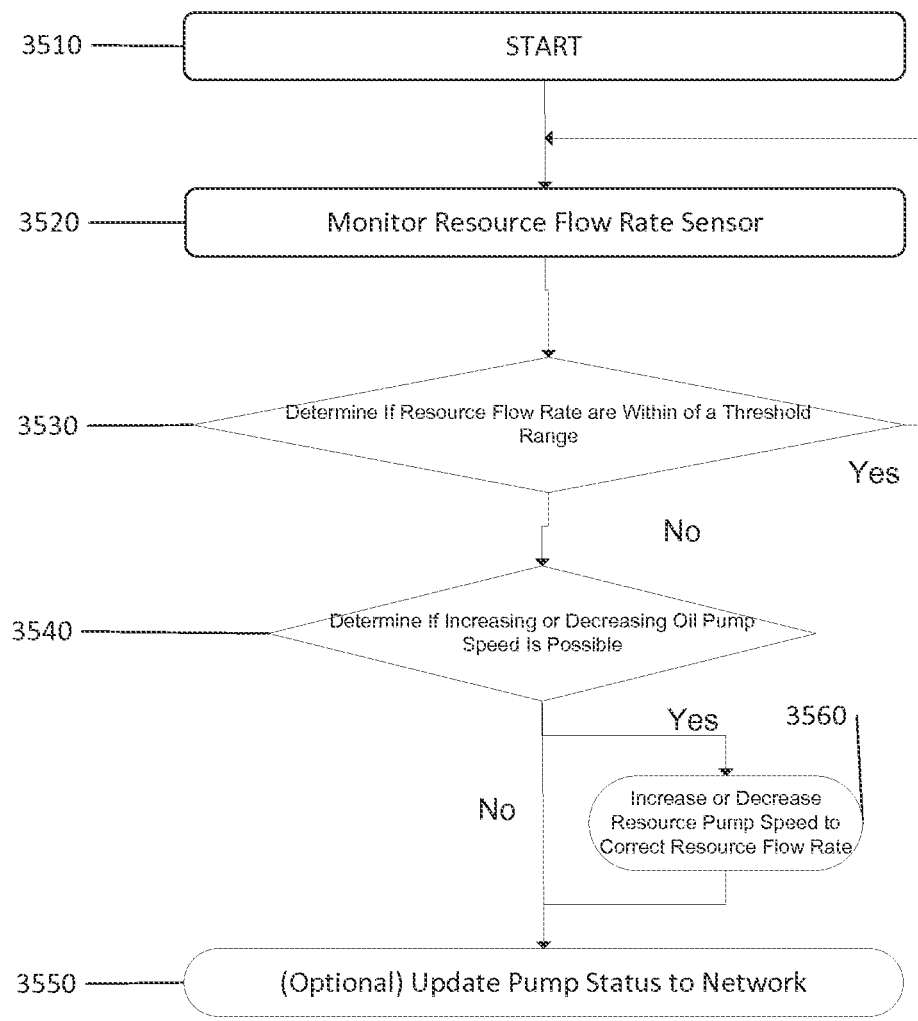
FIG. 35 illustrates an exemplary flow diagram of pump rate optimization for a pump device according to an embodiment.

FIG. 35 illustrates an exemplary flow diagram of pump rate optimization for a pump device according to an embodiment.

In an embodiment, the pump device 3300 may perform the pump rate optimization procedure 3500 for dynamically adjusting oil pump speed for extracting resource (or other resources) from a well (being is optimized for that well at a given time). In an embodiment, the pump rate optimization procedure 3500 may be a continuous process during the operation of the well. For example, a pump may be optimized for extraction of a particular resource (e.g., petroleum for a well containing both natural gas and petroleum) when the pump is initially placed on a well. However, adjustments may be needed as the pump continues to operate because of changed conditions that affect the optimization parameters (e.g., resource depletion from the well as a result of the extraction, changing of the wanted resource type, changes in the weather, climate, temperature, and other factors over time, and other conditions).

The pump rate optimization procedure 3500 starts with step 3510. As the pump rate optimization procedure 3500 is performed while the pump is operational (in operation), the procedure 3500 may be performed as a sub-operation of another procedure on the pump device 3300. For example, the pump device 3300 may be operational and performing the pumping operation (e.g., the resource flow rate sensor 3312 and other parts of the pump device 3300 is active), and the pump rate optimization procedure 3500 is called with step 3510 or may be continuously running in the background as the pump is in operation.

In step 3520, the resource flow rate sensor 3312 is monitored continuously. In an embodiment, the procedure 3400 may continuously, or at some short time interval (e.g., every few seconds or minutes), pull data from the resource flow rate sensor 3312 for updated resource flow rate of the pump. In another embodiment, the resource flow rate sensor 3312 may include its own monitoring procedure and is configured to notify the procedure 3500 when procedure 3500 is needed (e.g., when the resource flow rate has deviated from a pre-determined or previously recorded value).

In decision diamond 3530, the monitored oil flow rate is determined if the resource flow rate is outside of a threshold range (or if the procedure 3500 has been notified by the resource flow rate sensor 3312 because the resource flow rate has been sensed by the resource flow rate sensor 3312 to have deviated from a pre-determined or previously recorded value).

For example, if the resource flow rate is greater than a desired value, this may indicate a filling of the resource tank 3212 or tank battery 3211 at a faster rate than desirable (e.g., a tanker 3290 may be expected to pick up the oil from the tank 3212 or tank battery 3211 at a time after the tank 3212 or tank battery 3211 would be filled at the current resource fill rate). As such, it may be more efficient for the pump to continuously operate but at a lower speed resulting in a lower resource flow rate (e.g., lower pump speed may reduce the amount of stress and wear on the pump, a pump using a solar power source 3231 or a wind power source 3232 may have an operational period and/or efficiency of the pump limited by the time of the day or weather pattern, and may benefit from an adjustment of pump speed for an optimal efficiency band, e.g., power may be more abundant for a pump using a solar power source 3231 on a sunny day, thereby allowing for a faster speed).

In another example, if the resource flow rate is less than a desired value, it may be desirable to increase the resource flow rate for the opposite reasons as discussed above (e.g., tank 3212 or tank battery 3211 is ideally full when the tanker 3290 picks up the resource in order to benefit by a full fill-up of the tanker 3290 at each pickup).

In an embodiment, the threshold range for the oil flow rate may be pre-determined or determined dynamically as the pump is in operation. For example, the threshold range may be set to coincide on the tank 3212 or the tank battery 3211 being filled by the time the tanker 3290 picks up the resource as discussed above. In another example, the pump device 3300 may determine the threshold range, either dynamically during the operation of the pump or statically using formula, looking tables, or the like based on the most efficient operation of the pump given parameters such as location of the pump, amount and percentage of resource in the resource well, resource pressure, the demand for resource (e.g., production may be slowed or given priority to other resources if the present price of the resource is low), and other parameters. In another example, the threshold range may be set, either statically or dynamically, through the network (e.g., network 3101) based on analysis in conjunction with other pump devices, human operator input, or other considerations.

In a concrete example, for a given pump, if it is determined that a pump's target (or optimal) resource flow rate should be two gallons per stroke, but if only one gallon per stroke is detected in by the oil flow rate sensor 3312 as being produced by the pump, the oil flow would be determined to not be within the threshold range, and it would be desirable for the stoke of the pump to be slowed or sped up (e.g., depending on the correct action for the resource) in order to try to obtain the target (or optimal) oil flow rate.

If the resource flow rate is determined to be within the threshold range, the process 3500 returns to step 3520 to monitor the resource flow rate sensor 3312 as discussed above. If the resource flow rate is not within the threshold range, the process 3500 continues with decision diamond 3540.

In decision diamond 3540, the pump device 3300 determines if increasing or decreasing the pump speed to try to adjust the resource flow rate to within the threshold range is possible. For example, if the pump is already operating at the maximum pump speed, further increases to the speed would not be desirable as the pump may be operating in an unsafe manner (e.g., heat up dangerously and/or other issues). In another example, if the pump is already operating at the minimum pump speed, further decreases to the speed may also be undesirable (e.g., the pump may not be designed to operate at any efficiency if below the minimum pump speed).

Therefore, if increasing or decreasing the resource flow rate is possible, the procedure 3500 goes to increase or decrease oil pump speed to attempt to correct resource flow rate 3560. Here, it is noted that, for pump apparatus 100, the speed of the pump may be directly and reliably controlled by the speed of the motor (or engine) driving the pump because of the balancing by the compressed/pressurized gas (fluid) (e.g., the speed of the pump, e.g., the pump rod 118, being proportional to the speed of the motor). As such, the correction of the resource flow rate 3560 may include incrementally correcting the speed of the motor (e.g., through motor electronic control 3321) and returning the process to step 3520 to check how the resource flow rate has correspondingly changed in order to further tune the motor speed in order to achieve the desired resource flow rate.

Optionally, in step 3550, the status of the pump rate optimization may be updated to the network 3101. For example, a server may be controlling and monitoring a number of pumps from a centralized location. With the status update, the server may monitor one or more of the pump devices 3300 and may provide alternate instructions to each pump device 3300. Further, the server may centralize the status of each pump device 3300 in order to facilitate management and processing. In another example, a mobile or other device may be notified (e.g., one or more of a text message, a phone call, an electronic mail, a message on a mobile or computer application, or other communication methods to the owner (or designated person or system) of the pump) who may control the pump from the mobile device or may come to the pump's location for inspection.

Figure 36:
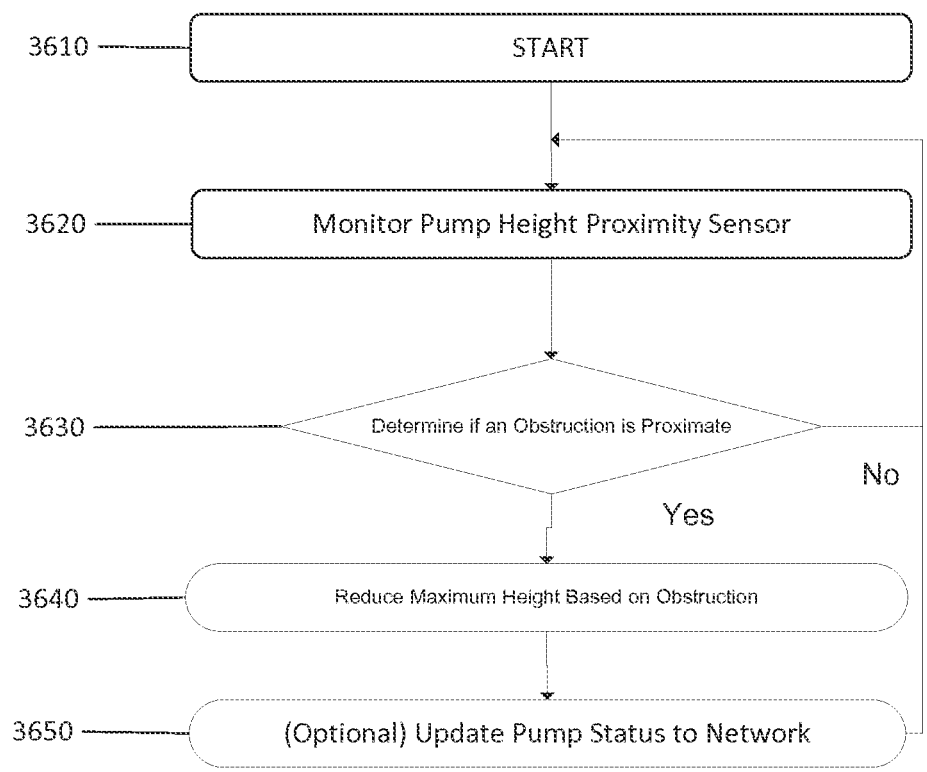
FIG. 36 illustrates an exemplary flow diagram of pump height adjustment for a pump device according to an embodiment.

FIG. 36 illustrates an exemplary flow diagram of pump height adjustment for a pump device according to an embodiment.

In an embodiment, the pump device 3300 may perform the pump height adjustment procedure 3600 for dynamically adjusting the height of one or more parts of the pump due to the detection of an obstruction or other circumstances. For example, the arms (e.g., cross bar 114) of the pump may be cyclically lifted and lowered during operation and may run into an obstruction while in operation (e.g., the obstruction appears during the downstroke of the pump such that the arms of the pump may run into the obstruction during the corresponding upstroke). As such, the arms may be obstructed by other objects within the vicinity of the well. Examples of such obstructions include an irrigation sprinkler on a field where the well is located. Therefore, it is desirable for the height of the arms of the pump to be adjusted when the irrigation sprinkler is detected passing over the pump.

The pump height adjustment procedure 3600 starts with step 3610. As the pump height adjustment procedure 3600 is performed while the pump is operational, the procedure 3600 may be performed as a sub-operation of another procedure on the pump device 3300. For example, the pump device 3300 may be operational and performing the pumping operation (e.g., the oil pressure sensor 3311 and other parts of the pump device 3300 is active), and the pump height adjustment procedure 3600 is called with step 3610 or may be continuously running in the background as the pump is in operation.

In step 3610, the pump height proximity sensor 3313 is monitored continuously. In an embodiment, the procedure 3600 may continuously, or at some short time interval (e.g., every few seconds or minutes), pull data from the pump height proximity sensor 3313 regarding any detected obstructions within the vicinity of the pump or various parts of the pump. In another embodiment, the pump height proximity sensor 3313 may include its own monitoring procedure and is configured to notify the procedure 3600 when procedure 3600 is needed (e.g., interrupts the procedure 3600 or calls the procedure 3600 when an obstruction is detected).

In an embodiment, the pump height proximity sensor 3313 may include a magnetic proximity sensor for detecting metal or a corresponding material. For example, if a metallic irrigation sprinkler is approaching to pass over the pump, the magnetic proximity sensor is able to detect the metallic irrigation sprinkler approaching (e.g., the magnetic proximity sensor placed proximate to the cross bar 114). In embodiments, the pump height proximity sensor 3313 may detect the obstruction using other methods as discussed above.

In decision diamond 3630, whether there is an obstruction that is proximate is determined based on the monitored pump height proximity sensor 3313. For example, the pump height proximity sensor 3313 may communicate (e.g., send a signal) if an obstruction is detected and/or within a certain threshold distance of the pump. The proximity of the obstruction is thus determined.

If there is no detected proximate obstruction, the process 3600 returns to step 3620 to monitor the pump height proximity sensor 3313 as discussed above. It is noted here that, in a preferred embodiment, the pump will be in continuous operation (e.g., extracting a resource from a well). As such, it may be desirable for the process 3600 to continuously monitor, e.g., the pump height proximity sensor 3313, for any obstructions that may appear (e.g., while the cross bar 114 moves up and down) to ensure that the pump can avoid obstruction that may appear while the arms are at a low position but the obstruction is shorter than the arms at the highest position.

If there is a detected proximate obstruction, the process 3600 continues with decision diamond 3640.

In step 3640, the maximum height of the arms of the pump is reduced based on the obstruction. For example, the maximum height of the arms (e.g., cross bar 114) may be set to a pre-determined height or dynamically based on a detected height of the obstruction. In an embodiment, the pre-determined height may be based on a height set for all such events (for consistency). In another embodiment, the maximum height may be a combination of the pre-determined height and the dynamically based height. For example, if the pre-determined height is not enough to clear the obstruction, the maximum height may then be set to the dynamically detected height of the obstruction.

As noted above, the pump may continue to be operational when the maximum height is set to a reduced height. For example, the pump may continue to extract resource from the oil well, but at a reduced maximum height. As such, the pump may extract less resource than if it was at maximum height if the pump operates at the same pump speed. In an embodiment, the pump device 3300 may call the resource flow optimization procedure 3500 in order to adjust the resource pump speed for the reduced height in order to sustain a more similar resource flow rate as when the pump is at maximum height (e.g., by increasing the speed of the pump).

In an embodiment, the pump height proximity sensor 3313 may be further monitored to determine when the obstruction has been cleared to return the pump to the maximum (or the typical) height (e.g., for sprinklers that passes overhead of the pump, the height of the pump may return to the maximum (or the typical) height after the sprinklers has cleared the pump).

In a further embodiment, the pump may give sensory indications (e.g., sound, light, or other indications) that it is determined (perceived) the obstruction and is reducing its height based on the obstructions (e.g., in one or more of steps 3630 and 3640). For example, if the pump height proximity sensor 3313 has detected a sprinkler system about the cross above the pump, the pump may indicated (explicitly) that it has detected the sprinkler system and is in the process of lowering its maximum height (e.g., by certain audible sound or viewable light). This may be helpful to a human operator operating the sprinkler system who may wish to wait to confirm that the pump was able to detect the sprinkler system and will be lowering its maximum height to avoiding collision.

In another embodiment, the pump may further communicate with the obstruction (e.g., an automated sprinkler system) through the network 3101 (where the obstruction may also be a network device 3111-3115) that it has detected the obstruction within the pump proximity and is lowering the maximum height. In yet another embodiment, the pump height proximity sensor 3313 may be part of the network input/output device 3331 that receives information from the network 3101 indicating that the obstruction is proximate and will lower the maximum height accordingly. In still another embodiment, the pump height proximity sensor 3313 may be a beacon that the obstruction may directly communicate, signal, and/or instruct on the detection of the obstruction and the lowering of the maximum height of the pump.

Optionally, in step 3650, the status of the pump height adjustment may be updated to the network 3101. For example, a server may be controlling and monitoring a number of pumps from a centralized location. With the status update, the server may monitor one or more of the pump devices 3300 and may provide alternate instructions to each pump device 3300. Further, the server may centralize the status of each pump device 3300 in order to facilitate management and processing. In another example, a mobile or other device may be notified (e.g., one or more of a text message, a phone call, an electronic mail, a message on a mobile or computer application, or other communication methods to the owner (or designated person or system) of the pump).

Figure 37:
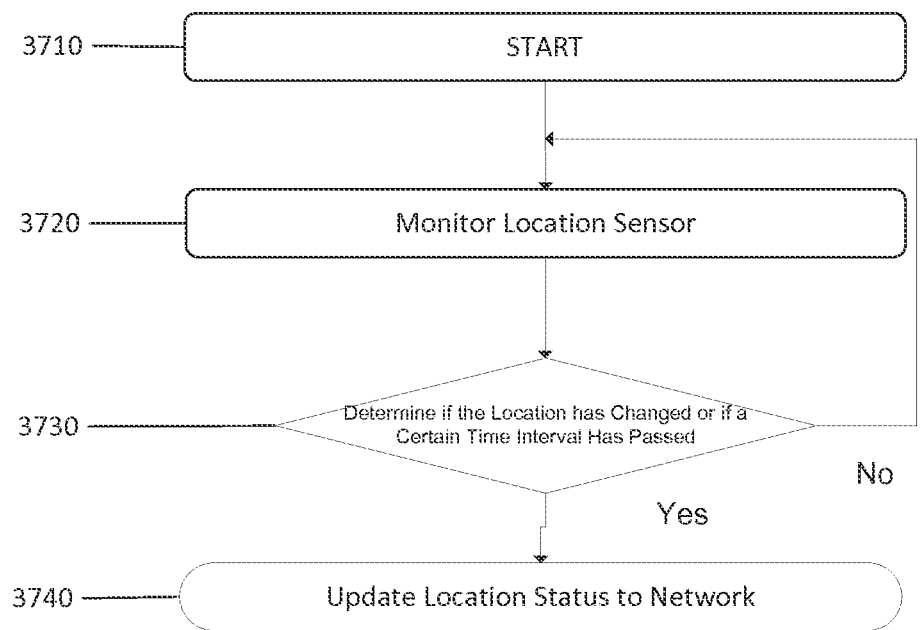
FIG. 37 illustrates an exemplary flow diagram of pump location tracker for a pump device according to an embodiment.

FIG. 37 illustrates an exemplary flow diagram of pump location tracker for a pump device according to an embodiment.

In an embodiment, the pump device 3300 may perform the pump location tracker procedure 3700 for tracking the location of the pump. For example, the pump may be a portable setup that may be moved to various oil wells. In another example, the pump may be a leased unit that is either portable or non-portable, and the owner, operator, or other parties of the pump may wish to keep track of the location and usage of the pump with minimal overhead.

The pump location tracker procedure 3700 starts with step 3710. In an embodiment, the pump location tracker procedure 3700 may be performed while the pump is operational or idle. As such, the procedure 3700 may be performed as a sub-operation of another procedure on the pump device 3300 or as a standalone operation. In either case, the pump location tracker procedure 3700 may be continuously running or may process as a procedure at certain time intervals.

In step 3720, the location sensor 3314 is monitored. In an embodiment, the procedure 3700 may continuously, or at some pre-defined or dynamically set time interval, pull data from the location sensor 3314 on the location of the pump. In another embodiment, the location sensor 3314 may include its own monitoring procedure and is configured to notify the procedure 3700 when procedure 3700 is needed (e.g., interrupts the procedure 3700 or calls the procedure 3700 when there is detected a change in the location).

In an embodiment, the dynamically set time interval may depend on the setup of the pump. For example, a pump that is more susceptible to being moved (e.g., a portable pump that has not been setup on an oil well) may be monitored in a shorter time interval, while a pump that has been setup and not easily movable may be monitored in a longer time interval.

In an embodiment, the location sensor 3314 may include one or more of a Global Positioning System (GPS), a wireless geolocation system, or other means of location as discussed above.

In decision diamond 3630, it is determined if the location of the pump has changed or if a certain time interval as discussed above has passed.

If the location has not changed, the process 3700 returns to step 3720 to monitor the location sensor 3314 as discussed above. If there is a change in the location, the process 3700 continues with step 3740.

In step 3740, the status of the pump location may be updated to the network 3101. For example, a server may be controlling and monitoring a number of pumps from a centralized location. With the status update, the server may monitor one or more of the pump devices 3300 and may provide alternate instructions to each pump device 3300. Further, the server may centralize the status of each pump device 3300 in order to facilitate management and processing. In another example, a mobile device may be notified (e.g., one or more of a text message, a phone call, an electronic mail, a message on a mobile or computer application, or other communication methods to the owner (or designated person or system) of the pump).

Figure 38:
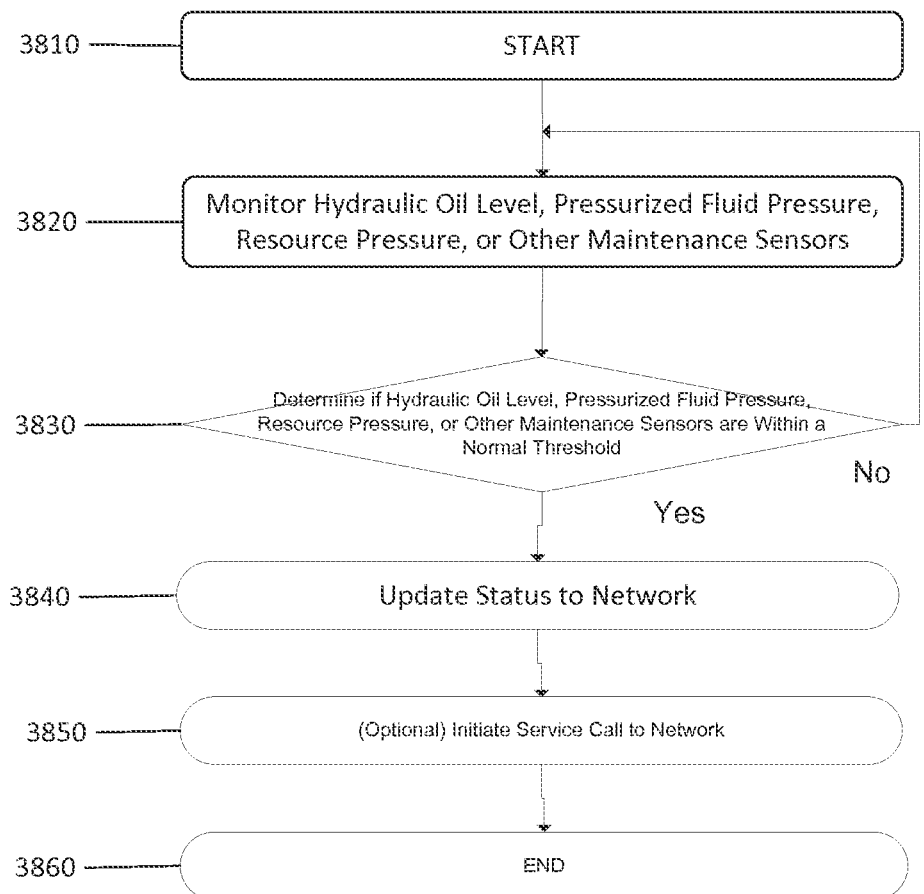
FIG. 38 illustrates an exemplary flow diagram of service alert for a pump device according to an embodiment.

FIG. 38 illustrates an exemplary flow diagram of service alert for a pump device according to an embodiment.

In an embodiment, the pump device 3300 may perform the service alert procedure 3800 for detecting and alerting an appropriate service call for maintenance or other service needs of the pump. For example, hydraulic fluid level may be low due to leaks, burn-off, or other reasons (e.g., as detected by the hydraulic fluid sensor 3315). In another example, the pressure of the compressed/pressurized fluid may be low due to leaks or other reasons (e.g., as detected by the pressurized fluid pressure sensor 3316). In yet another example, the resource pressure may be low due to a depleted well or other reasons (e.g., as detected by the resource pressure sensor 3311). In yet another example, the pump may contain parts that may wear as a result of the operation of the pump (e.g., as detected by other maintenance sensors for other components).

It is further noted that, in an embodiment, the service alert procedure 3800 may be performed substantially simultaneously with the emergency shut off procedure 3400. For example, in some situations, the resource pressure (and also possibly the hydraulic fluid level or the pressurized fluid pressure) may be low (e.g., below a normal threshold) but not low enough to be unsafe (e.g., below a threshold for emergency shut off). In these situations, only the service alert procedure 3800 may be performed. However, if the resource pressure is below the emergency shut off threshold, both the emergency shut off procedure 3400 and the service alert procedure 3800 may be performed to both shut off the pump and the perform the service alert.

The service alert procedure 3800 starts with step 3810. As the service alert procedure 3800 is performed while the pump is operational, the procedure 3800 may be performed as a sub-operation of another procedure on the pump device 3300. For example, the pump device 3300 may be operational and performing the pumping operation (e.g., the hydraulic oil level sensor 3315 and other parts of the pump device 3300 is active), and the service alert procedure 3800 is called with step 3810 or may be continuously running in the background as the pump is in operation.

In step 3810, the hydraulic fluid level sensor 3315, pressurized fluid pressure sensor 3316, resource pressure sensor 3311, and/or other maintenance sensors may be monitored continuously. In an embodiment, the procedure 3800 may continuously, or at some short time interval (e.g., every few seconds or minutes), pull data from hydraulic fluid level sensor 3315, pressurized fluid pressure sensor 3316, resource pressure sensor 3311, and/or other maintenance sensors regarding the detected sensed data. In another embodiment, hydraulic fluid level sensor 3315, pressurized fluid pressure sensor 3316, resource pressure sensor 3311, and/or other maintenance sensors may include its own monitoring procedure and is configured to notify the procedure 3800 when procedure 3800 is needed (e.g., interrupts the procedure 3800 or calls the procedure 3800 at a detection event of an abnormality of the sensed data).

In decision diamond 3830, the monitored hydraulic fluid level, pressurized fluid pressure, resource pressure, and/or other maintenance levels is determined if it is within a normal threshold (or if the procedure 3800 has been notified by the hydraulic fluid level sensor 3315, pressurized fluid pressure sensor 3316, resource pressure sensor 3311, and/or other maintenance sensors because the sensed data has been sensed by the hydraulic fluid level sensor 3315, pressurized fluid pressure sensor 3316, resource pressure sensor 3311, and/or other maintenance sensors to be outside of the normal threshold).

In an embodiment, the threshold range for the hydraulic fluid level, pressurized fluid pressure, resource pressure, and/or other maintenance levels may be pre-determined or determined dynamically as the pump is in operation. For example, the pump device 3300 may determine the threshold range, either dynamically during the operation of the pump or statically using formula, looking tables, or the like based on a maintenance schedule of the pump for given parameters such as location of the pump, weather, and other parameters (e.g., the minimum hydraulic fluid level requirement may be lower for a pump in cold weather and in high altitude). In another example, the threshold range may be set, either statically or dynamically, through the network based on analysis in conjunction with other pump devices, human operator input, or other considerations.

In an embodiment, other maintenance sensors may be added to pump device 3300 and to generate a service alert with respect to procedure 3800. For example, other maintenance sensors may include maintenance sensors of the various components of the pump (e.g., stress and wear sensors on the movable parts), hydraulic fluid filter maintenance sensor, temperature sensor on various components and parts, motor or engine fault sensors. In a general embodiment, a service provider (e.g., pump or resources company) may add other additional sensors to the pump device 3300 to detect other faults and events to generate a service alert with respect to the procedure 3800.

If the hydraulic fluid level, pressurized fluid pressure, resource pressure, and/or other maintenance levels is determined to be within the threshold, the procedure 3800 returns to step 3820 to monitor the hydraulic fluid level sensor 3315 as discussed above. If the hydraulic fluid level, pressurized fluid pressure, resource pressure, and/or other maintenance levels is outside the threshold, the process 3800 continues with step 3840.

In step 3840, the status of hydraulic fluid level, pressurized fluid pressure, resource pressure, and/or other maintenance levels may be updated to the network 3101. For example, a server may be controlling and monitoring a number of pumps from a centralized location. With the status update, the server may monitor one or more of the pump devices 3300 and may provide alternate instructions to each pump device 3300. Further, the server may centralize the status of each pump device 3300 in order to facilitate management and processing. In another example, a mobile device may be notified (e.g., one or more of a text message, a phone call, an electronic mail, a message on a mobile or computer application, or other communication methods to the owner (or designated person or system) of the pump).

Optionally, in step 3850, the pump device 3300 may initiate a service call to the network independent of reporting the status in step 3840. For example, the servicing of the pump may be performed by a different entity than the management of the pump. As such, the optional step 3850 helps improve response time and simplifies the service call procedure.

In an embodiment, the service call may include an updated calibration to the compressed/pressurized gas (fluid) pressure. As discussed previously, the pressure of the compressed/pressurized gas (fluid) may be calibrated during the setup/installing of the pump apparatus 100. However, during the operation of the pump apparatus 100, some of the compressed/pressurized gas (fluid) may be leaked, thus leading to a reduced pressure, which may lead to the pump apparatus 100 being unable to balance. In such a situation, an updated calibration (e.g., adding more compress/pressurized gas (fluid)) as needed bring the pump apparatus 100 back to being balanced in a maintenance procedure.

In another embodiment, the pump apparatus 100 may further include or have access to an onsite compressed/pressurized gas (fluid) source (e.g., a compressed nitrogen tank). As such, when the pressurized fluid pressure 3316 detects an abnormality with the pressure of the compressed/pressurized gas (fluid) (e.g., the fluid is at an incorrect pressure level for balancing the pump apparatus 100), the onsite source may be used to bring the pressure of the fluid back to the correct pressure.

In a further embodiment, if the hydraulic fluid level, pressurized fluid pressure, resource pressure, and/or other maintenance levels may have been detected to have dropped below a safety threshold of which continuous operation affects the safe operation of the pump. In this case, the pump device 3300 may initiate a shut down procedure similar to procedure 3400.

Figure 39:
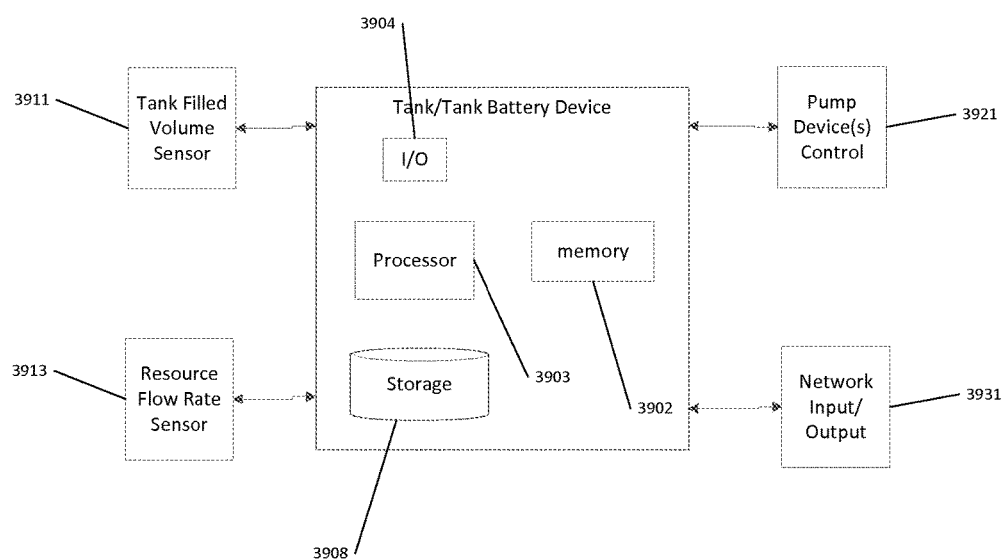
FIG. 39 illustrates an exemplary block diagram of a tank or tank battery device for a pump system according to an embodiment.

FIG. 39 illustrates an exemplary block diagram of a tank or tank battery device for a pump system according to an embodiment.

Referring to FIG. 39, a tank or tank battery device 3900 may include electronic components that include one or more processors 3903, storages 3908, memories 3902, and input and output interfaces 3904. A tank or tank battery device 3900 may or may not contain all of the above components depending on the purpose and use of the device. For example, the electronic components of a tank or tank battery device 3900 may only be a dummy terminal that only requires an input and output interface to send the input and receive the output from a device that contains a processor for processing the input and outputs.

In a further embodiment, the tank or tank battery device 3900 may be connected with one or more displays, peripheral devices, and input devices. Displays may be visible screens, audible speakers, Braille text devices, or other devices that output information to a user. Peripheral devices may include printers, external storages, and other devices. Input devices may include keyboards, mice, and other input devices to input information to the device 3900. The one or more devices may be connected with or integral to the device 3900. For example, a tank or tank battery device 3900 may have an integrated display which may pull up an input device, e.g., a soft keyboard, in a touch screen of the display.

Another device may have a separate display monitor connected to a display port, e.g., VGA, DVI, and HDMI, of the tank or tank battery device 3900 and a hardware keyboard connected to the tank or tank battery device 3900 through an input port, e.g., keyboard port and USB. The displays, peripheral devices, and input devices facilitate local user input and output at the location of the tank or tank battery device 3900.

In an embodiment, tank or tank battery device 3900 may include network input and output interfaces 3931 for communication through communication network 3101 as one of the network devices 3110-3116. Network interfaces 3931 may include wired and wireless interfaces, as described with respect to Fig. B1, that connect tank or tank battery device 3900 to a network or other devices. The network interfaces 3931 are used to receive input (e.g., instructions) to tank or tank battery device 3900 and transmit output (e.g., device status and updates) from the tank or tank battery device 3900 to the network or other devices.

In an embodiment, tank or tank battery device 3900 may include or receive inputs from a number of sensors for procession and to transmit through the network. The tank or tank battery device 3900 may include or receive input from a tank filled volume sensor 3911 for sensing the volume of the tank that is filled. The tank or tank battery device 3900 may also include or receive input from an resource flow rate sensor 3913 for sensing the resource flow rate of the resource pumped from the well.

In an embodiment, the tank or tank battery device 3900 may be able to control various mechanical components of the pump that control the functionalities of the pump, generically as pump device control 3921. For example, pump device control 3921 may include a motor electronic control 3321 for controlling the operation of the motor (e.g., speed, shutdown, and other functionalities) and the gas valve electronic control 3322 for controlling the operation of the gas valve (e.g., opening and closing of the gas valve) as discussed related to the pump device 3300.

Figure 40:
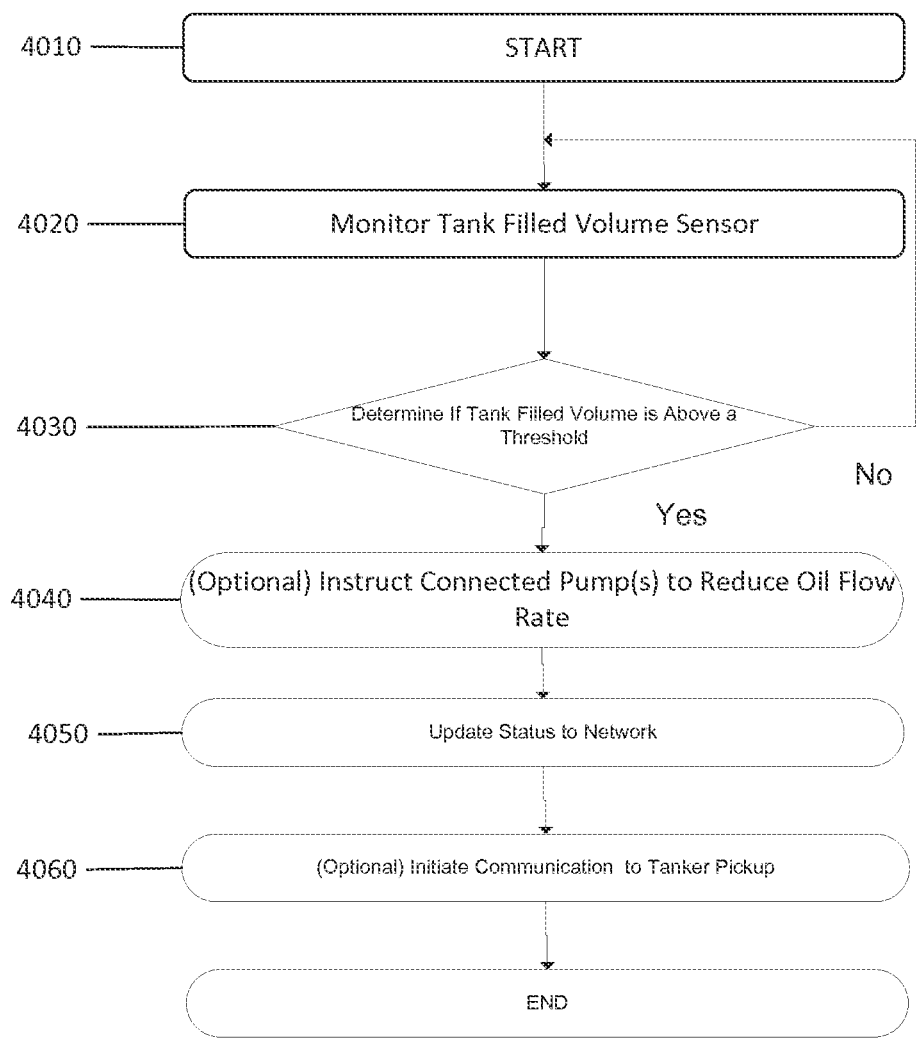
FIG. 40 illustrates an exemplary flow diagram of fill alert for a tank or tank battery device according to an embodiment.

FIG. 40 illustrates an exemplary flow diagram of fill alert for a tank or tank battery device according to an embodiment.

In an embodiment, the tank or tank battery device 3900 may perform the service alert procedure 4000 for detecting and alerting a filled volume of the tank or tank battery device 3904 and to update the appropriate status and/or call for a tanker pickup to the network 3101.

The service alert procedure 4000 starts with step 4010. The tank or tank battery device 3900 may be only periodically operational (e.g., tank or tank battery device 3900 is active only at certain time periods and in sleep mode most of the time) to conserve power. As such, the service alert procedure 4000 may be performed only while the tank device is operational. In another embodiment, the service alert procedure 4000 may be called by the tank filled volume sensor 3911, which may be periodically operational or may be continuously operational but would usually have less power requirements than the tank or tank battery device 3900.

In step 4020, the tank filled volume sensor 3911 is monitored. In an embodiment, the procedure 4020 may pull data from tank filled volume sensor 3911 regarding the detected tank filled volume. In another embodiment, the tank filled volume sensor 3911 may include its own monitoring procedure and is configured to notify the procedure 4020 when procedure 4000 is needed (e.g., interrupts the procedure 4000 or calls the procedure 4000 at a detection event of the tank filled volume level).

In decision diamond 4030, the monitored tank filled volume is determined if it is above a certain threshold (or if the procedure 4000 has been notified by the tank filled volume sensor 3911 because the tank filled volume level has been sensed by the tank filled volume sensor 3911 to be above the threshold).

In an embodiment, the threshold range for the resource may be pre-determined or determined dynamically as the tank and/or tank battery are in operation. For example, the tank or tank battery device 3900 may determine the tank filled volume range, either dynamically during the operation of the pump or statically using formula, looking tables, or the like based on a pickup schedule of the pump or based on historical data regarding actual pickups performed. In another example, the threshold range may be set, either statically or dynamically, through the network based on analysis in conjunction with other pump devices, tank or tank battery devices, human operator input, or other considerations.

If the tank filled volume is determined not to be above the threshold, the process 4000 returns to step 4020 to monitor the tank filled volume sensor 3911 as discussed above. If the tank filled volume level is above the threshold, the process 4000 continues with step 4040.

Optionally, in step 4040, the tank or tank battery device 3911 may instruct the connected pump(s) to reduce the resource flow rate in order to slow down the filling of the tank. For example, if the tank or tank battery device 3911 would determine that a tanker pickup would not be available before the tank or tank battery is completely filled if the tank or tank battery would receive oil from the connected pump(s) at the present flow rate, this may be an unwanted situation in some circumstances as the connected pump(s) may need to be shut down. As such, it would be advantageous to instruct the connected pump(s) to slow down oil production as flow rate.

In other circumstances, this may also include instructing the pump(s) to divert the resource to fill other tanks or tank batteries. Here, the tank or tank battery device 3911 may take readings from resource flow rate sensor 3913 for the resource flow from a connected pump to determine if a slowdown is necessary and, if so, how much of a slowdown. Such decision may depend on a pre-determined value or dynamically during the operation of the pump or statically using formula, looking tables, historical data, and other data.

In another example, this slowdown value may be set either statically or dynamically, through the network based on analysis in conjunction with other pump devices, tank or tank battery devices, human operator input, or other considerations. The tank or tank battery device 3900 may directly instruct the pump device for a pump through the pump device control 3921 or through the network 400 using the network interface 3931.

In step 4050, the status of the tank filled volume may be updated to the network 3101. For example, a server may be controlling and monitoring a number of pumps from a centralized location. With the status update, the server may monitor one or more tanks or tank battery devices 3900 and may provide alternate instructions to each tank or tank battery device 3900. Further, the server may centralize the status of each tank or tank battery device 3900 in order to facilitate management and processing. In another example, a mobile device may be notified (e.g., one or more of a text message, a phone call, an electronic mail, a message on a mobile or computer application, or other communication methods to the owner (or designated person or system) of the pump).

Optionally, in step 4060, the tank or tank battery devices 3900 may initiate a communication to a tanker for pickup. For example, the monitoring of the tank or tank battery devices 3900 may be performed by a different entity than a refinery or transporting service performing the pickup. As such, the optional step 4060 helps improve response time and simplifies the pickup call procedure.

In an embodiment, one or more pump devices (e.g., pump device 3300) may be managed by an app (e.g., a mobile app), application (e.g., a computer application), or by other methods (e.g., each pump device individually or as one or more subgroups managed by a server) through the network 3101. For example, an owner of the one or more pump devices may be leased one or more subgroups of the pump devices to various entities (e.g., oil extraction companies) for certain fees (e.g., lease fee based on the amount of oil extract from the respective wells per month).

In an embodiment, each pump devices may keep track of the amount of resource extracted (or other data) for the pump device to facilitate the in calculating and/or auditing of the payment generated by the pump device.

In a further embodiment, the pump owner (or an authorized person or system) may be able to monitor the status of the pump device and/or issue direct command to the pump device (e.g., through the app, application, or other methods through the network 3101). For example, the pump owner may be able to monitor each of the sensors (e.g., sensors 3311-3315) and controls (e.g., controls 3321-3322) and other status of the pump device as well as the status of the processes (e.g., processes 3400-3800 as discussed above with respect to FIGS. 34-38) of the pump device (e.g., to ensure that the pump device is being operated properly, e.g., within the limitations of the lease). In an embodiment, each pump device may include a camera (for viewing the pump device and/or the vicinity of the pump device) to further facilitate the monitoring.

In another example, the pump owner (or other authorized person or system) may wish to intervene on a process of the pump device (e.g., manually activating the processes 3400-3800). For example, if a leasee is behind on its lease payment to the pump owner, the pump owner may wish to shut off the pump device and disallow it from further pumping until payment is made to the pump owner. In another example, a pump owner may wish for a quick shutoff of all pumps it owns (e.g., if there is a safety (recall) concern regarding a model of the pump to minimize liability).

In another embodiment, the direct control of the pump devices may also allow other (generally) authorized party to monitor and/or issue direct command to the pump devices. For example, a government or other enforcement agencies may wish to monitor or control the pump to ensure compliance with various rules and regulations.

In an embodiment, the pump device 3300 may include one or more of a beacon, light signal, or other signals (which may be wireless communicated through the network input/output interface 3331 through the network 3101) to a robot, drone, or other automated (or human directed) devices. In an embodiment, the robot, drone, or other devices may respond to a service call (e.g., initiated by step 3850 of the service alert procedure 3800 or scheduled maintenance such as the replacement of fuel) for a particular pump device 3300 and identify (geolocate) the device by the beacon or other signals. In a further embodiment, the robot, drone, or other devices may circulate among a group of pumps (guided by the beacon or other signals and/or by other geolocation methods as known now or may be later derived).

In an embodiment, a group of pumps may be each installed at a well that is part of a reservoir or geological feature or proximity. It may be that the flow rate of a pump may affect the flow rate of another pump when the group of the pumps attempt to extract the reservoir of the resource simultaneously. In an embodiment, each of the pumps may have the resource extraction rate adjusted such that the overall resource extraction rate for the collective group of pumps can be optimized.

For example, a pump at a well at a higher elevation may be affected if a pump at a well at a lower elevation is pumping beyond a certain speed. The group of pumps may optimize the extraction rate of each pump by controlling the extraction rate of certain pumps. In an embodiment, the groups of pumps may collectively determine a optimization scheme through calculations (e.g., based on the detected condition of the reservoir as detected by sonar or other devices or methods), looks-up-tables, empirical trial and error (e.g., setting a resource flow rate, e.g., through the resource flow rate optimization procedure 3500, for each individual pump and wait and see how the extraction rate for each other individual pump changes for the group of pumps), and other methods as known now or may be later derived.

In an embodiment, considerations for the optimization may include one or more of the overall extraction rate for the groups of pumps, balanced individual pump extraction rate (e.g., for filling tanks consistently), favoring/balancing the extraction rate of certain individual pumps (e.g., pumps that are easier to gain access too, pumps that support a higher resource flow rate, pumps that are owned by preferred entities), or other considerations.

The exemplary systems and methods of this disclosure have been described in relation to the pumping apparatus and communications system. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

The foregoing discussion of the invention has been presented for purposes of illustration and description. Further, the description is not intended to limit the invention to the form disclosed herein. Consequently, variation and modification commiserate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as a discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

As the foregoing discussion has been presented for purposes of illustration and description, the foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any subject matter.

What is claimed is:

1. A non-transitory computer-readable medium embodying a program of machine executable instructions, comprising:
   instructions for receiving information from one or more sensors of a pump apparatus;
   instructions for transmitting commands to one or more electronic controls of the pump apparatus;
   instructions for transmitting and receiving communications from a device through a network for the pump apparatus; and
   instructions to perform a pump height adjustment procedure for the pump apparatus, wherein
   the pump apparatus reciprocates a pump rod string in an oil or gas well, wherein
   the instructions to perform the pump height adjustment procedure comprises
      instructions for receiving information from a proximity sensor of the pump apparatus configured to indicate a proximate obstruction reading;
      instructions for determining, based on the proximate obstruction reading, that an obstruction external to the pump apparatus is proximate to a present height of an arm of the pump apparatus;
      instructions for reducing a maximum height of the arm for avoiding the obstruction;
      instructions for receiving information from the proximity sensor indicating a next proximate obstruction reading;
      instructions for determining, based on the next proximate obstruction reading, that the obstruction is no longer proximate to the arm; and
      instructions for returning the maximum height of the arm to a pre-determined height, wherein
   the pump apparatus comprises
      a ground-engaging base frame, wherein an upper end of the pump rod string extends upward through the base frame;
      a first unit mounted on said base frame, wherein the first unit includes an inner concentric piston shaft and an outer diameter cylinder, and wherein a piston ram is in slidably sealed engagement through the inner concentric fluid passage;
      a second unit for introducing and removing of fluid to the first unit, wherein the introducing and removing of the fluid drives the piston ram in the inner concentric piston shaft; and
      the arm comprising a cross bar connected to the piston ram, a piston of the second unit, and the pump rod.

2. The non-transitory computer-readable medium of claim 1, further comprising instructions to perform an emergency shut-off procedure, wherein the instructions to perform the emergency shut-off procedure comprises:
   instructions for receiving information from a resource pressure sensor of the pump apparatus configured to indicate a relative resource pressure reading;
   instructions for determining, based on the relative resource pressure reading, the resource is outside of a threshold value; and
   instructions for controlling one or more of a motor control of the pump apparatus and a control valve control of the pump apparatus to shut off the pump apparatus.

3. The non-transitory computer-readable medium of claim 1, further comprising instructions to perform a resource flow rate optimization procedure, wherein the instructions to perform the resource flow rate optimization procedure comprises:
   instructions for receiving information from a resource flow rate sensor of the pump apparatus configured to indicate a relative resource flow rate reading;
   instructions for determining, based on the relative resource flow rate reading, that resource flow rate is outside of a threshold value;
   instructions for determining that one of increasing or decreasing a pump speed of the pump apparatus is possible; and
   instructions for performing one of increasing or decreasing the pump speed for correcting the resource flow rate to within the threshold value.

4. The non-transitory computer-readable medium of claim 1, further comprising instructions to perform a service alert procedure, wherein the instructions to perform the service alert procedure comprises:
   instructions for receiving information from at least one of a plurality of maintenance sensors of the pump apparatus configured to indicate a maintenance level reading;
   instructions for determining, based on the maintenance level reading, that a maintenance level of the pump apparatus is outside of a threshold value; and
   instructions for transmitting a service call through the network.

5. The non-transitory computer-readable medium of claim 1, wherein the instructions to perform the pump height adjustment procedure further comprises instructions for outputting one or more sensory signals during a performance of the instructions for reducing a maximum height of the arm for avoiding the obstruction.

6. The non-transitory computer-readable medium of claim 3, wherein the instructions for performing one of increasing or decreasing the pump speed comprises instructions for performing one or increasing or decreasing a speed of a motor of the pump apparatus.

7. The non-transitory computer-readable medium of claim 3, wherein the instructions to perform the resource flow rate optimization procedure further comprises instructions determining an optimal resource flow rate for a well pumped by the pump apparatus based on one or more of a power source of the pump apparatus, a fill level of a tank receiving the resource, and an optimal resource extraction rate of a group of pump apparatuses comprising the pump apparatus.

8. The non-transitory computer-readable medium of claim 1, further comprising instructions to perform a location tracking procedure for the pump apparatus, the instructions to perform the location tracking procedure for the pump apparatus comprising:
   instructions for receiving information from a location sensor of the pump apparatus indicating a location reading;
   instructions for determining, based on the location reading, that a location of the pump apparatus has changed from a previous location reading; and
   instructions for transmitting a status of the location through the network.

9. A method for operating a pump apparatus, comprising:
mounting a first and second unit of the pump apparatus on a frame, wherein the first unit comprises a piston ram slidable in sealed engagement through an inner concentric piston shaft and an outer diameter cylinder in an outwardly spaced concentric relation to the inner concentric piston shaft mounted for movement with the piston ram, wherein the second unit is in fluid communication with the first unit, and wherein a pump rod extends downwardly into the subsurface formation and is connected to the piston ram;
counterbalancing a weight of the pump rod with a fluid in the first and second unit;
reciprocating the pump rod from a first position to a second position through simultaneous movement of the piston ram, wherein the pump rod and the piston ram are connected to a cross bar;
receiving information from one or more sensors of the pump apparatus;
transmitting commands to one or more electronic controls of the pump apparatus;
transmitting and receiving communications from a device through a network for the pump apparatus;
performing a pump height adjustment procedure for the pump apparatus;
receiving information from a proximity sensor of the pump apparatus configured to indicate a proximate obstruction reading;
determining, based on the proximate obstruction reading, that an obstruction is proximate to a present height of the cross bar;
reducing a maximum height of the cross bar for avoiding the obstruction;
receiving information from the proximity sensor indicating a next proximate obstruction reading;
determining, based on the next proximate obstruction reading, that the obstruction external to the pump apparatus is no longer proximate to the cross bar; and
returning the maximum height of the arm to a predetermined height.

10. The method of claim 9, wherein the method further comprises performing an emergency shut-off procedure, wherein the performing the emergency shut-off procedure comprises:
receiving information from a resource pressure sensor of the pump apparatus configured to indicate a relative resource pressure reading;
determining, based on the relative resource pressure reading, the resource is outside of a threshold value; and
controlling one or more of a motor control of the pump apparatus and a control valve control of the pump apparatus to shut off the pump apparatus.

11. The method of claim 9, wherein the method further comprises performing a resource flow rate optimization procedure, wherein the performing the resource flow rate optimization procedure comprises:
receiving information from a resource flow rate sensor of the pump apparatus configured to indicate a relative resource flow rate reading;
determining, based on the relative resource flow rate reading, that resource flow rate is outside of a threshold value;
determining that one of increasing or decreasing a pump speed of the pump apparatus is possible; and
performing one of increasing or decreasing the pump speed for correcting the resource flow rate to within the threshold value.

12. The method of claim 9, wherein the method further comprises performing a service alert procedure, wherein the performing the service alert procedure comprises:
receiving information from at least one of a plurality of maintenance sensors of the pump apparatus configured to indicate a maintenance level reading;
determining, based on the maintenance level reading, that a maintenance level of the pump apparatus is outside of a threshold value; and
transmitting a service call through the network.

13. The method of claim 10, wherein the performing the pump height adjustment procedure further comprises outputting one or more sensory signals during a performance of the instructions for reducing a maximum height of the arm for avoiding the obstruction.

14. The method of claim 11, wherein the performing one of increasing or decreasing the pump speed comprises performing one of increasing or decreasing a speed of a motor of the pump apparatus.

15. The method of claim 11, wherein the performing the resource flow rate optimization procedure further comprises determining an optimal resource flow rate for a well pumped by the pump apparatus based on one or more of a power source of the pump apparatus, a fill level of a tank receiving the resource, and an optimal resource extraction rate of a group of pump apparatuses comprising the pump apparatus.

16. A method for operating a pump apparatus, comprising:
mounting a first and second unit of the pump apparatus on a frame, wherein the first unit comprises a piston ram slidable in sealed engagement through an inner concentric piston shaft and an outer diameter cylinder in an outwardly spaced concentric relation to the inner concentric piston shaft mounted for movement with the piston ram, wherein the second unit is in fluid communication with the first unit, and wherein a pump rod extends downwardly into the subsurface formation and is connected to the piston ram;
counterbalancing a weight of the pump rod with a fluid in the first and second unit;
reciprocating the pump rod from a first position to a second position through simultaneous movement of the piston ram, wherein the pump rod and the piston ram are connected to a cross bar;
regulating a directional flow of hydraulic fluid into the first unit through a directional control valve and a limit switch;
driving the hydraulic oil against lower ends of the outer diameter cylinder to drive the outer diameter cylinder upward through a motor;
receiving information from one or more sensors of the pump apparatus;
transmitting commands to one or more electronic controls of the pump apparatus;
transmitting and receiving communications from a device through a network for the pump apparatus;
performing a pump height adjustment procedure for the pump apparatus;
receiving information from a proximity sensor of the pump apparatus configured to indicate a proximate obstruction reading;
determining, based on the proximate obstruction reading, that an obstruction external to the pump apparatus is proximate to a present height of the cross bar;
reducing a maximum height of the cross bar for avoiding the obstruction;
receiving information from the proximity sensor indicating a next proximate obstruction reading;

determining, based on the next proximate obstruction reading, that the obstruction is no longer proximate to the cross bar; and returning the maximum height of the arm to a pre-determined height, wherein the first unit further comprises a large diameter cylinder barrel, wherein the fluid comprises an inert gas, wherein a second fluid fills the base of the first unit and is configured to fill an interior of the outer diameter cylinder and the large diameter cylinder barrel, wherein the second fluid further comprises oil, wherein the pump rod is connected to a stroke multiplier on the cross bar, and wherein the first unit further comprises a cylinder head and a cylinder end.

* * * * *